United States Patent
Thompson

(10) Patent No.: US 12,522,847 B2
(45) Date of Patent: Jan. 13, 2026

(54) PLASMID ENCODING AN INSULIN PEPTIDE AND Fc FUSION PROTEIN

(71) Applicant: Wyvern Pharmaceuticals Inc., Calgary (CA)

(72) Inventor: Bradley G. Thompson, Calgary (CA)

(73) Assignee: Wyvern Pharmaceuticals Inc., Calgary (CA)

( * ) Notice: Subject to any disclaimer, the term of this patent is extended or adjusted under 35 U.S.C. 154(b) by 0 days.

(21) Appl. No.: 18/964,162

(22) Filed: Nov. 29, 2024

(65) Prior Publication Data

US 2025/0263745 A1 Aug. 21, 2025

Related U.S. Application Data

(62) Division of application No. 18/582,222, filed on Feb. 20, 2024.

(51) Int. Cl.
| | |
|---|---|
| C12N 15/00 | (2006.01) |
| C07K 14/48 | (2006.01) |
| C07K 14/62 | (2006.01) |
| C07K 14/705 | (2006.01) |
| C12N 9/22 | (2006.01) |
| C12N 15/86 | (2006.01) |

(52) U.S. Cl.
CPC .............. *C12N 15/86* (2013.01); *C07K 14/48* (2013.01); *C07K 14/62* (2013.01); *C07K 14/705* (2013.01); *C07K 14/70596* (2013.01); *C12N 9/22* (2013.01); *C07K 2319/30* (2013.01); *C12N 2750/14143* (2013.01); *C12N 2800/00* (2013.01)

(58) Field of Classification Search
None
See application file for complete search history.

(56) References Cited

U.S. PATENT DOCUMENTS

| | | |
|---|---|---|
| 8,841,416 B2 | 9/2014 | Ledbetter |
| 11,085,055 B2 | 8/2021 | Mallol et al. |
| 11,162,102 B2 | 11/2021 | Minshull et al. |
| 11,359,001 B2 * | 6/2022 | Lancaster ............... A61K 38/28 |
| 11,530,423 B1 | 12/2022 | Thompson |
| 11,873,505 B2 | 1/2024 | Thompson |
| 11,976,104 B2 | 5/2024 | Wei |
| 12,018,274 B2 | 6/2024 | Thompson |
| 12,134,770 B1 | 11/2024 | Thompson |
| 12,180,521 B2 | 12/2024 | Ledbetter |
| 2003/0104523 A1 | 6/2003 | Bauer |
| 2021/0253664 A1 | 8/2021 | Wei |
| 2024/0026377 A1 | 1/2024 | Thompson |
| 2025/0002884 A1 | 1/2025 | Posada |
| 2025/0011445 A1 | 1/2025 | Bergmann |

FOREIGN PATENT DOCUMENTS

| | | |
|---|---|---|
| CA | 2721333 A1 | 10/2009 |
| CN | 114829384 | 7/2022 |
| KR | 100808908 B1 | 3/2008 |
| WO | 2004096156 A2 | 11/2004 |
| WO | 2020041590 A1 | 2/2020 |
| WO | 2021168413 A1 | 8/2021 |
| WO | 2022074236 A2 | 4/2022 |
| WO | 2022178078 A1 | 8/2022 |
| WO | 2023051412 A1 | 4/2023 |
| WO | 2023088351 A1 | 5/2023 |
| WO | 2024107701 A2 | 5/2024 |
| WO | 2024191937 A2 | 9/2024 |

OTHER PUBLICATIONS

Dwyer et al. (J. Biol. Chem. 274:9738-43, 1999) (Year: 1999).
Chapter 7 Monomeric Fc-Fusion Proteins Baisong Mei, Susan C. Low, Snejana Krassova, Robert T. Peters, Glenn F. Pierce.Jennifer A. Dumont Book Editor(s):Stefan R. Schmidt First published: Feb. 12, 2013 https://doi.org/10.1002/9781118354599.ch7 (Year: 2013).
A rationally engineered DNase1-Fc fusion protein ameliorates auto-immune glomerulonephritis. By: Mouchess, Maria [Reprint Author]Journal of Immunology, (May 1, 2019) vol. 202, No. 1, Suppl. S, pp. 132.4. (Year: 2019).
A Rationally Engineered Hyperactive Actin-Resistant DNase1-Fc Fusion Protein Ameliorates Autoimmune Glomerulonephritis. By: Austin, Cary D. FASEB Journal, (Apr. 2019) vol. 33, No. Suppl. 1, pp. 802.10. (Year: 2019).
Bottoni et al. "Targeting BTK through microRNA in chronic lymphocytic leukemia." Blood, The Journal of the American Society of Hematology 128.26 (2016): 3101-3112.
O'Brien et al. "Overview of microRNA biogenesis, mechanisms of actions, and circulation." Frontiers in endocrinology 9 (2018): 402.
Gorski et al. "RNA-based recognition and targeting: sowing the seeds of specificity." Nature Reviews Molecular Cell Biology 18.4 (2017): 215-228.
Brutons Tyrosine Kinase Genbank Sequence (2023).

(Continued)

*Primary Examiner* — Michael C Wilson
(74) *Attorney, Agent, or Firm* — Gowling WLG (Canada) LLP

(57) ABSTRACT

Some embodiments of the present disclosure relate to one or more compositions that upregulate the production of one or more sequences of mRNA. The sequences of mRNA may encode for translation of a target biomolecule, thereby causing an increase in bioavailability of the target biomolecule within a subject that is administered the one or more compositions. In some embodiments of the present disclosure, the target biomolecule is a fusion protein with an Fc fragment, such as a toll-like receptor 3-Fc (TLR3-Fc). In some embodiments of the present disclosure, the target biomolecule is toll-like receptor 9-Fc (TLR9-Fc). In some embodiments of the present disclosure, the target biomolecule is deoxyribonuclease I-Fc (DNAse I-Fc). In some embodiments of the present disclosure, the target biomolecule is neural growth factor-Fc (NGF-Fc). In some embodiments of the present disclosure, the target biomolecule is insulin-Fc.

3 Claims, No Drawings

Specification includes a Sequence Listing.

(56) References Cited

OTHER PUBLICATIONS

Christensen et al. "Recombinant adeno-associated virus-mediated microRNA delivery into the postnatal mouse brain reveals a role for miR-134 in dendritogenesis in vivo." Frontiers in neural circuits 3 (2010): 848.

Bofill-De Ros et al. "Guidelines for the optimal design of miRNA-based shRNAs." Methods 103 (2016): 157-166.

Denzler et al. "Impact of microRNA levels, target-site complementarity, and cooperativity on competing endogenous RNA-regulated gene expression." Molecular cell 64.3 (2016): 565-579.

Van Den Berg et al. "Design of effective primary microRNA mimics with different basal stem conformations." Molecular Therapy Nucleic Acids 5 (2016).

Nature (2010. Gene Expression. Scitable. Available online at Nature.com) <https://www.nature.com/scitable/topicpage/gene-expression-14121669> (2010).

GenBank EGF Sequence (2023).

Ahmadzadeh et al. "BRAF mutation in hairy cell leukemia." Oncology reviews 8.2 (2014): 253.

Patton et al. "Biogenesis, delivery, and function of extracellular RNA." Journal of extracellular vesicles 4.1 (2015): 27494.

Clark et al. "Detection of BRAF splicing variants in plasma-derived cell-free nucleic acids and extracellular vesicles of melanoma patients failing targeted therapy therapies." Oncotarget 11.44 (2020): 4016.

NCBI search results for Seq ID No. 5 (2024).

NCBI Nucleotide Sequence ALK Lingand, search performed Dec. 26, 2024 (2023).

NCBI Nucleotide Sequence ALK Receptor, search performed Dec. 26, 2024 (2023).

GenBank EGFR Sequence (2023).

GenBank FLT3 Sequence (2024).

NCBI Nucleotide Sequence for PARP, search performed Dec. 26, 2024 (2024).

Tritschler et al. "Concepts and limitations for learning developmental trajectories from single cell genomics." Development 146.12 (2019): dev170506.

Kondratov et al. "Direct head-to-head evaluation of recombinant adeno-associated viral vectors manufactured in human versus insect cells." Molecular Therapy 25.12 (2017): 2661-2675.

Wang et al. "Adeno-associated virus vector as a platform for gene therapy delivery." Nature reviews Drug discovery 18.5 (2019): 358-378.

* cited by examiner

SEQUENCE LISTING

```
Sequence total quantity: 11
SEQ ID NO: 1            moltype = DNA   length = 5861
FEATURE                 Location/Qualifiers
source                  1..5861
                        mol_type = other DNA
                        organism = synthetic construct
SEQUENCE: 1
ttctagaata atcaacctct ggattacaaa atttgtgaaa gattgactgg tattcttaac   60
tatgttgctc cttttacgct atgtggatac gctgctttaa tgcctttgta tcatgctatt  120
gcttcccgta tggctttcat tttctcctcc ttgtataaat cctggttgct gtctctttat  180
gaggagttgt ggcccgttgt caggcaacgt ggcgtggtgt gcactgtgtt tgctgacgca  240
accccactg gttggggcat tgccaccacc tgtcagctcc tttccgggac tttcgctttc   300
cccctcccta ttgccacggc ggaactcatc gccgcctgcc ttgcccgctg ctggacaggg  360
gctcggctgt tgggcactga caattccgtg gtgttgtcgg ggaaatcatc gtcctttcct  420
tggctgctcg cctgtgttgc cacctggatt ctgcgcggga cgtccttctg ctacgtccct  480
tcggccctca atccagcgga ccttccttcc cgcggcctgc tgccggctct gcggcctctt  540
ccgcgtcttc gccttcgccc tcagacgagt cggatctccc tttgggccgc ctccccgcct  600
aagcttatcg ataccgtcga gatctaactt gtttattgca gcttataatg gttacaaata  660
aagcaatagc atcacaaatt tcacaaataa agcatttttt tcactgcatt ctagttgtgg  720
tttgtccaaa ctcatcaatg tatcttatca tgtctggatc tgacctcga ctagagcatg  780
gctacgtaga taagtagcat ggcgggttaa tcattaacta caaggaaccc ctagtgatgg  840
agttggccac tccctctctg cgcgctcgct cgctcactga ggccgggcga ccaaaggtcg  900
cccgacgccc gggctttgcc cggcggcct cagtgagcga gcgagcgcgc cagctggcgt   960
aatagcgaag aggccgcac cgatcgccct tcccaacagt tgcgcagcct gaatggcgaa  1020
tggaattcca gacgattgag cgtcaaaatg taggtatttc catgagcgtt tttcctgttg  1080
caatgctgtg cggtaatatt gttctggata ttaccagcaa ggccgatagt ttgagttctt  1140
ctactcaggc aagtgatgtt attactaatc aaagaagtat tgcgacaacg gttaatttgc  1200
gtgatggaca gactctttta ctcggtgcc tcactgatta taaaaacact tctcaggatt  1260
ctggcgtacc gttcctgtct aaaatccctt taatcggcct cctgtttagc tcccgctctg  1320
attctaacga ggaaagcacg ttatacgtgc tcgtcaaagc aaccatagta cgcgcccgt   1380
agcggcgcat taagcgcggc gggtgtggtg gttacgcgca gcgtgaccgc tacacttgcc  1440
```

```
agcgccctag cgcccgctcc tttcgctttc ttcccttcct ttctcgccac gttcgccggc  1500
tttcccgtc  aagctctaaa tcggggggctc ccttaggggt tccgatttag tgctttacgg  1560
cacctcgacc ccaaaaaact tgattagggt gatggttcac gtagtgggcc atcgccctga  1620
tagacgtttt ttcgcccttt gacgttggag tccacgttct ttaatagtgg actcttgttc  1680
caaactggaa caacactcaa ccctatctcg gtctattctt ttgatttata agggattttg  1740
ccgatttcgg cctattggtt aaaaaatgag ctgatttaac aaaaatttaa cgcgaatttt  1800
aacaaaatat taacgtttac aatttaaata tttgcttata caatcttcct gttttttgggg 1860
cttttctgat tatcaaccgg ggtacatatg attgacatgc tagttttacg attaccgttc  1920
atcgattctc ttgtttgctc cagactctca ggcaatgacc tgatagcctt tgtagagacc  1980
tctcaaaaat agctaccctc tccggcatga atttatcagc tagaacggtt gaatatcata  2040
ttgatggtga tttgactgtc tccggccttt ctcacccgtt tgaatcttta cctacacatt  2100
actcaggcat tgcatttaaa atatatgagg gttctaaaaa ttttatcct  tgcgttgaaa  2160
taaaggcttc tcccgcaaaa gtattacagg gtcataatgt ttttggtaca accgatttag  2220
ctttatgctc tgaggcttta ttgcttaatt ttgctaattc tttgccttgc ctgtatgatt  2280
tattggatgt tggaattcct gatgcggtat tttctcctta cgcatctgtg cggtatttca  2340
caccgcatat ggtgcactct cagtacaatc tgctctgatg ccgcatagtt aagccagccc  2400
cgacacccgc caacacccgc tgacgcgccc tgacgggctt gtctgctccc ggcatccgct  2460
tacagacaag ctgtgaccgt ctccgggagc tgcatgtgtc agaggttttc accgtcatca  2520
ccgaaacgcg cgagacgaaa gggcctcgtg atacgcctat ttttataggt taatgtcatg  2580
ataataatgg tttcttagac gtcaggtggc acttttcggg gaaatgtgcg cggaacccct  2640
atttgtttat ttttctaaat acattcaaat atgtatccgc tcatgagaca ataaccctga  2700
taaatgcttc aataattattg aaaaaggaag agtatgagta ttcaacattt ccgtgtcgcc  2760
cttattccct tttttgcggc attttgcctt cctgtttttg ctcacccaga acgctggtg   2820
aaagtaaaag atgctgaaga tcagttgggt gcacgagtgg gttacatcga actggatctc  2880
aacagcggta agatccttga gagttttcgc cccgaagaac gttttccaat gatgagcact  2940
tttaaagttc tgctatgtgg cgcggtatta tcccgtattg acgccgggca agagcaactc  3000
ggtcgccgca tacactattc tcagaatgac ttggttgagt actcaccagt cacagaaaag  3060
catcttacgg atggcatgac agtaagagaa ttatgcagtg ctgccataac catgagtgat  3120
aacactgcgg ccaacttact tctgacaacg atcgaggac  cgaaggagct aaccgctttt  3180
ttgcacaaca tgggggatca tgtaactcgc cttgatcgtt gggaaccgga gctgaatgaa  3240
gccataccaa acgacgagcg tgacaccacg atgcctgtag caatggcaac aacgttgcgc  3300
aaactattaa ctggcgaact acttactcta gcttcccggc aacaattaat agactggatg  3360
gaggcggata aagttgcagg accacttctg cgctcggccc ttccggctgg ctggtttatt  3420
gctgataaat ctggagccgg tgagcgtggg tctcgcggta tcattgcagc actggggcca  3480
gatggtaagc cctcccgtat cgtagttatc tacacgacgg ggagtcagc  aactatggat  3540
gaacgaaata gacagatcgc tgagataggg gcctcactga ttaagcattg gtaactgtca  3600
gaccaagttt actcatatat actttagatt gatttaaaac ttcattttta atttaaaagg  3660
atctaggtga agatccttt  tgataatctc atgaccaaaa tcccttaacg tgagttttcg  3720
ttccactgag cgtcagaccc cgtagaaaag atcaaaggat cttcttgaga tcctttttg   3780
ctgcgcgtaa tctgctgctt gcaaacaaaa aaaccaccgc taccagcggt ggtttgtttg  3840
ccggatcaag agctaccaac tctttttccg aaggtaactg gcttcagcag agcgcagata  3900
ccaaatactg tccttctagt gtagccgtag ttaggccacc acttcaagaa ctctgtagca  3960
ccgcctacat acctcgctct gctaatcctg ttaccagtgg ctgccgataag         4020
tcgtgtctta ccgggttgga ctcaagacga tagttaccgg ataaggcgca gcggtcgggc  4080
tgaacgggggg gttcgtgcac acagcccagc ttggagcgaa cgacctacac cgaactgaga  4140
tacctacagc gtgagctatg agaaagcgcc acgcttcccg aagggagaaa ggcggacagg  4200
tatccggtaa gcggcagggt cggaacagga gagcgcacga ggagcttcc  aggggggaaac 4260
gcctggtatc tttatagtcc tgtcgggttt cgccacctct gacttgagcg tcgatttttg  4320
tgatgctcgt caggggggcg gagcctatgg aaaaacgcca gcaacgcggc ctttttacgg  4380
ttcctggcct tttgctggcc ttttgctcac atgttcttc  ctgcgttatc ccctgattct  4440
gtggataacc gtattaccgc ctttgagtga gctgataccg ctcgccgcag ccgaacgacc  4500
gagcgcagcg agtcagtgag cgaggaagcg gaagagcgcc caatacgcaa accgcctctc  4560
cccgcgcgtt ggccgattca ttaatgcagc agctgcgcgc tcgctcgctc actgaggccg  4620
cccgggcaaa gcccgggcgt cgggcgacct ttggtcgccc ggcctcagtg agcgagcgag  4680
cgcgcagaga gggagtggcc aactccatca ctaggggttc cttgtagtta atgattaacc  4740
cgccatgcta cttatctacg tagccatgct ctaggacatt gattattgac tagtggagtt  4800
ccgcgttaca taacttacgg taaatggccc gcctggctga ccgcccaacg acccccgccc  4860
attgacgtca ataatgacgt atgttcccat agtaacgcca atagggactt tccattgacg  4920
tcaatgggtg gagtatttac ggtaaactgc ccacttggca gtacatcaag tgtatcatat  4980
gccaagtacg ccccctattg acgtcaatga cggtaaatgg cccgcctggc attatgccca  5040
gtacatgacc ttatgggact ttcctacttg gcagtacatc tacgtattag tcatcgctat  5100
taccatggtc gaggtgagcc ccacgttctg cttcactctc cccatctccc cccctcccc   5160
acccccaatt ttgtatttat ttattttta  attattttgt gcagcgatgg gggcgggggg  5220
ggggggggc  gcgcgccagg cggggcgggg cggggcgcgg ggcgaggcgg  5280
agaggtgcgg cggcagccaa tcagagcggc gcgctccgaa agtttccttt tatggcgagg  5340
cggcggcggc ggcggcccta taaaaagcga agcgcgcggc gggcgggagt cgctgcgcgc  5400
tgccttcgcc ccgtgccccg ctccgccgcc gcctcgcgcc gcccgccccg gctctgactg  5460
accgcgttac taaaacaggt aagtccggcc tccgcgccgg ttttggcgc  ctcccgcggg  5520
cgcccccctc ctcacgacga gcgctgccac gtcagacgaa gggcgcagcg acgtcctga   5580
tccttccgcc cggacgctca ggacagcggc ccgctgctca taagactcgg ccttagaacc  5640
ccagtatcag cagaaggaca ttttaggacg ggacttgggt gactctaggg cactggtttt  5700
ctttccagag agcggaacag gcgaggaaaa gtagtccctt ctcggcgatt ctgcggaggg  5760
atctccgtgg ggcggtgaac gccgatgatg cctctactaa ccatgttcat gtttctttt   5820
ttttttctaca ggtcctgggt gacgaacagg gtaccgccac c                     5861
```

```
SEQ ID NO: 2           moltype = DNA   length = 1560
FEATURE                Location/Qualifiers
source                 1..1560
                       mol_type = other DNA
``` organism = synthetic construct
SEQUENCE: 2
```
atgaggggca tgaagctgct gggggcgctg ctggcactgg cggccctact gcaggggcc     60
gtgtccctga agatcgcagc cttcaacatc agacatttg gggagaccaa gatgtccaat    120
gccaccctcg tcagctacat tgtgcagatc ctgagccgct atgacatcgc cctggtccag    180
gaggtcagag acagccacct gactgccgtg gggaagctgc tggacaacct caatcaggat    240
gcaccagaca cctatcacta cgtggtcagt gagccactgg acggaacag ctataaggag    300
cgctacctgt tcgtgtacag gcctgaccag gtgtctgcgg tggacagcta ctactacgat    360
gatggctgcg agcctgcggg gaacgacacc ttcaaccgaa agccagccat tgtcaggttc    420
ttctcccggt tcacagaggt cagggagttt gccattgttc ccctgcatgc ggccccgggg    480
gacgcagtag ccgagatcga cgctctctat gacgtctacc tggatgtcca agagaaatgg    540
ggcttggagg acgtcatgtt gatgggcgac ttcaatgcgg gctgcagcta tgtgagaccc    600
tcccagtggt catccatccg cctgtggaca agccccacct tccagtggct gatccccgac    660
agcgctgaca ccacagctac acccacgcac tgtgcctatg acaggatcgt ggttgcaggg    720
atgctgctcc gaggcgccgt tgttcccgac tcggctcttc cctttaactt ccaggctgcc    780
tatggcctga gtgaccaact ggcccaagcc atcagtgacc actatccagt ggaggtgatg    840
ctgaagggcg atcaggcgg atcacccaaa tcttgtgaca aaactcacac atgcccaccg    900
tgcccagcac ctgaactcct gggggaccg tcagtcttcc tcttccccc aaaacccaag    960
gacaccctca tgatctcccg gacccctgag gtcacatgc tggtggtgga cgtgagccac   1020
gaagaccctg aggtcaagtt caactggtac gtggacggcg tggaggtgca taatgccaag   1080
acaaagccgc gggaggagca gtacaacagc acgtaccgtg tggtcagcgt cctcaccgtc   1140
ctgcaccagg actggctgaa tggcaaggag tacaagtgca aggtctccaa caaagcctc   1200
ccagcccca tcgagaaaac catctccaaa gccaaaggc agccccgaga accacaggtg   1260
tacaccctgc cccatcccg ggaggagatg accaagaacc aggtcagcct gacctgcctg   1320
gtcaaaggct tctatcccag cgacatcgcc gtggagtggg agagcaatgg gcagccggag   1380
aacaactaca agaccacgcc tcccgtgctg gactccgacg gctccttctt cctctacagc   1440
aagctcaccg tggacaagag caggtggcag caggggaacg tcttctcatg ctccgtgatg   1500
catgaggctc tgcacaacca ctacacgcag aagagcctct ccctgtctcc gggtaaatag   1560
```
SEQ ID NO: 3    moltype = DNA  length = 3423
FEATURE         Location/Qualifiers
source          1..3423
                mol_type = other DNA
                organism = synthetic construct
SEQUENCE: 3
```
gccagaccct gccgtgcatt tatttttggg gcggcctgct gccgtttggc atgctgtgcg     60
cgagcagcac caccaaatgc accgtgagcc atgaagtggc ggattgcagc catctgaaac    120
tgacccaggt gccggatgat ctgccgacca acattaccgt gctgaacctg acccataacc    180
agctgcgccg cctgccggcg cgaaacttta cccgctatag ccagctgacc agcctggatg    240
tgggctttaa caccattagc aaactggaac cggaactgtg ccagaaactg ccgatgctga    300
aagtgctgaa cctgcagcat aacgaactga gccagctgag cgataaaacc tttgcgtttt    360
gcaccaacct gaccgaactg catctgatga gcaacagcat tcagaaaatt aaaaacaacc    420
cgtttgtgaa acagaaaaac ctgattaccc tggatctgag ccataacgcc tgagcagca    480
ccaaactggg cacccaggtg cagctggaaa acctgcagga actgctgctg agcaacaaca    540
aaattcaggc gctgaaaagc gaagaactgg atatttttgc gaacagcagc ctgaaaaaac    600
tggaactgag cagcaaccag attaagaatt tagcccggg ctgctttcat gcgattggcc    660
gcctgtttg cctgttttctg aacaacgtgc agctgggccc aggcctgaaa aactgt    720
gcctggaact ggcgaacacc agcattcgca acctgagcct gagcaacagc cagctgagca    780
ccaccagcaa caccaccttt ctgggcctga atggaccaa cctgaccatg ctggatctga    840
gctataacaa cctgaacgtg gtgggcaacg atagctttgc gtggctgccg cagctggaat    900
atttttttct ggaatataac aacattcagc atctgtttta ccatagcctg catggcctgt    960
taacgtgcg ctatctgaac ctgaaacgca gctttaccaa acagagcatt agcctggcga   1020
gcctgccgaa aattgatgat tttagctttc agtggctgaa atgcctggaa catctggaaca   1080
tggaagataa cgatattccg ggcattaaaa gcaacatgtt taccggcctg attaacctga   1140
aatatctgag cctgagcaac agctttacca gcctgcgcaa cctgaccaac gaaaccttg   1200
tgagcctggc gcatagcccg ctgcatattc tgaacctgac caaaaacaaa attagcaaa   1260
ttgaaagcga tgcgtttagc tggctgggcc atctggaagt gctggatctg ggcctgaacg   1320
aaattggcca ggaactgacc ggccaggaat ggcgcgcct ggaaaacatt tttgaaattt   1380
atctgagcta taacaaatat ctgcagctga cccgcaacag ctttgcgctg gtgccgagcc   1440
tgcagcgcct gatgctgcgc gcgtggcgc tgaaaaacgt ggatagcagc ccgagccgt   1500
ttcagccgct cgcgcaacctg accattctgg atctgagcaa caacaacatt gcaacatta   1560
acgatgatat gctggaaggc ctgaaaaaac tggaattctg gatctgcag cataacaacc   1620
tggcgcgcct gtggaaacat gcgaacccgg gcggccgat ttatttttctg aaaggcctga   1680
gccatctgca tattctgaac ctgaaagca acggctttga tgaaattccg gtggaagtgt   1740
ttaaagatct gtttgaactg aaaattattg atctgggcct gaacaacctg aacaccctgc   1800
cggcgagcgt gtttaacaac caggtgagcc tgaaaagcct gaacctcag aaaaaccttga   1860
ttaccagcgt ggaaaaaaaa gtgtttggcc cggcgtttcg caacctgacc gaactggata   1920
tgcgctttaa cccgtttgat tgcacctgcg aaagcattgc gtggttggtg aactggatta   1980
acgaaaccca taccaacatt ccggaactga gcagccatta tctgtgcaac accccgccg   2040
attatcatgg ctttccggtg cgcctgtttt ataccagcag ctgcaaagat agcgcgccgt   2100
ttgaactgtt ttttatgatt aacaccagca ttctgctgat ttttatttttt attgtgctgc   2160
tgattcattt tgaaggctgg cgcattagct tttattgaa cgtgagcgtg catcgcgtgc   2220
tgggctttaa agaaattgat cgccagaccg aacagtttga atatgcggcg tatattattc   2280
atgcgtataa agataaagat tggggtgtggg aacattttga cgcatggaa aaagaagatc   2340
agagcctgaa attttgcctg gaagaacgcg attttgaagc gggcgtgttt gaactggaag   2400
cgattgtgaa cagcattaaa cgcagccgca aaattatttt tgtgattacc catcatctgc   2460
tgaaagatcc gctgtgcaaa cgcttttaaag tgcatcatgc ggtgcagcag gcgattgaac   2520
agaacctgga tagcattatt ctggtgtttc tggaagaaat tccggattat aaactgaacc   2580
atgcgctgtg cctgcgccgc ggcatgttta aagccattgc cattctgaac tggccggtgc   2640
```

```
agaaagaacg cattggcgcg tttcgccata aactgcaggt ggcgctgggc agcaaaaaca 2700
gcgtgcatgg gcggatcagg cggatccacc aaatcttgtg acaaaactca cacatgccca 2760
ccgtgcccag cacctgaact cctgggggga ccgtcagtct tcctcttccc cccaaaaccc 2820
aaggacaccc tcatgatctc ccggacccct gaggtcacat gcgtggtggt ggacgtgagc 2880
cacgaagacc ctgaggtcaa gttcaactgg tacgtggacg gcgtggaggt gcataatgcc 2940
aagacaaagc cgcgggagga gcagtacaac agcacgtacc gtgtggtcag cgtcctcacc 3000
gtcctgcacc aggactggct gaatggcaag gagtacaagt gcaaggtctc caacaaagcc 3060
ctcccagccc ccatcgagaa aaccatctcc aaagccaaag gcagccccg agaaccacag 3120
gtgtacaccc tgcccccatc ccgggaggag atgaccaaga accaggtcag cctgacctgc 3180
ctggtcaaag gcttctatcc cagcgacatc gccgtggagt gggagagcaa tgggcagccg 3240
gagaacaact acaagaccac gcctcccgtg ctggactccg acggctcctt cttcctctac 3300
agcaagctca ccgtggacaa gagcaggtgg cagcagggga acgtcttctc atgctccgtg 3360
atgcatgagg ctctgcacaa ccactacacg cagaagagcc tctccctgtc tccgggtaaa 3420
tag                                                                3423

SEQ ID NO: 4        moltype = DNA   length = 3877
FEATURE             Location/Qualifiers
source              1..3877
                    mol_type = other DNA
                    organism = synthetic construct
SEQUENCE: 4
atgagggca tgaagctgct ggggcgctg ctggcactgg cggccctact gcaggggggcc 60
gtgtccatgg gcttttgccg cagcgcgctg catccgctga gcctgctggt gcaggcgatt 120
atgctggcga tgaccctggc gctgggcacc ctgccgcgct ttctgccgtg cgaactgcag 180
ccgcatggcc tggtgaactg caactggctg tttctgaaaa gcgtgccgca ttttagcatg 240
gcggcgccgc gcggcaacgt gaccagcctg agcctggcga gcaaccgcat tcatcatctg 300
catgatagcg attttgcgca tctgccgagc ctgcgccatc tgaacctgaa atggaactgc 360
ccgcggtgg gcctgagccc gatgcatttt ccgtgccata tgaccattga accgagcacc 420
tttctgcgg tgccgaccct ggaagaactg aacctgagct ataacaacat tatgaccgtg 480
ccggcgctgc cgaaaagcct gattagcctg agcctgaaca taccaacat tctgatgctg 540
gatagcgcga gcctggcggg cctgcatgcg ctgcgctttc tgtttatgga tggcaactgc 600
tattataaaa cccgtgccg ccaggcgctg aagtggcgc cgggcgcgct gctgggcctg 660
ggcaacctga cccatctgag cctgaaatat aacaacctga ccgtggtgcc gcgcaacctg 720
ccgagcgcc tggaatatct gctgctgagc tataaccgca ttgtgaaact ggcgccgaa 780
gatctggcga acctgaccgc gctgcgcgtg ctggatgtgg gcggcaactg ccgccgccaaa 840
gatcatgcgc cgaacccgtg catgaatgcc ccgcgccatt ttccgcagct gcatccggat 900
acctttagcc atctgagccg cctggaaggc ctggtgctga agatagcag cctgagctgg 960
ctgaacgcga gctggtttcg cggcctgggc aacctgcgcg tgctggatct gagcgaaaac 1020
tttctgtata aatgcattac caaaaccaaa gcgtttcagg gcctgaccca gctgcgcaaa 1080
ctgaacctga gctttaacta tcagaaacgc gtgagcctg cgcatctgag cctggcgccg 1140
agctttggca gcctggtgc gctgaaagaa ctggatatgc atggcatttt ttttcgcagc 1200
ctggatgaaa ccaccctgcg cccgctggcg cgcctgccga tgctgcagac cctgcgcctg 1260
cagatgaact ttattaacca ggcgcagctg ggcattttc gcggctttc gggcctgcag 1320
tatgtggatc tgagcgataa ccgcattagc ggcgcgagcg aactgaccgc gaccatgggc 1380
gaagcggatg gcgcgaaaa agtgtggctg cagccgggcg atctggcgcc ggcgccggtg 1440
gatacccga gcagcgaaga ttttcgcccg aactgcagca ccctgaactt tacccctgat 1500
ctgagccgca caacctggt gaccgcgcag ccggaaatgt ttgcgcaccgt agccatctg 1560
cagtgcctgc gcctgagcca taactgcatt agccaggcgg tgaacggcag ccagttctgt 1620
ccgctgaccg gcctgcaggt gctggatctg agccataaca aactggatct gtatcatgaa 1680
catagcttta ccgaactgcc gcgcctgaa gcgctggatc tgagctataa cagccagccg 1740
tttggcatgc agggcgtggg ccataacttt agctttggg cgcatctgcg cacccgtgcg 1800
catctgagcc tggcgcataa caacattcat agccaggtga gccagcagct gtgcagcacc 1860
agcctgcgcg cgctggattt tagcggcaac gcgcgggcc atatgtgggc ggaaggcgat 1920
ctgtatctgc attttttttca gggcctgagc ggcctgattt ggctggatct gagccagaac 1980
cgcctgcata ccctgctgcc gcagaccctg cgcaaccttg cgaaaagcct gcaggtgctg 2040
cgcctgcgcg ataactatct ggcgtttttt aaatggtgga gcctgcattt tctgccgaaa 2100
ctggaagtgc tggatctggc gggcaaccag ctgaaagcgc tgaccaacgg cagcctgccg 2160
gcgggcaccc gcctgcgccg cctggatgtg agctgcaaca gcattagctt tgtggcgccg 2220
ggcttttta gcaaagcgaa agaactgcgc gaactgaacc tgagcgcgaa cgcgctgaaa 2280
accgtggatc atagctggtt tggcccgctg gcgagcgcgc tgcagattct ggatgtgagc 2340
gcgaacccgc tgcattcgc gtgcggcgcg cgtttatgg attttctgct ggaagtgcag 2400
gcggcggtgc cgggcctgcc gagccgcgtg aaatgcggca gcccgggcca gctgcagggc 2460
ctgagcattt ttgcgcagga tctgcgcctg tgcctgatga agcgctgag ctgggattgc 2520
tttgcgctga gcctgctgc ggtggcgctg gcctgatgct gccgatgctg gcatcatctg 2580
tgcggctggg atctgtggta ttgctttcat ctgtgcctgg cgtggctgcc gtggcgcggc 2640
cgccagagcg gccgcgatga agatgcgctg ccgtatgatg cgtttgtggt gtttgataaa 2700
acccagagcg cggtggcgga ttgggtgtat aacgaactgc gcggccagct ggaagaatgc 2760
cgcggccgct gggcgctgcg cctgtgcctg gaagaacgca attggctgcc gggcaaaacc 2820
ctgtttgaaa acctgtgggc gagcgtgtat ggcagccgca aaacctgtt tgtgctggcg 2880
cataccgatc gcgtgagcgg cctgctgcgc gcgagctttc tgctggcgca gcagcgcctg 2940
ctggaagatc gcaaagatgt ggtggtgctg gtgattctga gccgatggg ccgccgagc 3000
cgctatgtgc gcctgcgcca gcgcctgtgc gccagagcg tgctgctgtg gccgcatcag 3060
cgagcggcc agcgcagctt tgggcgcag ctggcatgg cgctgacccg cgataaccat 3120
cattttata accgcaactt tgccagggc ccgcgggca aagggcggat caggcggatc 3180
acccaaatct tgtgacaaaa ctcacacatg cccaccgtgc ccagcacctg aactcctggg 3240
gggaccgtca gtcttcctct tccccccaaa acccaaggac accctcatga tctcccggac 3300
ccctgaggtc acatgcgtgg tggtggacgt gagccacgaa gaccctgagg tcaagttcaa 3360
ctggtacgtg gacggcgtgg aggtgcataa tgccaagaca aagccgcggg aggagcagta 3420
caacagcacg taccgtgtgg tcagcgtcct caccgtcctg caccaggact ggctgaatgg 3480
```

```
caaggagtac aagtgcaagg tctccaacaa agccctccca gccccatcg agaaaaccat   3540
ctccaaagcc aaagggcagc cccgagaacc acaggtgtac accctgcccc catcccggga   3600
ggagatgacc aagaaccagg tcagcctgac ctgcctggtc aaaggcttct atcccagcga   3660
catcgccgtg gagtgggaga gcaatgggca gccggagaac aactacaaga ccacgcctcc   3720
cgtgctggac tccgacggct ccttcttcct ctacagcaag ctcaccgtgg acaagagcag   3780
gtggcagcag gggaacgtct tctcatgctc cgtgatgcat gaggctctgc acaaccacta   3840
cacgcagaag agcctctccc tgtctccggg taaatag                            3877

SEQ ID NO: 5             moltype = DNA  length = 1503
FEATURE                  Location/Qualifiers
source                   1..1503
                         mol_type = other DNA
                         organism = synthetic construct
SEQUENCE: 5
atgaggggca tgaagctgct gggggcgctg ctggcactgg cggccctact gcaggggcc    60
gtgtccatga gcatgctgtt ttataccctg attaccgcgt ttctgattgg cattcaggcg   120
gaaccgcata gcgaaagcaa cgtgccggcg ggccatacca ttccgcaggc gcattggacc   180
aaactgcagc atagcctgga taccgcgctg cgccgcgcgc ggcggcggca                   240
attgcggcgc gcgtggcggg ccagacccgc aacattaccg tggatccgcg cctgttaaa    300
aaacgccgcc tgcgcagccc gcgcgtgctg tttagcaccc agccgccgcg cgaagcgggcg  360
gataccagg atctggattt tgaagtgggc ggcgcggcgc cgtttaaccg cacccatcgc    420
agcaaacgca gcagcagcca tccgattttt catcgccggca aatttagcgt gtgcgatagc  480
gtgagcgtgt gggtgggcga taaaaccacc gcgaccgata ttaaaggcaa agaagtgatg   540
gtgctgggcg aagtgaacat taacaacagc gtgtttaaac agtattttt tgaaaaccaaa   600
tgccgcgatc cgaacccgt ggatagcggc tgccgcggca ttgatagcaa acattggaac    660
agctattgca ccaccacca tacctttgtg aaagcgctga ccatggatgg caaacaggcg   720
gcgtggcgct ttattcgcat tgataccgcg tgcgtgtgcg tgctgagccg caaagcggtg   780
cgccgcgcgg gcggatcagg cggatcaccc aaatcttgtg acaaaactca cacatgccca   840
ccgtgcccag cacctgaact cctgggggga ccgtcagtct tcctcttccc cccaaaaccc   900
aaggacaccc tcatgatctc ccggacccct gaggtcacat gcgtggtggt ggacgtgagc   960
cacgaagacc ctgaggtcaa gttcaactgg tacgtggacg gcgtggaggt gcataatgcc   1020
aagacaaagc cgcgggagga gcagtacaac agcacgtacc gtgtggtcag cgtcctcacc   1080
gtcctgcacc aggactggct gaatggcaag gagtacaagt gcaaggtctc caacaaagcc   1140
ctcccagccc ccatcgagaa aaccatctcc aaagccaaag ggcagccccg agaaccacag   1200
gtgtacaccc tgcccccatc ccgggaggag atgaccaaga accaggtcag cctgacctgc   1260
ctggtcaaag gcttctatcc cagcgacatc gccgtggagt gggagagcaa tgggcagccg   1320
gagaacaact acaagaccac gcctcccgtg ctggactccg acggctcctt cttcctctac   1380
agcaagctca ccgtggacaa gagcaggtgg cagcagggga acgtcttctc atgctccgtg   1440
atgcatgagg ctctgcacaa ccactacacg cagaagagcc tctccctgtc tccgggtaaa   1500
tag                                                                  1503

SEQ ID NO: 6             moltype = DNA  length = 1111
FEATURE                  Location/Qualifiers
source                   1..1111
                         mol_type = other DNA
                         organism = synthetic construct
SEQUENCE: 6
atgaggggca tgaagctgct gggggcgctg ctggcactgg cggccctact gcaggggcc    60
gtgtccatgg cgctgtggat gcgcctgctg ccgctgctgg cgctgctggc gctgtgggc   120
ccggatccgg cggcggcgtt tgtgaaccag catctgtgcg gcagccatct ggtggaagcg   180
ctgtatctgg tgtgcggcga acgcggcttt ttttataccc cgaaaacccg ccgcgaagcg   240
gaagatctgc aggtgggcca ggtggaactg gcggcggcc cgggcgcggg cagcctgcag   300
ccgctggcgc tggaaggcag cctgcagaaa cgcggcattg tggaacagtg ctgcaccagc   360
atttgcagcc tgtatcagct ggaaaactat gcaacgggc ggatcaggcg gatcacccaa   420
atcttgtgac aaaactcaca catgcccacc gtgcccagca cctgaactcc tggggggacc   480
gtcagtcttc ctcttccccc caaaacccaa ggacaccctc atgatctccc ggacccctga   540
ggtcacatgc gtggtggtgg acgtgagcca cgaagaccct gaggtcaagt tcaactggta   600
cgtggacggc gtggaggtgc ataatgccaa gacaaagccg cgggaggagc agtacaacag   660
cacgtaccgt gtggtcagcg tcctcaccgt cctgcaccag gactggctga atggcaagga   720
gtacaagtgc aaggtctcca acaaagccct cccagccccc atcgagaaaa ccatctccaa   780
agccaagggg cagcccgag aaccacaggt gtacaccctg cccccatccc gggaggagat   840
gaccaagaac caggtcagcc tgacctgcct ggtcaaaggc ttctatccca gcgacatcgc   900
cgtggagtgg gagagcaatg gcagccgga gaacaactac aagaccacgc tcccgtgct   960
ggactccgac ggctccttct tcctctacag caagctcacc gtggacaaga gcaggtggca   1020
gggggaac gtcttctcat gctccgtgat gcatgaggct ctgcacaacc actacacgca   1080
gaagagcctc tccctgtctc cgggtaaata g                                   1111

SEQ ID NO: 7             moltype = DNA  length = 7421
FEATURE                  Location/Qualifiers
source                   1..7421
                         mol_type = other DNA
                         organism = synthetic construct
SEQUENCE: 7
ttctagaata atcaacctct ggattacaaa atttgtgaaa gattgactgg tattcttaac    60
tatgttgctc cttttacgct atgtggatac gctgctttaa tgcctttgta tcatgctatt   120
gcttcccgta tggctttcat tttctcctcc ttgtataaat cctggttgct gtctctttat   180
gaggagttgt ggcccgttgt caggcaacgt ggcgtggtgt gcactgtgtt tgctgacgca   240
accccactgg ttgggcat tgccaccacc tgtcagctcc tttccgggac tttcgctttc     300
cccctcccta ttgccacggc ggaactcatc gccgcctgcc ttgcccgctg ctggacaggg   360
```

```
gctcggctgt tgggcactga caattccgtg gtgttgtcgg ggaaatcatc gtcctttcct   420
tggctgctcg cctgtgttgc cacctggatt ctgcgcggga cgtccttctg ctacgtccct   480
tcggccctca atccagcgga ccttccttcc cgcggcctgc tgccggctct gcggcctctt   540
ccgcgtcttc gccttcgccc tcagacgagt cggatctccc tttgggccgc ctccccgcct   600
aagcttatcg ataccgtcga gatctaactt gtttattgca gcttataatg gttacaaata   660
aagcaatagc atcacaaatt tcacaaataa agcattttt  tcactgcatt ctagttgtgg   720
tttgtccaaa ctcatcaatg tatcttatca tgtctggatc tcgacctcga ctagagcatg   780
gctacgtaga taagtagcat ggcgggttaa tcattaacta caaggaaccc ctagtgatgg   840
agttggccac tccctctctg cgcgctcgct cgctcactga ggccgggcga ccaaaggtcg   900
cccgacgccc gggctttgcc cgggcggcct cagtgagcga gcgagcgcgc cagctggcgt   960
aatagcgaag aggcccgcac cgatcgccct tcccaacagt tgcgcagcct gaatggcgaa  1020
tggaattcca gacgattgag cgtcaaaatg taggtatttc catgagcgtt tttcctgttg  1080
caatggctgg cggtaatatt gttctggata ttaccagcaa ggccgatagt ttgagttctt  1140
ctactcaggc aagtgatgtt attactaatc aaagaagtat tgcgacaacg gttaatttgc  1200
gtgatggaca gactctttta ctcggtggcc tcactgatta taaaaacact tctcaggatt  1260
ctggcgtacc gttcctgtct aaaatccctt taatcggcct cctgtttagc tcccgctctg  1320
attctaacga ggaaagcacg ttatacgtgc tcgtcaaagc aaccatagta cgcgccctgt  1380
agcggcgcat taagcgcggc gggtgtggtg gttacgcgca gcgtgaccgc tacacttgcc  1440
agcgccctag cgcccgctcc tttcgctttc ttcccttcct ttctcgccac gttcgccggc  1500
tttccccgtc aagctctaaa tcgggggctc cctttagggt tccgatttag tgctttacgg  1560
cacctcgacc ccaaaaaact tgattagggt gatggttcac gtagtgggcc atcgccctga  1620
tagacggttt ttcgcccttt gacgttggag tccacgttct ttaatagtgg actcttgttc  1680
caaactggaa caacactcaa ccctatctcg gtctattctt ttgatttata agggattttg  1740
ccgatttcgg cctattggtt aaaaaatgag ctgatttaac aaaaatttaa cgcgaatttt  1800
aacaaaatat taacgtttac aatttaaata tttgcttata caatcttcct gttttggggg  1860
cttttctgat tatcaaccgg ggtacatatg attgacatgc tagttttacg attaccgttc  1920
atcgattctc ttgtttgctc cagactctca ggcaatgacc tgatagcctt tgtagagacc  1980
tctcaaaaat agctaccctc tccggcatga atttatcagc tagaacggtt gaatatcata  2040
ttgatggtga tttgactgtc tccggccttt ctcacccgtt tgaatcttta cctacacatt  2100
actcaggcat tgcatttaaa atatatgagg gttctaaaaa tttttatcct tgcgttgaaa  2160
taaaggcttc tcccgcaaaa gtattacagg gtcataatgt ttttggtaca accgatttag  2220
ctttatgctc tgaggcttta ttgcttaatt ttgctaattc tttgccttgc ctgtatgatt  2280
tattggatgt tggaattcct gatgcggtat tttctcctta cgcatctgtg cggtatttca  2340
caccgcatat ggtgcactct cagtacaatc tgctctgatg ccgcatagtt aagccagccc  2400
cgacacccgc caacacccgc tgacgcgccc tgacgggctt gtctgctccc ggcatccgct  2460
tacagacaag ctgtgaccgt ctccgggagc tgcatgtgtc agaggttttc accgtcatca  2520
ccgaaacgcg cgagacgaaa gggcctcgtg atacgcctat ttttataggt taatgtcatg  2580
ataataatgg tttcttagac gtcaggtggc acttttcggg gaaatgtgcg cggaacccct  2640
atttgtttat ttttctaaat acattcaaat atgtatccgc tcatgagaca ataaccctga  2700
taaatgcttc aataatattg aaaaaggaag agtatgagta ttcaacattt ccgtgtcgcc  2760
cttattccct ttttttgcggc attttgcctt cctgtttttg ctcacccaga aacgctggtg  2820
aaagtaaaag atgctgaaga tcagttgggt gcacgagtgg gttacatcga actggatctc  2880
aacagcggta agatcttga gagttttcgc cccgaagaac gttttccaat gatgagcact  2940
tttaaagttc tgctatgtgg cgcggtatta tccgtattg acgccgggca agagcaactc  3000
ggtcgccgca tacactattc tcagaatgac ttggttgagt actcaccagt cacagaaaag  3060
catcttacgg atggcatgac agtaagagaa ttatgcagtg ctgccataac catgagtgat  3120
aacactgcgg ccaacttact tctgacaacg atcggaggac cgaaggagct aaccgctttt  3180
ttgcacaaca tgggggatca tgtaactcgc cttgatcgtt gggaaccgga gctgaatgaa  3240
gccataccaa acgacgagcg tgacaccacg atgcctgtag caatggcaac aacgttgcgc  3300
aaactattaa ctggcgaact acttactcta gcttcccggc aacaattaat agactggatg  3360
gaggcggata aagttgcagg accacttctg cgctcggccc ttccggctgg ctggtttatt  3420
gctgataaat ctggagccgg tgagcgtggg tctcgcggta tcattgcagc actggggcca  3480
gatggtaagc cctcccgtat cgtagttatc tacacgacgg ggagtcaggc aactatggat  3540
gaacgaaata gacagatcgc tgagataggt gcctcactga ttaagcattg gtaactgtca  3600
gaccaagttt actcatatat actttagatt gatttaaaac ttcatttta atttaaaagg  3660
atctaggtga agatcctttt tgataatctc atgaccaaaa tcccttaacg tgagttttcg  3720
ttccactgag cgtcagaccc cgtagaaaag atcaaaggat cttcttgaga tcctttttt  3780
ctgcgcgtaa tctgctgctt gcaaacaaaa aaaccaccgc taccagcggt ggtttgtttg  3840
ccggatcaag agctaccaac tctttttccg aaggtaactg gcttcagcag agcgcagata  3900
ccaaatactg tccttctagt gtagccgtag ttaggccacc acttcaagaa ctctgtagca  3960
ccgcctacat acctcgctct gctaatcctg ttaccagtgg ctgctgccag tggcgataag  4020
tcgtgtctta ccgggttgga ctcaagacga tagttaccgg ataaggcgca gcggtcgggc  4080
tgaacggggg gttcgtgcac acagcccagc ttggagcgaa cgacctacac cgaactgaga  4140
tacctacagc gtgagctatg agaaagcgcc acgcttcccg aagggagaaa ggcggacagg  4200
tatccggtaa gcggcagggt cggaacagga gagcgcacga gggagcttcc agggggaaac  4260
gcctggtatc tttatagtcc tgtcgggttt cgccacctct gacttgagcg tcgatttttg  4320
tgatgctcgt caggggggcg gagcctatgg aaaaacgcca gcaacgcggc ctttttacgg  4380
ttcctggcct tttgctggcc ttttgctcac atgttctttc ctgcgttatc ccctgattct  4440
gtggataacc gtattaccgc ctttgagtga gctgataccg ctcgccgcag ccgaacgacc  4500
gagcgcagcg agtcagtgag cgaggaagcg gaagagcgcc caatacgcaa accgcctctc  4560
cccgcgcgtt ggccgattca ttaatgcagc agctgcgcgc tcgctcgctc actgaggccg  4620
cccgggcaaa gcccgggcgt cgggcgacct ttggtcgccc ggcctcagtg agcgagcgag  4680
cgcgcagaga gggagtggcc aactccatca ctaggggttc cttgtagtta atgattaacc  4740
cgcatgcta cttatctacg tagccatgct ctaggacatt gattattgac tagtggagtt  4800
ccgcgttaca taacttacgg taaatggccc gcctggctga ccgcccaacg acccccgccc  4860
attgacgtca ataatgacgt atgttcccat agtaacgcca ataggactt tccattacg   4920
tcaatgggtg gagtatttac ggtaaactgc ccacttggca gtacatcaag tgtatcatat  4980
gccaagtacg cccctattg acgtcaatga cggtaaatgg cccgcctggc attatgccca  5040
gtacatgacc ttatgggact ttcctacttg gcagtacatc tacgtattag tcatcgctat  5100
```

```
taccatggtc gaggtgagcc ccacgttctg cttcactctc ccatctccc cccctcccc    5160
acccccaatt ttgtatttat ttatttttta attattttgt gcagcgatgg gggcggggg    5220
ggggggggc gcgcgccagg cggggcgggg cgggcgagg ggcggggcgg ggcgaggcgg    5280
agaggtgcgg cggcagccaa tcagagcggc gcgctccgaa agtttcctt tatggcgagg    5340
cggcggcggc ggcggcccta taaaaagcga agcgcgcggc gctgcgcgc               5400
tgccttcgcc ccgtgcccg ctccgccgcc gcctcgcgcc gcccgcccg gctctgactg    5460
accgcgttac taaaacaggt aagtccggcc tccgcgccgg gttttggcgc ctcccgcggg   5520
cgccccctc ctcacggcga gcgctgccac gtcagacgaa gggcgcagcg agcgtcctga    5580
tccttccgcc cggacgctca ggacagcggc ccgctgctca taagactcgg ccttagaacc    5640
ccagtatcag cagaaggaca ttttaggacg ggacttgggt gactctaggg cactggtttt    5700
ctttccagag agcggaacag gcgaggaaaa gtagtcccctt ctcggcgatt ctgcggaggg   5760
atctccgtgg ggcggtgaac gccgatgatg cctctactaa ccatgttcat gttttcttt    5820
tttttctaca ggtcctgggt gacgaacagg gtaccgccac catgagggc atgaagctgc    5880
tgggggcgct gctggcactg gcggcccta c tgcagggggc cgtgtccctg aagatcgcag   5940
ccttcaacat ccagacattt ggggagacca agatgtccaa tgccaccctc gtcagctaca    6000
ttgtgcagat cctgagccgc tatgacatcg ccctggtcca ggaggtcaga gacagccacc    6060
tgactgccgt ggggaagctg ctggacaacc tcaatcagga tgcaccagac acctatcact    6120
acgtggtcag tgagccactg ggacggaaca gctataagga gcgctacctg ttcgtgtaca    6180
ggcctgacca ggtgtctgcg gtggacagct actactacga tgatggctgc gagccctgcg    6240
ggaacgacac cttcaaccga gagccagcca ttgtcaggtt cttctcccgg ttcacagagg    6300
tcagggagtt tgccattgtt cccctgcatg cggccccggg ggacgcagta gccgagatcg    6360
actctctcta tgacgtctac tggatgtcc aagagaaatg gagctcatgt                 6420
tgatgggcga cttcaatgcg ggctgcagct atgtgagacc ctcccagtgg tcatccatcc    6480
gcctgtggac aagccccacc ttccagtggc tgatccccga cagcgctgac accacagcta    6540
cacccacgca ctgtgcctat gacaggatcg tggttcagg gatgctgctc cgaggcgccc    6600
ttgttcccga ctcggctctt cccttaact tccaggctgc ctatgcctg agtgaccaac    6660
tggcccaagc catcagtgac cactatccag tggaggtgat gctgaagggc ggatcaggcc    6720
gatcacccaa atcttgtgac aaaactcaca catgcccacc gtgcccagca cctgaactcc    6780
tggggggacc gtcagtcttc ctcttccccc caaaacccaa ggacaccctc atgatctccc    6840
ggaccctga ggtcacatgc gtggtggtgg acgtgagcca cgaagaccct gaggtcaagt    6900
tcaactggta cgtggacggc gtggaggtgc ataatgccaa gacaaagccg cgggaggagc    6960
agtacaacag cacgtaccgt gtggtcagcg tcctcaccgt cctgcaccag gactggctga    7020
atggcaagga gtacaagtgc aaggtctcca acaaagcct cccagccccc atcgagaaaa    7080
ccatctccaa agccaaaggg cagccccgag aaccacaggt gtacaccctg ccccatccc    7140
gggaggagat gaccaagaac caggtcagcc tgacctgcct ggtcaaaggc ttctatccca    7200
gcgacatcgc cgtggagtgg gagagcaatg ggcagccgga gaacaactac aagaccacgc    7260
ctcccgtgct ggactccgac ggctccttct tcctctacag caagctcacc gtggacaaga    7320
gcaggtggca gcagggaac gtcttctcat gctccgtgat gcatgaggct ctgcacaacc    7380
actacacgca gaagagcctc tccctgtctc cgggtaaata g                       7421

SEQ ID NO: 8            moltype = DNA   length = 9284
FEATURE                 Location/Qualifiers
source                  1..9284
                        mol_type = other DNA
                        organism = synthetic construct
SEQUENCE: 8
ttctagaata atcaacctct ggattacaaa atttgtgaaa gattgactgg tattcttaac     60
tatgttgctc cttttacgct atgtggatac gctgctttaa tgcctttgta tcatgctatt    120
gcttcccgta tggctttcat tttctcctcc ttgtataaat cctggttgct gtctctttat    180
gaggagttgg ggcccgttgt caggcaacgt ggcgtggtgt gcactgtgtt tgctgacgca    240
accccccgtt gggggcat tgccaccacc tgtcagctcc tttccgggac tttcgctttc    300
ccctcccta ttgccacggc ggaactcatc gccgcctgcc ttgcccgctg ctggacaggg    360
gctcggctgt tgggcactga caattccgtg tgttgtcgg ggaaatcatc gtcctttcct    420
tggctgctcg cctgtgttgc cacctggatt ctgcgcggga cgtccttctg ctacgtccct    480
tcggccctca atccagcgga ccttccttcc cgcggcctgc tgccggctct gcggcctctt    540
ccgcgtcttc gccttcgccc tcagacgagt cggatctccc tttgggccgc ctccccgcct    600
aagcttatcg ataccgtcga gatcaactt gttattgca gcttataatg gttacaaata    660
aagcaatagc atcacaaatt tcacaaataa agcatttttt tcactgcatt ctagttgtgg    720
tttgtccaaa ctcatcaatg tatcttatca tgtctggatc tcgacctcga ctagagcatg    780
gctacgtaga taagtagcat ggcgggttaa tcattaacta caaggaaccc ctagtgatgg    840
agttggccac tccctctctg cgcgctcgct cgctcactga gccgggcga ccaaaggtcg    900
cccgacgccc gggctttgcc cggcggcct cagtgagcga gcgagcgcgc cagctggcgt    960
aatagcgaag aggcccgcac cgatcgccct tcccaacagt tgcgcagcct gaatggcgaa    1020
tggaattcca gacgattgag cgtcaaaatg taggtatttc catgagcgtt ttcctgtcc    1080
caatggctgg cggtaatatt gttctggata ttaccagcaa ggccgatagt ttgagttctt    1140
ctactcaggc aagtgatgtt attactaatc aagaagtat tgcgacaacg gttaatttgc    1200
gtgatggaca gactctttta ctcggtggcc tcactgatta taaaaacact ctcaggatt    1260
ctggcgtacc gttcctgtct aaaatccctt taatcggcct cctgtttagc tcccgctctg    1320
attctaacga ggaaagcacg ttatacgtgc tcgtcaaagc aaccatagta cgcgccctgt    1380
agcggcgcat taagcgcggc gggtgtggtg gttacgcgca gcgtgaccgc tacacttgcc    1440
agcgccctag cgcccgctcc tttcgctttc ttcccttcct ttctcgccac gttcgccggc    1500
tttccccgtc aagctctaaa tcgggggctc cctttagggt tccgatttag tgctttacgg    1560
cacctcgacc ccaaaaaact tgattagggt gatggttcac gtagtgggcc atcgccctga    1620
tagacggttt ttcgcccttt gacgttggag tccacgttct ttaatagtgg actcttgttc    1680
caaactggaa caacactcaa ccctatctcg gtcattctt ttgatttata agggattttg    1740
ccgatttcgg cctattggtt aaaaaatgag ctgatttaac aaaaatttaa cgcgaatttt    1800
aacaaaatat taacgtttac aatttaaata tttgcttata caatcttcct gttttggg    1860
cttttctgat tatcaaccgg ggtacatatg attgacatgc tagttttacg attaccgttc    1920
atcgattctc ttgtttgctc cagactctca ggcaatgacc tgatagcctt tgtagagacc    1980
```

```
tctcaaaaat agctaccctc tccggcatga atttatcagc tagaacggtt gaatatcata  2040
ttgatggtga tttgactgtc tccggccttt ctcacccgtt tgaatcttta cctacacatt  2100
actcaggcat tgcatttaaa atatatgagg gttctaaaaa tttttatcct tgcgttgaaa  2160
taaaggcttc tcccgcaaaa gtattacagg gtcataatgt ttttggtaca accgatttag  2220
ctttatgctc tgaggcttta ttgcttaatt ttgctaattc tttgccttgc ctgtatgatt  2280
tattggatgt tggaattcct gatgcggtat tttctcctta cgcatctgtg cggtatttca  2340
caccgcatat ggtgcactct cagtacaatc tgctctgatg ccgcatagtt aagccagccc  2400
cgacacccgc caacacccgc tgacgcgccc tgacgggctt gtctgctccc ggcatccgct  2460
tacagacaag ctgtgaccgt ctccgggagc tgcatgtgtc agaggttttc accgtcatca  2520
ccgaaacgcg cgagacgaaa gggcctcgtg atacgcctat ttttataggt taatgtcatg  2580
ataataatgg tttcttagac gtcaggtggc acttttcggg gaaatgtgcg cggaacccct  2640
atttgtttat ttttctaaat acattcaaat atgtatccgc tcatgagaca ataaccctga  2700
taaatgcttc aataatattg aaaaaggaag agtatgagta ttcaacattt ccgtgtcgcc  2760
cttattcccct tttttgcggc attttgcctt cctgttttttg ctcacccaga aacgctggtg  2820
aaagtaaaag atgctgaaga tcagttgggt gcacgagtgg gttacatcga actggatctc  2880
aacagcggta agatccttga gagttttcgc cccgaagaac gttttccaat gatgagcact  2940
tttaaagttc tgctatgtgg cgcggtatta tcccgtattg acgccgggca agagcaactc  3000
ggtcgccgca tacactattc tcagaatgac ttggttgagt actcaccagt cacagaaaag  3060
catcttacgg atggcatgac agtaagagaa ttatgcagtg ctgccataac catgagtgat  3120
aacactgcgg ccaacttact tctgacaacg atcggaggac cgaaggagct aaccgctttt  3180
ttgcacaaca tgggggatca tgtaactcgc cttgatcgtt gggaaccgga gctgaatgaa  3240
gccataccaa acgacgagcg tgacaccacg atgcctgtag caatggcaac aacgttgcgc  3300
aaactattaa ctggcgaact acttactcta gcttcccggc aacaattaat agactggatg  3360
gaggcggata aagttgcagg accacttctg cgctcggccc ttccggctgg ctggtttatt  3420
gctgataaat ctggagccgg tgagcgtggg tctcgcggta tcattgcagc actggggcca  3480
gatggtaagc cctcccgtat cgtagttatc tacacgacgg ggagtcaggc aactatggat  3540
gaacgaaata gacagatcgc tgagataggt gcctcactga ttaagcattg gtaactgtca  3600
gaccaagttt actcatatat actttagatt gatttaaaac ttcatttttta atttaaaagg  3660
atctaggtga agatccttttt tgataatctc atgaccaaaa tcccttaacg tgagttttcg  3720
ttccactgag cgtcagaccc cgtagaaaag atcaaaggat cttcttgaga tccttttttt  3780
ctgcgcgtaa tctgctgctt gcaaacaaaa aaaccaccgc taccagcggt ggtttgtttg  3840
ccggatcaag agctaccaac tctttttccg aaggtaactg gcttcagcag agcgcagata  3900
ccaaatactg tccttctagt gtagccgtag ttaggccacc acttcaagaa ctctgtagca  3960
ccgcctacat acctcgctct gctaatcctg ttaccagtgg ctgctgccag tggcgataag  4020
tcgtgtctta ccgggttgga ctcaagacga tagttaccgg ataaggcgca gcggtcgggc  4080
tgaacggggg gttcgtgcac acagcccagc ttggagcgaa cgacctacac cgaactgaga  4140
tacctacagc gtgagctatg agaaagcgcc acgcttcccg aagggagaaa ggcggacagg  4200
tatccggtaa gcggcagggt cggaacagga gagcgcacga gggagcttcc agggggaaac  4260
gcctggtatc tttatagtcc tgtcgggttt cgccacctct gacttgagcg tcgatttttg  4320
tgatgctcgt caggggggcg gagcctatgg aaaaacgcca gcaacgcggc ctttttacgg  4380
ttcctggcct tttgctggcc ttttgctcac atgttctttc ctgcgttatc ccctgattct  4440
gtggataacc gtattaccgc ctttgagtga gctgataccg ctcgccgcag ccgaacgacc  4500
gagcgcagcg agtcagtgag cgaggaagcg gaagagcgcc caatacgcaa accgcctctc  4560
cccgcgcgtt ggccgattca ttaatgcagc agctgcgcgc tcgctcgctc actgaggccg  4620
cccgggcaaa gcccgggcgt cgggcgacct ttggtcgccc ggcctcagtg agcgagcgag  4680
cgcgcagaga gggagtggcc aactccatca ctaggggttc cttgtagtta atgattaacc  4740
cgcgactgcta cttatctacg tagccatgct ctaggacatt gattattgac tagtggagtt  4800
ccgcgttaca taacttacgg taaatgcccc gcctggctga ccgcccaacg accccccgcc  4860
attgacgtca ataatgacgt atgttccat agtaacgcca atagggactt tccattgacg  4920
tcaatgggtg gagtatttac ggtaaactgc ccacttggca gtacatcaag tgtatcatat  4980
gccaagtacg cccctattg acgtcaatga cggtaaatgg cccgcctggc attatgccca  5040
gtacatgacc ttatgggact ttcctacttg gcagtacatc tacgtattag tcatcgctat  5100
taccatggtc gaggtgagcc ccacgttctg cttcactctc cccatctccc ccccctcccc  5160
acccccaatt ttgtatttat ttattttta attatttttgt gcagcgatgg gggcgggggg  5220
gggggggc gcgcgccagg cggggcgggg cggggcgagg ggcggggcgg ggcgaggcgg  5280
agaggtgcgg cggcagccaa tcagagcggc gcgctccgaa agtttccttt tatggcgagg  5340
cggcggcggc ggcggcccta taaaaagcga agcgcgcggc gggcgggagt cgctgcgcgc  5400
tgccttcgcc ccgtgcccg ctccgccgcc gcctcgcgcc gcccgccccg gctctgactg  5460
accgcgttac taaaacaggt aagtccggcc tccgcgccgg gttttggcgc ctcccgcggg  5520
cgcccccctc ctcacggcga gcgctgccac gtcagacgaa gggcgcagcg agcgtcctga  5580
tccttccgcc cggacgctca ggacagcggc ccgctgctca taagactcgg ccttagaacc  5640
ccagtatcag cagaaggaca tttaggacg gacttgggt gactctaggg cactggtttt  5700
ctttccagag agcggaacag gcgaggaaaa gtagtcccctt ctcggcgatt ctgcggaggg  5760
atctccgtgg ggcggtgaac gccgatgatg cctctactaa ccatgttcat gttttctttt  5820
tttttctaca ggtcctgggt gacgaacagg gtaccgccac cgccagaccc tgccgtgcat  5880
ttatttttgg ggcggcctgc tgccgtttgg catgctgtgc gcgagcagca ccaccaaatg  5940
caccgtgagc catgaagtgg cggattcag ccatctgaaa ctgacccagg tgccggatga  6000
tctgccgacc aacattaccg tgctgaacct gacccataac cagctgcgcc gcctgccggc  6060
ggcgaacttt acccgctata gccagctgac ctgggcttta acaccattag  6120
caaactggaa ccggaactgt gccagaaact gccgatgctg aaagtgctga acctgcagca  6180
taacgaactg agccagctga gcgataaaac ctttgcgttt gcaccaacc tgaccgaact  6240
gcatctgatg agcaacagca ttcagaaaat taaaaacaac ccgttgtga aacagaaaaa  6300
cctgattacc ctggatctga gccataacgg cctgagcagc accaaactgg gcacccaggt  6360
gcagctggaa aacctgcagg aactgctgct gagcaacaac agcaacctga cgctgaaag  6420
cgaagaactg gatattttttg gaacagcag cctgaaaaaa ctggaactga gcagcaacca  6480
gattaaagaa tttagcccgg gctgctttca tgcgattggc cgcctgtttg gcctgttctt  6540
gaacaacgtg cagctgggcc cgagcctgac cgaaaaactg tgcctggaac tggcgaacac  6600
cagcattcgc aacctgagcc tgagcaacag ccagctgagc accaccagca caccaccttt  6660
tctgggcctg aaatggacca acctgaccat gctggatctg agctataaca acctgaacgt  6720
```

```
ggtgggcaac gatagctttg cgtggctgcc gcagctggaa tattttttc tggaatataa   6780
caacattcag catctgttta gccatagcct gcatggcctg tttaacgtgc gctatctgaa   6840
cctgaaacgc agctttacca aacagagcat tagcctggcg agcctgccga aaattgatga   6900
ttttagcttt cagtggctga aatgcctgga acatctgaac atggaagata acgatattcc   6960
gggcattaaa agcaacatgt ttaccggcct gattaacctg aaatatctga gcctgagcaa   7020
cagctttacc agcctgcgca ccctgaccaa cgaaacctt gtgagcctgg cgcatagccc   7080
gctgcatatt ctgaacctga ccaaaaacaa aattagcaaa attgaaagcg atgcgtttag   7140
ctggctgggc catctggaag tgctggatct gggcctgaac gaaattggcc aggaactgac   7200
cggccaggaa tggcgcggcc tggaaaacat ttttgaaatt tatctgagct ataacaaata   7260
tctgcagctg acccgcaaca gctttgcgct ggtgccgagc ctgcagcgcc tgatgctgca   7320
ccgcgtggcg ctgaaaaacg tggatagcag cccgagcccg tttcagccgc tgcgcaacct   7380
gaccattctg gatctgagca caacaacat tgcgaacatt aacgatgata tgctggaagg   7440
cctggaaaaa ctggaaattc tggatctgca gcataacaac ctggcgcgcc tgtgaaaca   7500
tgcgaacccg ggcggcccga tttattttct gaaaggcctg agccatctgc atattctgaa   7560
cctgaaaagc aacggctttg atgaaattcc ggtggaagtg tttaaagatc tgtttgaact   7620
gaaaattatt gatctgggcc tgaacaacct gaacaccctg ccggcgagcg tgtttaacaa   7680
ccaggtgagc ctgaaaagcc tgaacctgca gaaaacctg attaccagcg tggaaaaaaa   7740
agtgttttggc ccggcgtttc gcaacctgac cgaactggat atgcgcttta acccgtttga   7800
ttgcacctgc gaaagcattg cgtggtttgt gaactggatt aacgaaaccc ataccaacat   7860
tccggaactg agcagccatt atctgtgcaa caccccgccg cattatcatg gctttccggt   7920
gcgcctgttt gataccagca gctgcaaaga tagcgcgccg tttgaactgt tttttatgat   7980
taacaccagc attctgctga tttttatttt tattgtgctg ctgattcatt tgaaggctg    8040
gcgcattagc ttttattgga acgtgagcgt gcatcgcgtg ctgggcttta agaaaattga   8100
tcgccagacc gaacagtttg aatatgcggc gtatattatt catgcgtata agataaaga   8160
ttgggtgtgg gaacattta gcagcatgga aaaagaagat cagagcctga attttgcct     8220
ggaagaacgc gattttgaag cgggcgtgtt tgaactgtga acgattgtga acagcattaa   8280
acgcagccgc aaaattattt ttgtgattac ccatcatctg ctgaaagatc cgctgtgcaa   8340
acgctttaaa gtgcatcatg cggtgcagca ggcgattgaa cagaacctgg atagcattat   8400
tctggtgttt ctgaagaaa ttccggatta taaactgaac catgcgctgt gcctgcgccg    8460
cggcatgttt aaaagccatt gcattctgaa ctggccggtg cagaaagaac gcattggcgc   8520
gtttcgccat aaactgcagg tggcgctggg cagcaaaaac agcgtgcatg ggcggatcag    8580
gcggatcacc caaatcttgt gacaaaactc acacatgccc accgtgccca gcacctgaac   8640
tcctggggggg accgtcagtc ttcctcttcc ccccaaaacc caaggacacc ctcatgatct   8700
cccggacccc tgaggtcaca tgcgtggtgg tggacgtgag ccacgaagac cctgaggtca   8760
agttcaactg gtacgtggac ggcgtggagg tgcataatgc caagacaaag ccgcgggagg   8820
agcagtacaa cagcacgtac cgtgtggtca gcgtcctcac cgtcctgcac caggactggc   8880
tgaatggcaa ggagtacaag tgcaaggtct ccaacaaagc cctcccagcc cccatcgaga   8940
aaaccatctc caaagccaaa gggcagcccc gagaaccaca ggtgtacacc ctgccccat    9000
cccgggagga gatgaccaag aaccaggtca gcctgacctg cctggtcaaa ggcttctatc   9060
ccagcgacat cgccgtggag tgggagagca atgggcagcc ggagaacaac tacaagacca   9120
cgcctcccgt gctggactcc gacggctcct tcttcctcta cagcaagctc accgtggaca   9180
agagcaggtg gcagcagggg aacgtcttct catgctccgt gatgcatgag gctctgcaca   9240
accactacac gcagaagagc ctctccctgt ctccgggtaa atag                    9284
```

SEQ ID NO: 9        moltype = DNA  length = 9738
FEATURE              Location/Qualifiers
source               1..9738
                      mol_type = other DNA
                      organism = synthetic construct
SEQUENCE: 9

```
ttctagaata atcaacctct ggattacaaa atttgtgaaa gattgactgg tattcttaac     60
tatgttgctc ctttttacgct atgtggatac gctgctttaa tgcctttgta tcatgctatt   120
gcttcccgta tggctttcat tttctcctcc ttgtataaat cctggttgct gtctctttat   180
gaggagttgt ggcccgttgt caggcaacgt ggcgtggtgt gcactgtgtt tgctgacgca   240
accccactg gttgggcat tgccaccacc tgtcagctcc tttccgggac tttcgctttc      300
cccctcccta ttgccacggc ggaactcatc gccgcctgcc ttgcccgctg ctggacaggg   360
gctcggctgt tgggcactga caattccgtg gtgttgtcgg ggaaatcatc gtcctttcct   420
tggctgctcg cctgtgttgc cacctggatt ctgcgcggga cgtccttctg ctacgtccct   480
tcggccctca atccagcgga ccttccttcc cgcggcctgc tgccggctct gcggcctctt   540
ccgcgtcttc gccttcgccc tcagacgagt cggatctccc tttgggccgc ctccccgcct   600
aagcttatcg ataccgtcga gatcaacttc gttattgca gcttataatg gttacaaata    660
aagcaatagc atcacaaatt tcacaaataa agcattttt tcactgcatt ctagttgtgg    720
tttgtccaaa ctcatcaatg tatcttatca tgtctggatc tcgacctcga ctagagcatg   780
gctacgtaga taagtagcat ggcgggttaa tcattaacta caaggaaccc tagtgatgg    840
agttggccac tccctctctg cgcgctcgct cgctcactga ggccgggcga ccaaaggtcg   900
cccgacgccc gggctttgcc cggcggcct cagtgagcga gcgagcgcgc cagctggcgt    960
aatagcgaag aggcccgcac cgatcgccct tcccaacagt tgcgcagcct gaatggcgaa  1020
tggaattcca gacgattgag cgtcaaaatg taggtatttc catgagcgtt tttcctgttg  1080
caatggctgg cggtaatatt gttctggata taccagcaa ggccgatagt ttgagttctt   1140
ctactcaggc aagtgatgtt attactaatc aaagaagtat tgcgacaacg gttaatttgc  1200
gtgatggaca gactctttta ctcggtggcc tcactgatta aaaaacact tctcaggatt   1260
ctggcgtacc gttcctgtct aaaatccctt taatcggcct cctgtttagc tcccgctctg  1320
attctaacga ggaaagcacg ttatacgtgc tcgtcaaagc aaccatagta cgcgccctgt  1380
agcggcgcat taagcgcggc gggtgtggtg gttacgcgca gcgtgaccgc tacacttgcc  1440
agcgccctag cgcccgctcc tttcgctttc ttccttcct ttctcgccac gttcgccggc    1500
tttccccgtc aagctctaaa tcgggggctc cctttagggt tccgatttag tgctttacgg  1560
cacctcgacc ccaaaaaact tgattagggt gatggttcac gtagtgggcc atcgccctga  1620
tagacggttt ttcgcccttt gacgttggag tccacgttct ttaatagtgg actcttgttc  1680
caaactggaa caacactcaa ccctatctcg gtctattctt ttgatttata agggattttg  1740
```

```
ccgatttcgg cctattggtt aaaaaatgag ctgatttaac aaaaatttaa cgcgaatttt   1800
aacaaaatat taacgtttac aatttaaata tttgcttata caatcttcct gttttgggg    1860
cttttctgat tatcaaccgg ggtacatatg attgacatgc tagttttacg attaccgttc   1920
atcgattctc ttgtttgctc cagactctca ggcaatgacc tgatagcctt tgtagagacc   1980
tctcaaaaat agctaccctc tccggcatga atttatcagc tagaacggtt gaatatcata   2040
ttgatggtga tttgactgtc tccggccttt ctcacccgtt tgaatcttta cctacacatt   2100
actcaggcat tgcatttaaa atatatgagg gttctaaaaa tttttatcct tgcgttgaaa   2160
taaaggcttc tcccgcaaaa gtattacagg gtcataatgt ttttggtaca accgatttag   2220
cttttatgctc tgaggcttta ttgcttaatt ttgctaattc tttgccttgc ctgtatgatt   2280
tattggatgt tggaattcct gatgcggtat tttctcctta cgcatctgtg cggtatttca   2340
caccgcatat ggtgcactct cagtacaatc tgctctgatg ccgcatagtt aagccagccc   2400
cgacacccgc caacacccgc tgacgcgccc tgacgggctt gtctgctccc ggcatccgct   2460
tacagacaag ctgtgaccgt ctccgggagc tgcatgtgtc agaggttttc accgtcatca   2520
ccgaaacgcg cgagacgaaa gggcctcgtg atacgcctat ttttataggt taatgtcatg   2580
ataataatgg tttcttagac gtcaggtggc acttttcggg gaaatgtgcg cggaacccct   2640
atttgtttat ttttctaaat acattcaaat atgtatccgc tcatgagaca ataaccctga   2700
taaatgcttc aataatattg aaaaaggaag agtatgagta ttcaacattt ccgtgtcgcc   2760
cttattccct tttttgcggc attttgcctt cctgtttttg ctcacccaga aacgctggtg   2820
aaagtaaaag atgctgaaga tcagttgggg gcacgagtgg gttacatcga actggatctc   2880
aacagcggta agatccttga gagttttcgc cccgaagaac gttttccaat gatgagcact   2940
tttaaagttc tgctatgtgg cgcggtatta tcccgtattg acgccgggca agagcaactc   3000
ggtcgccgca tacactattc tcagaatgac ttggttgagt actcaccagt cacagaaaag   3060
catcttacgg atggcatgac agtaagagaa ttatgcagtg ctgccataac catgagtgat   3120
aacactgcgg ccaacttact tctgacaacg atcggaggac cgaaggagct aaccgctttt   3180
ttgcacaaca tgggggatca tgtaactcgc cttgatcgtt gggaaccgga gctgaatgaa   3240
gccataccaa acgacgagcg tgacaccacg atgcctgtag caatggcaac aacgttgcgc   3300
aaactattaa ctggcgaact acttactcta gcttcccggc aacaattaat agactggatg   3360
gaggcggata aagttgcagg accacttctg cgctcggccc ttccggctgg ctggtttatt   3420
gctgataaat ctggagccgg tgagcgtggg tctcgcggta tcattgcagc actggggcca   3480
gatggtaagc cctcccgtat cgtagttatc tacacgacgg ggagtcaggc aactatggat   3540
gaacgaaata gacagatcgc tgagataggt gcctcactga ttaagcattg gtaactgtca   3600
gaccaagttt actcatatat actttagatt gatttaaaac ttcatttta atttaaaagg    3660
atctaggtga agatcctttt tgataatctc atgaccaaaa tcccttaacg tgagttttcg   3720
ttccactgag cgtcagaccc cgtagaaaag atcaaaggat cttcttgaga tcctttttt    3780
ctgcgcgtaa tctgctgctt gcaaacaaaa aaaccaccgc taccagcggt ggtttgtttg   3840
ccggatcaag agctaccaac tctttttccg aaggtaactg gcttcagcag agcgcagata   3900
ccaaatactg tccttctagt gtagccgtag ttaggccacc acttcaagaa ctctgtagca   3960
ccgcctacat acctcgctct gctaatcctg ttaccagtgg ctgctgccag tggcgataag   4020
tcgtgtctta ccgggttgga ctcaagacga tagttaccgg ataaggcgca gcggtcgggc   4080
tgaacggggg gttcgtgcac acagcccagc ttggagcgaa cgacctacac cgaactgaga   4140
tacctacagc gtgagctatg agaaagcgcc acgcttcccg aagggagaaa ggcggacagg   4200
tatccggtaa gcggcagggt cggaacagga gagcgcacga gggagcttcc agggggaaac   4260
gcctggtatc tttatagtcc tgtcgggttt cgccacctct gacttgagcg tcgatttttg   4320
tgatgctcgt caggggggcg gagcctatgg aaaaacgcca gcaacgcggc ctttttacgg   4380
ttcctggcct tttgctggcc ttttgctcac atgttctttc ctgcgttatc ccctgattct   4440
gtggataacc gtattaccgc ctttgagtga gctgataccg ctcgccgcag ccgaacgacc   4500
gagcgcagcg agtcagtgag cgaggaagcg gaagagcgcc caatacgcaa accgcctctc   4560
cccgcgcgtt ggccgattca ttaatgcagc agctgcgcgc tcgctcgctc actgaggccg   4620
cccgggcaaa gcccgggcgt cgggcgacct ttggtcgccc ggcctcagtg agcgagcgag   4680
cgcgcagaga gggagtggcc aactccatca ctaggggttc cttgtagtta atgattaacc   4740
cgcgttaca taacttacgg taaatgcccg cctggctga ccgcccaacg accccgcgcc     4800
cgcgttaca taacttacgg taaatgcccc gcctggctga ccgcccaacg accccgcgcc    4860
attgacgtca ataatgacgt atgttcccat agtaacgcca atagggactt ccattgacg    4920
tcaatgggtg gagtatttac ggtaaactgc ccacttggca gtacatcaag tgtatcatat   4980
gccaagtacg cccccctattg acgtcaatga cggtaaatgg cccgcctggc attatgccca   5040
gtacatgacc ttatgggact ttcctacttg gcagtacatc tacgtattag tcatcgctat   5100
taccatggtc gaggtgagcc cacgttctg cttcactctc cccatctccc ccccctcccc    5160
accccccaatt ttgtatttat ttattttta attattttgt gcagcgatgg gggcggggg    5220
ggggggggc gcgcgccagg cggggcgggg cgggcgaggg ggcgggcgg ggcgaggcgg     5280
agaggtcggg cggcagccaa tcagacgggc gcgtccgaa agtttcctt tatggcgagg    5340
cggcggcggc ggcggcccta taaaaagcga agcgcgcggc gggcgggagt cgctgcgcgc   5400
tgccttcgcc ccgtgccccg ctccgccgcc gcctcgcgcc gcccgccccg gctctgactg   5460
accgcgttac taaaacaggt aagtccggcc tccgcgccgg gttttggcgc ctcccgcggg   5520
cgcccccctc ctcacggcga gcgctgccac gtcagacgaa gggcgcagcg agcgtcctga   5580
tccttccgcc cggacgctca ggacagcggc ccgctgctca taagactcgg ccttagaacc   5640
ccagtatcag cagaaggaca tttaggacg ggacttgggt gactctaggg cactggtttt   5700
cttttccagag agcggaacag gcgaggaaaa gtagtcccct tctcggcgat tctgcggaggg  5760
atctccgtgg ggcggtgaac gccgatgatg cctctactaa ccatgttcat gttttctttt   5820
tttttctaca ggtcctgggt gacgaacagg gtaccgccac catgaggggc atgaagctgc   5880
tgggggcgct gctggcactg gcggccctac tgcaggggc cgtgtccatg gcttttgcc    5940
gcagcgcgct gcatccgctg agcctgctgg tgcaggcgat tatgctggcg atgaccctgg   6000
cgctgggcac cctgccggcg tttctgccgt gcgaactgca gccgcatggc ctggtgaact   6060
gcaactggct gtttctgaaa agcgtgccgc atttagcat ggcggcgccg cgcggcaacg    6120
tgaccagcgt gagcctgagc agcaaccgca ttcatcatct ccatgatgcc gattttgcgt   6180
atctgccgag cctgcgccat ctgaacctga atggaactg cccgccggtg ggcctgagcc   6240
cgatgcattt tccgtgccat atgaccattg aaccgagcac cttttctggcg gtgccgaccc   6300
tggaagaact gaacctgagc tataacaaca ttatgaccgt gccggcgctg ccgaaaagcc   6360
tgattagcct gagcctgagc cataccaaca ttctgatgct ggatagcgcg agcctggcgg   6420
gcctgcatgc gctgcgcttt ctgttattgg atggcaactg ctattataaa aacccgtgcc   6480
```

```
gccaggcgct ggaagtggcg ccgggcgcgc tgctgggcct gggcaacctg acccatctga    6540
gcctgaaata taacaacctg accgtggtgc cgcgcaacct gccgagcagc ctggaatatc    6600
tgctgctgag ctataaccgc attgtgaaac tggcgccgga agatctggcg aacctgaccg    6660
cgctgcgcgt gctggatgtg ggcggcaact gccgccgctg cgatcatgcg ccgaacccgt    6720
gcatgcaaatg cccgcgccat tttccgcagc tgcatccgga tacctttagc catctgagcc    6780
gcctggaagg cctggtgctg aaagatagca gcctgagctg gctgaacgcg agctggtttc    6840
gcggcctggg caacctgcgc gtgctggatc tgagcgaaaa ctttctgtat aaatgcatta    6900
ccaaaaccaa agcgtttcag ggcctgaccc agctgcgcaa actgaacctg agctttaact    6960
atcagaaacg cgtgagcttt gcgcatctga gcctggcgcg gagctttggc agctggtgg    7020
cgctgaaaga actggatatg catggcattt ttttcgcag cctggatgaa accaccctgc    7080
gcccgctggc gcgcctgccg atgctgcaga ccctgcgcct gcagatgaac tttattaacc    7140
aggcgcagct gggcattttt cgcgcgtttc cgggcctgcg ctatgtggat ctgagcgata    7200
accgcattag cggcgcgagc gaactgaccg cgaccatggg cgaagcggat ggcggcgaaa    7260
aagtgtggct gcagccgggc gatctggcgc cggcgccggt ggataccccg agcagcgaag    7320
attttcgccc gaactgcagc accctgaact ttacccctgga tctgagccgc aacaacctgg    7380
tgaccgtgca gccggaaatg tttgcgcagc tgagccatct gcagtgcctg cgcctgagcc    7440
ataactgcat tagccaggcg gtgaacggca gccagtttct gccgctgacc ggcctgcagg    7500
tgctgatct gagccataac aaactggatc tgtatcatga acatagcttt accgaactgc    7560
cgcgcctgga agcgctggat ctgagctata acaccagcc gtttggcatg cagggcgtgg    7620
gccataactt tagctttgtg gcgcatctgc gcacccctgcg ccatctgagc ctggcgcata    7680
acaacattca tagccaggtg agccagcagc tgtgcagcac cagcctgcgc gcgctggatt    7740
ttagcggcaa cgcgctgggc catatgtggg cggaaggcga tctgtatctg cattttttc    7800
agggcctgag cggcctgatt tggctgatc tgagccagaa ccgcctgcat accctgctgc    7860
cgcagaccct gcgcaacctg ccgaaaagcc tgcaggtgct gcgcctgcgc gataactatc    7920
tggcgttttt taaatggtgg agcctgcatt ttctgccgaa actggaagtg ctggatctgg    7980
cgggcaacca gctgaaagcg ctgaccaacg gcagcctgcc gggggcacc cagggcctgc    8040
gcctggatgt gagctgcaac agcattagct ttgtggcgcc gggctttttt agcaaagcga    8100
aagaactgcg cgaactgaac ctgagcgcga acgcctgaa aaccgtggat catagctggt    8160
ttggcccgct ggcgagcgcg ctgcagattc tggatgtgag cgcgaacccg ctgcattgcg    8220
cgtgcggcgc ggcgtttatg gattttctgc tggaagtgca ggcgccggtg ggcggcctgc    8280
cgagccgcgt gaaatgcggc agccccggcc agctgcaggg cctgagcatt tttgcgcagg    8340
atctgcgcct gtgcctggat gaagcgctga gctgggattg ctttgcgctg agcctgctgg    8400
cggtggcgct gggcctgggc gtgccgatgc tgcatcatct gtgcgcctgg gatctgtggt    8460
attgctttca tctgtgcctg gcgtgatgc cgtggcgcgg ccgccagagc ggccgcgatg    8520
aagatgcgct gccgtatgat gcgtttgtgg tgtttgataa aacccagagc cgcggttggg    8580
attgggtgta taacgaactg cgcggccagc tggaagaatg ccgcggccgc tgggcgctgc    8640
gcctgtgcct ggaagaacgc gattggctgc cgggcaaaac cctgttgaa aacctgtggg    8700
cgagcgtgta tggcagccgc aaaacccctgt ttgtgctgg gcataccgat cgcgtgagcg    8760
gcctgctgcg cgccgagctt ctgctgcgcg agcaagatct gctgaagat cgcaaagatg    8820
tggtgtgcgt ggtgattctg agcccggatg gccgccgcag ccgctatgtg cgcctgcgcc    8880
agcgcctgtg ccgccagagc gtgctgctgt ggccgcatca gccgagcggc cagcgcagct    8940
tttgggcgca gctgggcatg gcgctgaccc gcgataacca tcattttttat aaccgcaact    9000
tttgccaggg cccgaccgcg gaagggcgga tcaggcggat caccccaaatc ttgtgacaaa    9060
actcacacat gcccaccgtg cccagcacct gaactcctgg ggggaccgtc agtcttcctc    9120
ttcccccccaa aacccaagga caccctcatg atctcccgga cccctgaggt cacatgcgtg    9180
gtggtggacg tgagccacga agaccctgag gtcaagttca actggtacgt ggacggcgtg    9240
gaggtgcata atgccaagac aaagccgcgg gaggagcaga acaacagcac gtaccgtgtg    9300
gtcagcgtcc tcaccgtcct gcaccaggac tggctgaatg gcaaggagta caagtgcaag    9360
gtctccaaca agcccctccc agccccccatc gagaaaacca tctccaaagc caagggcag    9420
ccccgagaac cacaggtgta cacccctgccc ccatcccggg aggagatgac caagaaccag    9480
gtcagcctga cctgcctggt caaaggcttc tatcccagcg acatcgccgt ggagtgggag    9540
agcaatgggc agccggagaa caactacaag accacgcctc ccgtgctgga ctccgacggc    9600
tccttcttcc tctacagcaa gctcaccgtg gacaagagca ggtggcagca ggggaacgtc    9660
ttctcatgct ccgtgatgca tgaggctctg cacaaccact acacgcagaa gagcctctcc    9720
ctgtctccgg gtaaatag                                                  9738

SEQ ID NO: 10           moltype = DNA  length = 7364
FEATURE                 Location/Qualifiers
source                  1..7364
                        mol_type = other DNA
                        organism = synthetic construct
SEQUENCE: 10
ttctagaata tcaacctct ggattacaaa atttgtgaaa gattgactgg tattcttaac     60
tatgttgctc cttttacgct atgtggatac gctgctttaa tgcctttgta tcatgctatt    120
gcttcccgta tggctttcat tttctcctcc ttgtataaat cctggttgct gtctctttat    180
gaggagttgt ggcccgttgt caggcaacgt ggcgtggtgt gcactgtgtt tgctgacgca    240
accccactgg ttggggcat tgccaccacc tgtcagctcc tttccgggac tttcgctttc     300
cccctcccta ttgccacggc ggaactcatc gccgcctgcc ttgcccgctg ctggacaggg    360
gctcggctgt tgggcactga caattccgtg gtgttgtcgg ggaaatcatc gtcctttcct    420
tggctgctcg cctgtgttgc cacctggatt ctgcgcggga cgtccttctg ctacgtccct    480
tcggccctca atccagcgga ccttccttcc cgcggcctgc tgccggctct gcggcctctt    540
ccgcgtcttc gccttcgccc tcagacgagt cggatctccc tttgggccgc ctccccgcct    600
aagcttatcg ataccgtcga gatctaactt gtttattgca gcttataatg gttacaaata    660
aagcaatagc atcacaaatt tcacaaataa agcattttt tcactgcatt ctagttgtgg    720
tttgtccaaa ctcatcaatg tatcttatca tgtctggatc tcgacctcga tagagcatg    780
gctacgtaga taagtagcat ggcggttaa tcattaacta caaggaaccc ctagtgatgg    840
agttggccac tccctctctg cgcgctcgct cgctcactga ggccgggcga ccaaaggtcg    900
cccgacgccc gggctttgcc cggggcggcct cagtgagcga gcgagcgcgc cagctggcgt    960
aatagcgaag aggcccgcac cgatcgccct tcccaacagt tgcgcagcct gaatggcgaa    1020
```

```
tggaattcca gacgattgag cgtcaaaatg taggtatttc catgagcgtt tttcctgttg    1080
caatggctgg cggtaatatt gttctggata ttaccagcaa ggccgatagt ttgagttctt    1140
ctactcaggc aagtgatgtt attactaatc aaagaagtat tgcgacaacg gttaatttgc    1200
gtgatggaca gactcttta ctcggtggcc tcactgatta taaaaacact tctcaggatt     1260
ctggcgtacc gttcctgtct aaaatccctt taatcgcctt cctgtttagc tcccgctctg    1320
attctaacga ggaaagcacg ttatacgtgc tcgtcaaagc aaccatagta cgcgccctgt    1380
agcggcgcat taagcgcggc gggtgtggtg gttacgcgca gcgtgaccgc tacacttgcc    1440
agcgccctag cgcccgctcc tttcgctttc ttcccttcct ttctcgccac gttcgccggc    1500
tttccccgtc aagctctaaa tcgggggctc cctttagggt tccgatttag tgctttacgg    1560
cacctcgacc ccaaaaaact tgattagggt gatggttcac gtagtgggcc atcgccctga    1620
tagacggttt ttcgcccttt gacgttggag tccacgttct ttaatagtgg actcttgttc    1680
caaactggaa caacactcaa ccctatctcg gtcattctt ttgatttata agggattttg     1740
ccgatttcgg cctattggtt aaaaaatgag ctgatttaac aaaaatttaa cgcgaatttt    1800
aacaaaatat taacgtttac aatttaaata tttgcttata caatcttcct gtttttgggg    1860
cttttctgat tatcaaccgg ggtacatatg attgacatgc tagttttacg attaccgttc    1920
atcgattctc ttgtttgctc cagactctca ggcaatgacc tgatagcctt tgtagagacc    1980
tctcaaaaat agctaccctc tccggcatga atttatcagc tagaacggtt gaatatcata    2040
ttgatggtga tttgactgtc tccggccttt ctcacccgtt tgaatctta cctacacatt     2100
actcaggcat tgcatttaaa atatatgagg gttctaaaaa tttttatcct tgcgttgaaa    2160
taaaggcttc tcccgcaaaa gtattacagg gtcataatgt ttttggtaca accgatttag    2220
ctttatgctc tgaggcttta ttgcttaatt ttgctaattc tttgccttgc ctgtatgatt    2280
tattggatgt tggaattcct gatgcggtat ttctccctta cgcatctgtg cggtatttca    2340
caccgcatat ggtgcactct cagtacaatc tgctctgatg ccgcatagtt aagccagccc    2400
cgacaccgc caacccgc tgacgcgccc tgacgggctt gtctgctccc ggcatccgct       2460
tacagacaag ctgtgaccgt ctccgggagc tgcatgtgtc agaggttttc accgtcatca    2520
ccgaaacgcg cgagacgaaa gggcctcgtg atacgcctat ttttataggt taatgtcatg    2580
ataataatgg tttcttagac gtcaggtggc acttttcggg gaaatgtgcg cggaacccct    2640
atttgtttat ttttctaaat acattcaaat atgtatccgc tcatgagaca ataaccctga    2700
taaatgcttc aataatattg aaaaaggaag agtatgagta ttcaacattt ccgtgtcgcc    2760
cttattccct tttttgcggc attttgcctt cctgtttttg ctcacccaga aacgctggtg    2820
aaagtaaaag atgctgaaga tcagttgggt gcacgagtgg gttacatcga actggatctc    2880
aacagcggta agatccttga gagttttcgc cccgaagaac gttttccaat gatgagcact    2940
tttaaagttc tgctatgtgg cgcggtatta tcccgtattg acgccgggca agagcaactc    3000
ggtcgccgca tacactattc tcagaatgac ttggttgagt actcaccagt cacagaaaag    3060
catcttacgg atggcatgac agtaagagaa ttatgcagtg ctgccataac catgagtgat    3120
aacactgcgg ccaacttact tctgacaacg atcggaggac cgaaggagct aaccgctttt    3180
ttgcacaaca tgggggatca tgtaactcgc cttgatcgtt gggaaccgga gctgaatgaa    3240
gccataccaa acgacgagcg tgacaccacg atgcctgtag caatggcaac aacgttgcgc    3300
aaactattaa ctggcgaact acttactcta gcttcccggc aacaattaat agactggatg    3360
gaggcggata aagttgcagg accacttctg cgctcggccc ttccggctgg ctggtttatt    3420
gctgataaat ctggagccgg tgagcgtggg tctcgcggta tcattgcagc actggggcca    3480
gatggtaagc cctcccgtat cgtagttatc tacacgacgg ggagtcaggc aactatggat    3540
gaacgaaata gacagatcgc tgagataggt gcctcactga ttaagcattg gtaactgtca    3600
gaccaagttt actcatatat actttagatt gatttaaaac ttcattttta atttaaaagg    3660
atctaggtga agatccttt tgataatctc atgaccaaaa tcccttaacg tgagttttcg    3720
ttccactgag cgtcagaccc cgtagaaaag atcaaaggat cttcttgaga tccttttttt    3780
ctgcgcgtaa tctgctgctt gcaaacaaaa aaaccaccgc taccagcggt ggtttgtttg    3840
ccggatcaag agctaccaac tctttttccg aaggtaactg gcttcagcag agcgcagata    3900
ccaaatactg tccttctagt gtagccgtag ttaggccacc acttcaagaa ctctgtagca    3960
ccgcctacat acctcgctct gctaatcctg ttaccagtgg ctgctgccag tggcgataag    4020
tcgtgtctta ccgggttgga ctcaagacga tagttaccgg ataaggcgca gcggtcgggc    4080
tgaacggggg gttcgtgcac acagcccagc ttggagcgaa cgacctacac cgaactgaga    4140
tacctacagc gtgagctatg agaaagcgcc acgcttcccg aagggagaaa ggcggacagg    4200
tatccggtaa gcggcagggt cggaacagga gagcgcacga gggagcttcc agggggaaac    4260
gcctggtatc tttatagtcc tgtcgggttt cgccacctct gacttgagcg tcgatttttg    4320
tgatgctcgt cagggggggcg gagcctatgg aaaaacgcca gcaacgcggc cttttacgg    4380
ttcctggcct tttgctggcc ttttgctcac atgttctttc ctgcgttatc ccctgattct    4440
gtggataacc gtattaccgc ctttgagtga gctgataccg ctcgccgcag ccgaacgacc    4500
gagcgcagcg agtcagtgag cgaggaagcg gaagagcgcc caatacgcaa accgcctctc    4560
cccgcgcgtt ggccgattca ttaatgcagc agctgcgc tcgctcgctc actgaggccg      4620
cccgggcaaa gcccgggcgt cgggcgacct tggtcgccc ggcctcagtg agcgagcgag     4680
cgcgcagaga gggagtggcc aactccatca ctaggggttc cttgtagtta atgattaacc    4740
cgccatgcta cttatctacg tagccatgct ctaggacatt gattattgac tagtggagtt    4800
ccgcgttaca taacttacgg taaatgcccc gcctggctga ccgcccaacg acccccgccc    4860
attgacgtca ataatgacgt atgttcccat agtaacgcca atagggactt tccattgacg    4920
tcaatgggtg gagtatttac ggtaaactgc ccacttggca gtacatcaag tgtatcatat    4980
gccaagtacg cccctattg acgtcaatga cggtaaatgg cccgcctggc attatgccca    5040
gtacatgacc ttatggagct ttcctacttg gcagtacatc tacgtattag tcatcgctat    5100
taccatggtc gaggtgagcc ccacgttctg cttcactctc cccatctccc cccctccc    5160
accccccaatt ttgtatttat ttatttttta attatttgt gcagcgatgg gggcggggg    5220
gggggggggc gcgcgccagg cggggcgggg cggggcgagg ggcggggcgg ggcgaggcgg    5280
agaggtgcgg cggcagccaa tcagagcggc gcgctccgaa agtttccttt tatggcgagg    5340
cggcggcggc ggcggcccta taaaagcga agcgcgcggc gggcgggagt cgctgcgcgc    5400
tgccttgccc ggcgtcgccc gctccgcccg cctcgcccgc cccgccccg gctctgacgg    5460
accgcgttac taaaacaggt aagtccggcc tccgcgccgg ttttggcgc ctcccgcggg    5520
cgccccctc ctcacggcga gcgctgccac gtcagacgaa gggcgcagcg agcgtcctga    5580
tccttccgcc cggacgctca ggacagcggc ccgctgctca taagactcgg ccttagaacc    5640
ccagtatcag cagaaggaca ttttaggacg ggacttgggt gactctaggg cactggtttt    5700
cttttccgag agcggaacag gcgaggaaaa gtagtcccctt ctcggcgatt ctgcggaggg    5760
```

```
atctccgtgg ggcggtgaac gccgatgatg cctctactaa ccatgttcat gttttcttt  5820
tttttctaca ggtcctgggt gacgaacagg gtaccgccac catgaggggc atgaagctgc  5880
tgggggcgct gctggcactg gcggccctac tgcaggggc cgtgtccatg agcatgctgt   5940
tttatacct gattaccgcg tttctgattg gcattcaggc ggaaccgcat agcgaaagca   6000
acgtgccggc gggccatacc attccgcagg cgcattgcac caaactgaca catagcctgg  6060
ataccgcgct gcgccgcgcg cgcagcgcgc cggcggcggc gattgcggcg cgcgtggcgg  6120
gccagaccg caacattacc gtggatccgc gcctgtttaa aaaacgccgc ctgcgcagcc   6180
cgcgcgtgct gtttagcacc cagccgccgc gcgaagcggc ggatacccag gatctggatt  6240
ttgaagtggg cggcgcggcg ccgtttaacc gcacccatcg cagcaaacgc agcagcagcc  6300
atccgatttt tcatcggcgg gaatttagcg tgtgcgatag cgtgagcgtg tgggtgggcg  6360
ataaaaccac cgcgaccgat attaaaggca aagaagtgat ggtgctgggc gaagtgaaca  6420
ttaacaacag cgtgtttaaa cagtatttt ttgaaaccaa atgccgcgat ccgaacccgg   6480
tggatagcgg ctgccgcggc attgatagca acattggaa cagctattgc accaccaccc   6540
ataccttgt gaaagcgctg accatggatg gcaaacaggc ggcgtggcgc tttattcgca   6600
ttgataccgc gtgcgtgtgc gtgctgagcc gcaaagcggt gcgccgcgcg gcggatcag   6660
gcggatcacc caaatcttgt gacaaaactc acacatgccc accgtgccca gcacctgaac   6720
tcctgggggg accgtcagtc ttcctcttcc ccccaaaacc caaggacacc ctcatgatct   6780
cccggacccc tgaggtcaca tgcgtggtgg tggacgtgag ccacgaagac cctgaggtca   6840
agttcaactg gtacgtggac ggcgtggagg tgcataatgc caagacaaag ccgcggggagg  6900
agcagtacaa cagcacgtac cgtgtggtca gcgtcctcac cgtcctgcac caggactggc   6960
tgaatggcaa ggagtacaag tgcaaggtct ccaacaaagc cctcccagcc cccatcgaga   7020
aaaccatctc caaagccaaa gggcagcccc gagaaccaca ggtgtacacc ctgcccccat   7080
cccgggagga tgaccaagaa ccaggtca gcctgacctg cctggtcaaa ggcttctatc   7140
ccagcgacat cgccgtggag tgggagagca atgggcagcc ggagaacaac tacaagacca   7200
cgcctcccgt gctggactcc gacggctcct tcttcctcta cagcaagctc accgtggaca   7260
agagcaggtg gcagcagggg aacgtcttct catgctccgt gatgcatgag gctctgcaca   7320
accactacac gcagaagagc ctctccctgt ctccgggtaa atag                   7364
```

SEQ ID NO: 11        moltype = DNA  length = 6972
FEATURE              Location/Qualifiers
source               1..6972
                      mol_type = other DNA
                      organism = synthetic construct
SEQUENCE: 11

```
ttctagaata atcaacctct ggattacaaa atttgtgaaa gattgactgg tattcttaac   60
tatgttgctc cttttacgct atgtggatac gctgctttaa tgcctttgta tcatgctatt   120
gcttcccgta tggctttcat tttctcctcc ttgtataaat cctggttgct gtctctttat   180
gaggagttgt ggcccgttgt caggcaacgt ggcgtggtgt gcactgtgtt tgctgacgca   240
accccactg gttgggcat tgccaccacc tgtcagctcc tttccgggac tttcgcttc    300
ccctcccta ttgccacggc ggaactcatc gccgcctgcc ttgcccgctg ctggacaggg   360
gctcggctgt tgggcactga caattccgtg gtgttgtcgg ggaaatcatc gtcctttcct   420
tggctgctcg cctgtgttgc cacctggatt ctgcgcggga cgtccttctg ctacgtccct   480
tcggccctca atccagcgga ccttccttcc cgccgcctgc tgccgtctct gcggcctctc   540
ccgcgtcttc gccttcgccc tcagacgagt cggatctccc ttgggccgcc tccccgcct   600
aagcttatcg ataccgtcga gatctaactt gtttattgca gcttataatg gttacaaata   660
aagcaatagc atcacaaatt tcacaaataa agcatttttt tcactgcatt ctagttgtgg   720
tttgtccaaa ctcatcaatg tatcttatca tgtctggatc tcgacctga ctagagcag   780
gctacgtaga taagtagcat ggcgggttaa tcattaacta caaggaaccc ctagtgatgg   840
agttggccac tccctctctg cgcgctcgct cgctcactga ggccgggcga ccaaaggtcg   900
cccgacgccc gggctttgcc cggggcggcct cagtgagcga gcgagcgcgc agctggcgt    960
aatagcgaag aggcccgcac cgatcgccct cccaacagt tgcgcagcct gaatggcgaa   1020
tggaattcca gacgattgag cgtcaaaatg taggtatttc catgagcgtt tttcctgttg   1080
caatggctgg cggtaaatat tgttctggata ttaccagcaa ggccgatagt ttgagttctt   1140
ctactcaggc aagtgatgtt attactaatc aaagaagtat tgcgacaacg gttaatttgc   1200
gtgatgaaca gactctttta ctcggtggcc tcactgatta taaaaactc tctcaggatt   1260
ctggcgtacc gttcctgtct aaaatcctt taatcggcct cctgtttagc tcccgctctg   1320
attctaacga ggaagcacg ttatacgtgt cgtcaaagc aaccatagta cgcgccctgt    1380
agcggcgcat taagcgcggc gggtgtgtg gttacgcgca gcgtgaccgc tacacttgcc   1440
agcgccctag cgcccgctcc tttcgctttc ttcccttcct ttctcgccac gttcgccggc   1500
tttccccgtc aagctctaaa tcgggggctc cctttagggt tccgatttag tgctttacgg   1560
cacctcgacc ccaaaaaact tgattagggt gatggttcac gtagtgggcc atcgccctga   1620
tagacggttt ttcgccttt gacgttggag tccacgttct taatagtgg actcttgttc   1680
caaactggaa caacactcaa ccctatctcg gtctattctt ttgatttata agggattttg   1740
ccgatttcgg cctattggtt aaaaatgag ctgatttaac aaaaatttaa cgcgaatttt   1800
aacaaaatat taacgtttac aatttaaata tttgcttata caatcttcct gtttttgggg   1860
cttttctgat tatcaaccgg ggtacatatg attgacatgc tagttttacg attaccgttc   1920
atcgattctc ttgtttgctc cagactctca ggcaatgacc tgatagcctt gtagagacc    1980
tctcaaaaat agctaccctc tccggcatga atttatcagc taacaaggt gaatatcata   2040
ttgatggtga tttgactgtc tccggcctt ctcaccgtt tgaatcttta cctacacatt   2100
actcaggcat tgcattttaaa atatatgagg gttctaaaaa tttttatcct tgcgttgaaa   2160
taaaggcttc tcccgcaaaa gtattacagg gtcataatgt ttttggtaca accgatttag   2220
ctttatgctc tgaggcttta ttgcttaatt ttgctaattc tttgccttgc ctgtatgatt   2280
tattggatgt tggaattcct gatgcggtat tttctcctta cgcatctgtg cggtatttca   2340
caccgcatat ggtgcactct cagtacaatc tgctctgatg ccgcatagtt aagccagccc   2400
cgacacccgc caacacccgc tgacgcgccc tgacgggctt gtctgctccc ggcatccgct   2460
tacagacaag ctgtgaccgt ctccgggagc tgcatgtgtc agaggttttc accgtcatca   2520
ccgaaacgcg cgagacgaaa gggcctcgtg atacgcctat ttttataggt taatgtcatg   2580
ataataatgg tttcttagac gtcaggtggc acttttcggg gaaatgtgcg cggaaccct   2640
atttgtttat ttttctaaat acattcaaat atgtatccgc tcatgagaca ataaccctga   2700
```

-continued

```
taaatgcttc aataatattg aaaaaggaag agtatgagta ttcaacattt ccgtgtcgcc    2760
cttattccct tttttgcggc attttgcctt cctgttttg ctcacccaga aacgctggtg     2820
aaagtaaaag atgctgaaga tcagttgggt gcacgagtgg gttacatcga actggatctc   2880
aacagcggta agatccttga gagttttcgc cccgaagaac gttttccaat gatgagcact   2940
tttaaagttc tgctatgtgg cgcggtatta tcccgtattg acgccgggca agagcaactc   3000
ggtcgccgca tacactattc tcagaatgac ttggttgagt actcaccagt cacagaaaag   3060
catcttacgg atggcatgac agtaagagaa ttatgcagtg ctgccataac catgagtgat   3120
aacactgcgg ccaacttact tctgacaacg atcggaggac cgaaggagct aaccgctttt   3180
ttgcacaaca tgggggatca tgtaactcgc cttgatcgtt gggaaccgga gctgaatgaa   3240
gccataccaa acgacgagcg tgacaccacg atgcctgtag caatggcaac aacgttgcgc   3300
aaactattaa ctggcgaact acttactcta gcttcccggc aacaattaat agactggatg   3360
gaggcggata aagttgcagg accacttctg cgctcggccc ttccggctgg ctggtttatt   3420
gctgataaat ctggagccgg tgagcgtggg tctcgcggta tcattgcagc actggggcca   3480
gatggtaagc cctcccgtat cgtagttatc tacacgacgg ggagtcaggc aactatggat   3540
gaacgaaata gacagatcgc tgagataggt gcctcactga ttaagcattg gtaactgtca   3600
gaccaagttt actcatatat actttagatt gatttaaaac ttcatttta atttaaaagg    3660
atctaggtga agatcctttt tgataatctc atgaccaaaa tcccttaacg tgagttttcg   3720
ttccactgag cgtcagaccc cgtagaaaag atcaaaggat cttcttgaga tcctttttt    3780
ctgcgcgtaa tctgctgctt gcaaacaaaa aaaccaccgc taccagcggt ggtttgtttg   3840
ccggatcaag agctaccaac tcttttccg aaggtaactg gcttcagcag agcgcagata    3900
ccaaatactg tccttctagt gtagccgtag ttaggccacc acttcaagaa ctctgtagca   3960
ccgcctacat acctcgctct gctaatcctg ttaccagtgg ctgctgccag tggcgataag   4020
tcgtgtctta ccgggttgga ctcaagacga tagttaccgg ataaggcgca gcggtcgggc   4080
tgaacggggg gttcgtgcac acagcccagc ttggagcgaa cgacctacac cgaactgaga   4140
tacctacagc gtgagctatg agaaagcgcc acgcttcccg aagggagaaa ggcggacagg   4200
tatccggtaa gcggcagggt cggaacagga gagcgcacga gggagcttcc agggggaaac   4260
gcctggtatc tttatagtcc tgtcgggttt cgccacctct gacttgagcg tcgatttttg   4320
tgatgctcgt caggggggcg gagcctatgg aaaaacgcca gcaacgcggc ctttttacgg   4380
ttcctggcct tttgctggcc ttttgctcac atgttcttc ctgcgttatc ccctgattct    4440
gtggataacc gtattaccgc ctttgagtga gctgataccg ctcgccgcag ccgaacgacc   4500
gagcgcagcg agtcagtgag cgaggaagcg gaagagcgcc caatacgcaa accgcctctc   4560
cccgcgcgtt ggccgattca ttaatgcagc agctgcgcgc tcgctcgctc actgaggccg   4620
cccgggcaaa gcccgggcgt cgggcgacct ttggtcgccc ggcctcagtg agcgagcgag   4680
cgcgcagaga gggagtggcc aactccatca ctaggggttc cttgtagtta atgattaacc   4740
cgccatgcta cttatctacg tagccatgct ctaggacatt gattattgac tagtggagtt   4800
ccgcgttaca taacttacgg taaatggccc gcctggctga ccgcccaacg accccgccc    4860
attgacgtca ataatgacgt atgttcccat agtaacgcca atagggactt tccattgacg   4920
tcaatgggtg gagtatttac ggtaaactgc ccacttggca gtacatcaag tgtatcatat   4980
gccaagtacg ccccctattg acgtcaatga cggtaaatgg cccgcctggc attatgccca   5040
gtacatgacc ttatgggact ttcctacttg gcagtacatc tacgtattag tcatcgctat   5100
taccatggtc gaggtgagcc ccacgttctg cttcactctc cccatctccc cccctcccc    5160
accccaatt ttgtatttat ttattttta attattttgt gcagcgatgg gggcgggggg     5220
gggggggggc gcgcgccagg cggggcgggg cgggcgaggg gcgggggcgg gcgaggcgg    5280
agaggtgcgg cggcagccaa tcagagcggc gcgctccgaa agtttccttt tatggcgagg   5340
cggcggcggc ggcggcccta taaaaagcga agcgcgcggc gggcgggagt cgctgcgcgc   5400
tgccttcgcc ccgtgcccg ctccgccgcc gcctcgcgcc gcccgccccg gctctgactg    5460
accgcgttac taaaacaggt aagtccggcc tccgcgccgg gttttggcgc ctcccgcggg   5520
cgcccccctc ctcacggcga gcgctgccac gtcagacgaa gggcgcagcg agcgtcctga   5580
tccttccgcc cggacgctca ggacagcggc ccgctgctca taagactcgg ccttagaacc   5640
ccagtatcag cagaaggaca tttaggacg ggacttgggt gactctaggg cactggtttt    5700
cttttccagag agcggaacag gcgaggaaaa gtagtcccct tcggcgattc tgcggaggg    5760
atctccgtgg ggcggtgaac gccgatgatg cctctactaa ccatgttcat gttttctttt   5820
tttttctaca ggtcctgggt gacgaacagg gtaccgccac catgagggc atgaagctgc    5880
tggggggcgct gctggcactg gcggcccta gcagggggg cgtgtccatg gcgctgtgga    5940
tgcgcctgct gccgctgctg gcgctgctgg cgctgtgggg cccggatccg gcggcggcgt   6000
ttgtgaacca gcatctgtgc ggcagccatc tggtggaagc gctgtatctg gtgtgcggca   6060
aacgcggctt tttttatacc ccgaaaaccc gccgcgaagc ggaagatctg caggtgggcc   6120
aggtggaact gggcggcggc ccgggcgcgg gcagcctgca gccgctggcg ctggaaggca   6180
gcctgcagaa acgcggcatt gtggaacagt gctgcaccag catttgcagc ctgtatcagc   6240
tggaaaacta ttgcaacggg cggatcaggc ggatcaccca aatcttgtga caaaactcac   6300
acatgcccac cgtgcccagc acctgaactc ctggggggac cgtcagtctt cctcttcccc   6360
ccaaaaccca aggacaccct catgatctcc cggacccctg aggtcacatg cgtggtggtg   6420
gacgtgagcc acgaagaccc tgaggtcaag ttcaactggt acgtggacgg cgtggaggtg   6480
cataatgcca agacaaagcc gcgggaggag cagtacaaca gcacgtaccg tgtggtcagc   6540
gtcctcaccg tcctgcacca ggactggctg aatggcaagg agtacaagtg caaggtctcc   6600
aacaaagccc tcccagcccc catcgagaaa accatctcca aagccaaagg cagccccga    6660
gaaccacagg tgtacaccct gcccccatcc cgggaggaga tgaccaagaa ccaggtcagc   6720
ctgacctgcc tggtcaaagg cttctatccc agcgacatcg ccgtggagtg ggagagcaat   6780
gggcagccgg agaacaacta caagaccacg cctcccgtgc tggactccga cggctccttc   6840
ttcctctaca gcaagctcac cgtggacaag agcaggtggc agcaggggaa cgtcttctca   6900
tgctccgtga tgcatgaggc tctgcacaac cactacacgc agaagagcct ctccctgtct   6960
ccgggtaaat ag                                                        6972
```

PLASMID ENCODING AN INSULIN PEPTIDE AND Fc FUSION PROTEIN

This application contains a Sequence Listing electronically submitted via Patent Center to the United States Patent and Trademark Office as an XML Document file entitled "A8149440US—Sequence Listing.xml" created on 2024 Feb. 8 and having a size of 68,245 bytes. The information contained in the Sequence Listing is incorporated by reference herein.

TECHNICAL FIELD

The present disclosure generally relates to compositions for regulating the production of fusion proteins. In particular, the present disclosure relates to compositions for regulating gene expression and, consequently, the production of fusion proteins.

BACKGROUND

Bioactive molecules, including toll-like receptors, enzymes, and hormones, are necessary for the homeostatic control of biological systems.

When bioactive molecules are over-expressed, under-expressed or mis-expressed, homeostasis is lost, and disease is often the result.

As such, it may be desirable to establish therapies, treatments and/or interventions that address when homeostasis and the regulation of bioactive molecules are lost in order to prevent or treat the resulting disease.

SUMMARY

Some embodiments of the present disclosure relate to one or more compositions that upregulate the production of one or more sequences of mRNA. The sequences of mRNA may encode for translation of a target biomolecule, thereby causing an increase in bioavailability of the target biomolecule within a subject that is administered the one or more compositions. In some embodiments of the present disclosure, the target biomolecule is a fusion protein with an Fc fragment, such as a toll-like receptor 3-Fc (TLR3-Fc). In some embodiments of the present disclosure, the target biomolecule is toll-like receptor 9-Fc (TLR9-Fc). In some embodiments of the present disclosure, the target biomolecule is deoxyribonuclease I-Fc (DNAse I-Fc). In some embodiments of the present disclosure, the target biomolecule is neural growth factor-Fc (NGF-Fc). In some embodiments of the present disclosure, the target biomolecule is insulin-Fc.

In some embodiments of the present disclosure the compositions comprise a plasmid of deoxyribonucleic acid (DNA) that includes one or more insert sequences of nucleic acids that encode for the production of mRNA and a backbone sequence of nucleic acids that facilitates introduction of the one or more insert sequences into one or more of a subject's cells where it is expressed and/or replicated. Expression of the one or more insert sequences by one or more cells of the subject results in an increased production of the mRNA and, consequently, increased translation of the target biomolecule by one or more of the subject's cells.

Some embodiments of the present disclosure relate to a recombinant plasmid (RP). In some embodiments of the present disclosure, the RP comprises a nucleotide sequence of SEQ ID NO. 1 and SEQ ID NO. 2. The RP comprises a nucleotide sequence encoding one or more nucleotide sequences encoding an mRNA sequence that encodes for the fusion protein DNAse I-Fc.

Some embodiments of the present disclosure relate to a recombinant plasmid. In some embodiments of the present disclosure, the RP comprises a nucleotide sequence of SEQ ID NO. 1 and SEQ ID NO. 3. The RP comprises a nucleotide sequence encoding one or more nucleotide sequences encoding an mRNA sequence that encodes for the fusion protein TLR3-Fc.

Some embodiments of the present disclosure relate to a recombinant plasmid. In some embodiments of the present disclosure, the RP comprises a nucleotide sequence of SEQ ID NO. 1 and SEQ ID NO. 4. The RP comprises a nucleotide sequence encoding one or more nucleotide sequences encoding an mRNA sequence that encodes for the fusion protein TLR9-Fc.

Some embodiments of the present disclosure relate to a recombinant plasmid. In some embodiments of the present disclosure, the RP comprises a nucleotide sequence of SEQ ID NO. 1 and SEQ ID NO. 5. The RP comprises a nucleotide sequence encoding one or more nucleotide sequences encoding an mRNA sequence that encodes for the fusion protein NGF-Fc.

Some embodiments of the present disclosure relate to a recombinant plasmid. In some embodiments of the present disclosure, the RP comprises a nucleotide sequence of SEQ ID NO. 1 and SEQ ID NO. 6. The RP comprises a nucleotide sequence encoding one or more nucleotide sequences encoding an mRNA sequence that encodes for the fusion protein insulin-Fc.

Some embodiments of the present disclosure relate to a method of making a composition/target cell complex. The method comprising a step of administering a RP comprising SEQ ID NO. 1 and one of SEQ ID NO. 2, SEQ ID NO. 3, SEQ ID NO. 4, SEQ ID NO. 5 or SEQ ID NO. 6 to a target cell for forming the composition/target cell complex, wherein the composition/target cell complex causes the target cell to increase production of one or more sequences of mRNA that increases production of a target biomolecule.

Embodiments of the present disclosure relate to at least one approach for inducing endogenous production of one or more sequences of mRNA that encodes for a target biomolecule, for example TLR3-Fc. A first approach utilizes gene vectors containing nucleotide sequences for increasing the endogenous production of one or more sequences of mRNA, which are complete or partial sequences and/or combinations thereof of TLR3-Fc, which can be administered to a subject to increase the subject's production of one or more sequences of the mRNA.

Embodiments of the present disclosure relate to at least one approach for inducing endogenous production of one or more sequences of mRNA that encodes for a target biomolecule, for example TLR9-Fc. A first approach utilizes gene vectors containing nucleotide sequences for increasing the endogenous production of one or more sequences of mRNA, which are complete or partial sequences and/or combinations thereof of TLR9-Fc, which can be administered to a subject to increase the subject's production of one or more sequences of the mRNA.

Embodiments of the present disclosure relate to at least one approach for inducing endogenous production of one or more sequences of mRNA that encodes for a target biomolecule, for example DNAse I-Fc. A first approach utilizes gene vectors containing nucleotide sequences for increasing the endogenous production of one or more sequences of mRNA, which are complete or partial sequences and/or combinations thereof of DNAse I-Fc, which can be administered to a subject to increase the subject's production of one or more sequences of the mRNA.

Embodiments of the present disclosure relate to at least one approach for inducing endogenous production of one or more sequences of mRNA that encodes for a target biomolecule, for example NGF-Fc. A first approach utilizes gene vectors containing nucleotide sequences for increasing the endogenous production of one or more sequences of mRNA, which are complete or partial sequences and/or combinations thereof of NGF-Fc, which can be administered to a subject to increase the subject's production of one or more sequences of the mRNA.

Embodiments of the present disclosure relate to at least one approach for inducing endogenous production of one or more sequences of mRNA that encodes for a target biomolecule, for example insulin-Fc. A first approach utilizes gene vectors containing nucleotide sequences for increasing the endogenous production of one or more sequences of mRNA, which are complete or partial sequences and/or combinations thereof of insulin-Fc, which can be administered to a subject to increase the subject's production of one or more sequences of the mRNA.

DETAILED DESCRIPTION

Unless defined otherwise, all technical and scientific terms used therein have the meanings that would be commonly understood by one of skill in the art in the context of the present description. Although any methods and materials similar or equivalent to those described therein can also be used in the practice or testing of the present disclosure, the preferred compositions, methods and materials are now described. All publications mentioned therein are incorporated therein by reference to disclose and describe the methods and/or materials in connection with which the publications are cited.

As used therein, the singular forms "a", "an", and "the" include plural references unless the context clearly dictates otherwise. For example, reference to "a composition" includes one or more compositions and reference to "a subject" or "the subject" includes one or more subjects.

As used therein, the terms "about" or "approximately" refer to within about 25%, preferably within about 20%, preferably within about 15%, preferably within about 10%, preferably within about 5% of a given value or range. It is understood that such a variation is always included in any given value provided therein, whether or not it is specifically referred to.

As used therein, the term "ameliorate" refers to improve and/or to make better and/or to make more satisfactory.

As used therein, the term "cell" refers to a single cell as well as a plurality of cells or a population of the same cell type or different cell types. Administering a composition to a cell includes in vivo, in vitro and ex vivo administrations and/or combinations thereof.

As used therein, the term "complex" refers to an association, either direct or indirect, between one or more particles of a composition and one or more target cells. This association results in a change in the metabolism of the target cell. As used therein, the phrase "change in metabolism" refers to an increase or a decrease in the one or more target cells' production of one or more proteins, and/or any post-translational modifications of one or more proteins.

As used therein, the term "composition" refers to a substance that, when administered to a subject, causes one or more chemical reactions and/or one or more physical reactions and/or one or more physiological reactions and/or one or more immunological reactions in the subject. In some embodiments of the present disclosure, the composition is a plasmid vector.

As used therein, the term "endogenous" refers to the production and/or modification of a molecule that originates within a subject.

As used therein, the term "exogenous" refers to a molecule that is within a subject but that did not originate within the subject. As used therein, the terms "production", "producing" and "produce" refer to the synthesis and/or replication of DNA, the transcription of one or more sequences of RNA, the translation of one or more amino acid sequences, the post-translational modifications of an amino acid sequence, and/or the production of one or more regulatory molecules that can influence the production and/or functionality of an effector molecule or an effector cell. For clarity, "production" is also used therein to refer to the functionality of a regulatory molecule, unless the context reasonably indicates otherwise.

As used therein, the term "subject" refers to any therapeutic target that receives the composition. The subject can be a vertebrate, for example, a mammal including a human. The term "subject" does not denote a particular age or sex. The term "subject" also refers to one or more cells of an organism, an in vitro culture of one or more tissue types, an in vitro culture of one or more cell types, ex vivo preparations, and/or a sample of biological materials such as tissue, and/or biological fluids.

As used therein, the term "target biomolecule" refers to a protein-Fc fusion molecule that is found within a subject. A biomolecule may be endogenous or exogenous to a subject.

As used therein, the term "target cell" refers to one or more cells and/or cell types that are affected, either directly or indirectly, by a biomolecule.

As used therein, the term "therapeutically effective amount" refers to the amount of the composition used that is of sufficient quantity to ameliorate, treat and/or inhibit one or more of a disease, disorder or a symptom thereof. The "therapeutically effective amount" will vary depending on the composition used, the route of administration of the composition and the severity of the disease, disorder or symptom thereof. The subject's age, weight and genetic make-up may also influence the amount of the composition that will be a therapeutically effective amount.

As used therein, the terms "treat", "treatment" and "treating" refer to obtaining a desired pharmacologic and/or physiologic effect. The effect may be prophylactic in terms of completely or partially preventing an occurrence of a disease, disorder or symptom thereof and/or the effect may be therapeutic in providing a partial or complete amelioration or inhibition of a disease, disorder, or symptom thereof. Additionally, the term "treatment" refers to any treatment of a disease, disorder, or symptom thereof in a subject and includes: (a) preventing the disease from occurring in a subject which may be predisposed to the disease but has not yet been diagnosed as having it; (b) inhibiting the disease, i.e., arresting its development; and (c) ameliorating the disease.

As used therein, the terms "unit dosage form" and "unit dose" refer to a physically discrete unit that is suitable as a unitary dose for patients. Each unit contains a predetermined quantity of the composition and optionally, one or more suitable pharmaceutically acceptable carriers, one or more excipients, one or more additional active ingredients, or combinations thereof. The amount of composition within each unit is a therapeutically effective amount.

Where a range of values is provided therein, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges, and are also, encompassed within the disclosure, subject to any specifically excluded limit in the stated range. Where the stated range includes one or both of the limits, ranges excluding either or both of those included limits are also included in the disclosure.

In some embodiments of the present disclosure, a composition is a recombinant plasmid (RP) for introducing genetic material, such as one or more nucleotide sequences, into a target cell for reproduction or transcription of an insert that comprises one or more nucleotide sequences that are carried within the RP. In some embodiments of the present disclosure, the RP is delivered without a carrier, by a viral vector, by a protein coat, or by a lipid vesicle. In some embodiments of the present disclosure, the vector is an adeno-associated virus vector.

In some embodiments of the present disclosure, the insert comprises one or more nucleotide sequences that encode for production of at least one sequence of mRNA that increases the production of target biomolecules, such as a fusion protein with an Fc fragment. An Fc fragment is the distal portion of the heavy chain of an antibody.

In some embodiments of the present disclosure, the target biomolecule is TLR3-Fc.

In some embodiments of the present disclosure, the target biomolecule is TLR9-Fc.

In some embodiments of the present disclosure, the target biomolecule is DNAse I-Fc.

In some embodiments of the present disclosure, the target biomolecule is NGF-Fc.

In some embodiments of the present disclosure, the target biomolecule is insulin-Fc.

Some embodiments of the present disclosure relate to a composition that can be administered to a subject with a condition that results, directly or indirectly, from the dysregulated production of a biomolecule. When a therapeutically effective amount of the composition is administered to the subject, the subject may change production and/or functionality of one or more biomolecules.

In some embodiments of the present disclosure, the subject may respond to receiving the therapeutic amount of the composition by changing production and/or functionality of one or more intermediary molecules by changing production of one or more DNA sequences, one or more RNA sequences, and/or one or more proteins that regulate the levels and/or functionality of the one or more intermediary molecules. The one or more intermediary molecules regulate the subject's levels and/or functionality of the one or more biomolecules.

In some embodiments of the present disclosure, administering a therapeutic amount of the composition to a subject upregulates the production, functionality or both one or more sequences of mRNA that each encode for one or more biomolecules.

In some embodiments of the present disclosure, the composition is an RP that may be used for gene therapy. The gene therapy is useful for increasing the subject's endogenous production of one or more sequences of mRNA that encode for a target biomolecule. For example, the RP can contain one or more nucleotide sequences that cause increased production of one or more nucleotide sequences that cause an increased production of one or more mRNA sequences that encode for one biomolecule, such as TLR3-Fc, TLR9-Fc, DNAse I-Fc, NGF-Fc or insulin-Fc.

In some embodiments of the present disclosure, the delivery vehicle of the RP used for gene therapy may be a vector that comprises a virus that can be enveloped, or not (unenveloped), replication effective or not (replication ineffective), or combinations thereof. In some embodiments of the present disclosure, the vector is a virus that is not enveloped and not replication effective. In some embodiments of the present disclosure, the vector is a virus of the Parvoviridae family. In some embodiments of the present disclosure, the vector is a virus of the genus *Dependoparvovirus*. In some embodiments of the present disclosure, the vector is an adeno-associated virus (AAV). In some embodiments of the present disclosure, the vector is a recombinant AAV. In some embodiments of the present disclosure, the vector is a recombinant AAV6.2FF.

In some embodiments of the present disclosure, the delivery vehicle of the RP used for gene therapy may be a protein coat.

In some embodiments of the present disclosure, the delivery vehicle of the RP used for gene therapy may be a lipid vesicle.

The embodiments of the present disclosure also relate to administering a therapeutically effective amount of the composition. In some embodiments of the present disclosure, the therapeutically effective amount of the composition that is administered to a patient is between about 10 and about $1 \times 10^{16}$ TCID$_{50}$/kg (50% tissue culture infective dose per kilogram of the patient's body mass). In some embodiments of the present disclosure, the therapeutically effective amount of the composition that is administered to the patient is about $1 \times 10^{13}$ TCID$_{50}$/kg. In some embodiments of the present disclosure, the therapeutically effective amount of the composition that is administered to a patient is measured in TPC/kg (total particle count of the composition per kilogram of the patient's body mass). In some embodiments of the present disclosure, the therapeutically effective amount of the composition is between about 10 and about $1 \times 10^{16}$ TCP/kg.

Some embodiments of the present disclosure relate to an adeno-associated virus (AAV) genome consisting of a RP that when operable inside a target cell will cause the target cell to produce a mRNA sequence that upregulates production of a biomolecule, with examples being TLR3-Fc, TLR9-Fc, DNAse I-Fc, NGF-Fc, or insulin-Fc. The RP is comprised of AAV2 inverted terminal repeats (ITRs), a composite CASI promoter, and a human growth hormone (HGH) signal peptide followed by a mRNA expression cassette encoding for TLR3-Fc, TLR9-Fc, DNAse I-Fc, NGF-Fc, or insulin-Fc, followed by a Woodchuck Hepatitis Virus post-transcriptional regulatory element (WPRE) and a Simian virus 40 (SV40) polyadenylation (polyA) signal.

SEQ ID NO. 1 (backbone sequence No. 1):
5' TTCTAGAATAATCAACCTCTGGATTACAAAATTTGTGAAAGATTGACTGGTATTCTT

AACTATGTTGCTCCTTTTACGCTATGTGGATACGCTGCTTTAATGCCTTTGTATCATGCT

-continued

```
ATTGCTTCCCGTATGGCTTTCATTTTCTCCTCCTTGTATAAATCCTGGTTGCTGTCTCTT

TATGAGGAGTTGTGGCCCGTTGTCAGGCAACGTGGCGTGGTGTGCACTGTGTTTGCTGAC

GCAACCCCCACTGGTTGGGGCATTGCCACCACCTGTCAGCTCCTTTCCGGGACTTTCGCT

TTCCCCCTCCCTATTGCCACGGCGGAACTCATCGCCGCCTGCCTTGCCCGCTGCTGGACA

GGGGCTCGGCTGTTGGGCACTGACAATTCCGTGGTGTTGTCGGGGAAATCATCGTCCTTT

CCTTGGCTGCTCGCCTGTGTTGCCACCTGGATTCTGCGCGGGACGTCCTTCTGCTACGTC

CCTTCGGCCCTCAATCCAGCGGACCTTCCTTCCCGCGGCCTGCTGCCGGCTCTGCGGCCT

CTTCCGCGTCTTCGCCTTCGCCCTCAGACGAGTCGGATCTCCCTTTGGGCCGCCTCCCCG

CCTAAGCTTATCGATACCGTCGAGATCTAACTTGTTTATTGCAGCTTATAATGGTTACAA

ATAAAGCAATAGCATCACAAATTTCACAAATAAAGCATTTTTTTCACTGCATTCTAGTTG

TGGTTTGTCCAAACTCATCAATGTATCTTATCATGTCTGGATCTCGACCTCGACTAGAGC

ATGGCTACGTAGATAAGTAGCATGGCGGGTTAATCATTAACTACAAGGAACCCCTAGTGA

TGGAGTTGGCCACTCCCTCTCTGCGCGCTCGCTCGCTCACTGAGGCCGGGCGACCAAAGG

TCGCCCGACGCCCGGGCTTTGCCCGGGCGGCCTCAGTGAGCGAGCGAGCGCGCCAGCTGG

CGTAATAGCGAAGAGGCCCGCACCGATCGCCCTTCCCAACAGTTGCGCAGCCTGAATGGC

GAATGGAATTCCAGACGATTGAGCGTCAAAATGTAGGTATTTCCATGAGCGTTTTTCCTG

TTGCAATGGCTGGCGGTAATATTGTTCTGGATATTACCAGCAAGGCCGATAGTTTGAGTT

CTTCTACTCAGGCAAGTGATGTTATTACTAATCAAAGAAGTATTGCGACAACGGTTAATT

TGCGTGATGGACAGACTCTTTTACTCGGTGGCCTCACTGATTATAAAAACACTTCTCAGG

ATTCTGGCGTACCGTTCCTGTCTAAAATCCCTTTAATCGGCCTCCTGTTTAGCTCCCGCT

CTGATTCTAACGAGGAAAGCACGTTATACGTGCTCGTCAAAGCAACCATAGTACGCGCCC

TGTAGCGGCGCATTAAGCGCGGCGGGTGTGGTGGTTACGCGCAGCGTGACCGCTACACTT

GCCAGCGCCCTAGCGCCCGCTCCTTTCGCTTTCTTCCCTTCCTTTCTCGCCACGTTCGCC

GGCTTTCCCCGTCAAGCTCTAAATCGGGGGCTCCCTTTAGGGTTCCGATTTAGTGCTTTA

CGGCACCTCGACCCCAAAAAACTTGATTAGGGTGATGGTTCACGTAGTGGGCCATCGCCC

TGATAGACGGTTTTTCGCCCTTTGACGTTGGAGTCCACGTTCTTTAATAGTGGACTCTTG

TTCCAAACTGGAACAACACTCAACCCTATCTCGGTCTATTCTTTTGATTTATAAGGGATT

TTGCCGATTTCGGCCTATTGGTTAAAAAATGAGCTGATTTAACAAAAATTTAACGCGAAT

TTTAACAAAATATTAACGTTTACAATTTAAATATTTGCTTATACAATCTTCCTGTTTTTG

GGGCTTTTCTGATTATCAACCGGGGTACATATGATTGACATGCTAGTTTTACGATTACCG

TTCATCGATTCTCTTGTTTGCTCCAGACTCTCAGGCAATGACCTGATAGCCTTTGTAGAG

ACCTCTCAAAAATAGCTACCCTCTCCGGCATGAATTTATCAGCTAGAACGGTTGAATATC

ATATTGATGGTGATTTGACTGTCTCCGGCCTTTCTCACCCGTTTGAATCTTTACCTACAC

ATTACTCAGGCATTGCATTTAAAATATATGAGGGTTCTAAAAATTTTTATCCTTGCGTTG

AAATAAAGGCTTCTCCCGCAAAAGTATTACAGGGTCATAATGTTTTTGGTACAACCGATT

TAGCTTTATGCTCTGAGGCTTTATTGCTTAATTTTGCTAATTCTTTGCCTTGCCTGTATG

ATTTATTGGATGTTGGAATTCCTGATGCGGTATTTTCTCCTTACGCATCTGTGCGGTATT

TCACACCGCATATGGTGCACTCTCAGTACAATCTGCTCTGATGCCGCATAGTTAAGCCAG

CCCCGACACCCGCCAACACCCGCTGACGCGCCCTGACGGGCTTGTCTGCTCCCGGCATCC

GCTTACAGACAAGCTGTGACCGTCTCCGGGAGCTGCATGTGTCAGAGGTTTTCACCGTCA
```

-continued

```
TCACCGAAACGCGCGAGACGAAAGGGCCTCGTGATACGCCTATTTTTATAGGTTAATGTC
ATGATAATAATGGTTTCTTAGACGTCAGGTGGCACTTTTCGGGGAAATGTGCGCGGAACC
CCTATTTGTTTATTTTTCTAAATACATTCAAATATGTATCCGCTCATGAGACAATAACCC
TGATAAATGCTTCAATAATATTGAAAAAGGAAGAGTATGAGTATTCAACATTTCCGTGTC
GCCCTTATTCCCTTTTTTGCGGCATTTTGCCTTCCTGTTTTTGCTCACCCAGAAACGCTG
GTGAAAGTAAAAGATGCTGAAGATCAGTTGGGTGCACGAGTGGGTTACATCGAACTGGAT
CTCAACAGCGGTAAGATCCTTGAGAGTTTTCGCCCCGAAGAACGTTTTCCAATGATGAGC
ACTTTTAAAGTTCTGCTATGTGGCGCGGTATTATCCCGTATTGACGCCGGGCAAGAGCAA
CTCGGTCGCCGCATACACTATTCTCAGAATGACTTGGTTGAGTACTCACCAGTCACAGAA
AAGCATCTTACGGATGGCATGACAGTAAGAGAATTATGCAGTGCTGCCATAACCATGAGT
GATAACACTGCGGCCAACTTACTTCTGACAACGATCGGAGGACCGAAGGAGCTAACCGCT
TTTTTGCACAACATGGGGGATCATGTAACTCGCCTTGATCGTTGGGAACCGGAGCTGAAT
GAAGCCATACCAAACGACGAGCGTGACACCACGATGCCTGTAGCAATGGCAACAACGTTG
CGCAAACTATTAACTGGCGAACTACTTACTCTAGCTTCCCGGCAACAATTAATAGACTGG
ATGGAGGCGGATAAAGTTGCAGGACCACTTCTGCGCTCGGCCCTTCCGGCTGGCTGGTTT
ATTGCTGATAAATCTGGAGCCGGTGAGCGTGGGTCTCGCGGTATCATTGCAGCACTGGGG
CCAGATGGTAAGCCCTCCCGTATCGTAGTTATCTACACGACGGGGAGTCAGGCAACTATG
GATGAACGAAATAGACAGATCGCTGAGATAGGTGCCTCACTGATTAAGCATTGGTAACTG
TCAGACCAAGTTTACTCATATATACTTTAGATTGATTTAAAACTTCATTTTTAATTTAAA
AGGATCTAGGTGAAGATCCTTTTTGATAATCTCATGACCAAAATCCCTTAACGTGAGTTT
TCGTTCCACTGAGCGTCAGACCCCGTAGAAAAGATCAAAGGATCTTCTTGAGATCCTTTT
TTTCTGCGCGTAATCTGCTGCTTGCAAACAAAAAAACCACCGCTACCAGCGGTGGTTTGT
TTGCCGGATCAAGAGCTACCAACTCTTTTTCCGAAGGTAACTGGCTTCAGCAGAGCGCAG
ATACCAAATACTGTCCTTCTAGTGTAGCCGTAGTTAGGCCACCACTTCAAGAACTCTGTA
GCACCGCCTACATACCTCGCTCTGCTAATCCTGTTACCAGTGGCTGCTGCCAGTGGCGAT
AAGTCGTGTCTTACCGGGTTGGACTCAAGACGATAGTTACCGGATAAGGCGCAGCGGTCG
GGCTGAACGGGGGGTTCGTGCACACAGCCCAGCTTGGAGCGAACGACCTACACCGAACTG
AGATACCTACAGCGTGAGCTATGAGAAAGCGCCACGCTTCCCGAAGGGAGAAAGGCGGAC
AGGTATCCGGTAAGCGGCAGGGTCGGAACAGGAGAGCGCACGAGGGAGCTTCCAGGGGGA
AACGCCTGGTATCTTTATAGTCCTGTCGGGTTTCGCCACCTCTGACTTGAGCGTCGATTT
TTGTGATGCTCGTCAGGGGGGCGGAGCCTATGGAAAAACGCCAGCAACGCGGCCTTTTTA
CGGTTCCTGGCCTTTTGCTGGCCTTTTGCTCACATGTTCTTTCCTGCGTTATCCCCTGAT
TCTGTGGATAACCGTATTACCGCCTTTGAGTGAGCTGATACCGCTCGCCGCAGCCGAACG
ACCGAGCGCAGCGAGTCAGTGAGCGAGGAAGCGGAAGAGCGCCCAATACGCAAACCGCCT
CTCCCCGCGCGTTGGCCGATTCATTAATGCAGCAGCTGCGCGCTCGCTCGCTCACTGAGG
CCGCCCGGGCAAAGCCCGGGCGTCGGGCGACCTTTGGTCGCCCGGCCTCAGTGAGCGAGC
GAGCGCGCAGAGAGGGAGTGGCCAACTCCATCACTAGGGGTTCCTTGTAGTTAATGATTA
ACCCGCCATGCTACTTATCTACGTAGCCATGCTCTAGGACATTGATTATTGACTAGTGGA
GTTCCGCGTTACATAACTTACGGTAAATGGCCCGCCTGGCTGACCGCCCAACGACCCCCG
CCCATTGACGTCAATAATGACGTATGTTCCCATAGTAACGCCAATAGGGACTTTCCATTG
ACGTCAATGGGTGGAGTATTTACGGTAAACTGCCCACTTGGCAGTACATCAAGTGTATCA
```

-continued

TATGCCAAGTACGCCCCCTATTGACGTCAATGACGGTAAATGGCCCGCCTGGCATTATGC

CCAGTACATGACCTTATGGGACTTTCCTACTTGGCAGTACATCTACGTATTAGTCATCGC

TATTACCATGGTCGAGGTGAGCCCCACGTTCTGCTTCACTCTCCCCATCTCCCCCCCCTC

CCCACCCCCAATTTTGTATTTATTTATTTTTTAATTATTTTGTGCAGCGATGGGGGCGGG

GGGGGGGGGGGCGCGCGCCAGGCGGGGCGGGGGGGGCGAGGGGCGGGGCGGGGCGAGG

CGGAGAGGTGCGGCGGCAGCCAATCAGAGCGGCGCGCTCCGAAAGTTTCCTTTTATGGCG

AGGCGGCGGCGGCGGCGGCCCTATAAAAAGCGAAGCGCGCGGCGGGCGGGAGTCGCTGCG

CGCTGCCTTCGCCCCGTGCCCCGCTCCGCCGCCGCCTCGCGCCGCCCGCCCCGGCTCTGA

CTGACCGCGTTACTAAAACAGGTAAGTCCGGCCTCCGCGCCGGGTTTTGGCGCCTCCCGC

GGGCGCCCCCCTCCTCACGGCGAGCGCTGCCACGTCAGACGAAGGGCGCAGCGAGCGTCC

TGATCCTTCCGCCCGGACGCTCAGGACAGCGGCCCGCTGCTCATAAGACTCGGCCTTAGA

ACCCCAGTATCAGCAGAAGGACATTTTAGGACGGGACTTGGGTGACTCTAGGGCACTGGT

TTTCTTTCCAGAGAGCGGAACAGGCGAGGAAAAGTAGTCCCTTCTCGGCGATTCTGCGGA

GGGATCTCCGTGGGCGGTGAACGCCGATGATGCCTCTACTAACCATGTTCATGTTTTCT

TTTTTTTTCTACAGGTCCTGGGTGACGAACAGGGTACCGCCACC 3'

SEQ ID NO. 2 (mRNA expression cassette No. 2-DNAse I-Fc):
5' ATGAGGGGCATGAAGCTGCTGGGGGCGCTGCTGGCACTGGCGGCCCTACTGCAGGGG

GCCGTGTCCCTGAAGATCGCAGCCTTCAACATCCAGACATTTGGGGAGACCAAGATGTCC

AATGCCACCCTCGTCAGCTACATTGTGCAGATCCTGAGCCGCTATGACATCGCCCTGGTC

CAGGAGGTCAGAGACAGCCACCTGACTGCCGTGGGGAAGCTGCTGGACAACCTCAATCAG

GATGCACCAGACACCTATCACTACGTGGTCAGTGAGCCACTGGGACGGAACAGCTATAAG

GAGCGCTACCTGTTCGTGTACAGGCCTGACCAGGTGTCTGCGGTGGACAGCTACTACTAC

GATGATGGCTGCGAGCCCTGCGGGAACGACACCTTCAACCGAGAGCCAGCCATTGTCAGG

TTCTTCTCCCGGTTCACAGAGGTCAGGGAGTTTGCCATTGTTCCCCTGCATGCGGCCCCG

GGGGACGCAGTAGCCGAGATCGACGCTCTCTATGACGTCTACCTGGATGTCCAAGAGAAA

TGGGGCTTGGAGGACGTCATGTTGATGGGCGACTTCAATGCGGGCTGCAGCTATGTGAGA

CCCTCCCAGTGGTCATCCATCCGCCTGTGGACAAGCCCCACCTTCCAGTGGCTGATCCCC

GACAGCGCTGACACCACAGCTACACCCACGCACTGTGCCTATGACAGGATCGTGGTTGCA

GGGATGCTGCTCCGAGGCGCCGTTGTTCCCGACTCGGCTCTTCCCTTTAACTTCCAGGCT

GCCTATGGCCTGAGTGACCAACTGGCCCAAGCCATCAGTGACCACTATCCAGTGGAGGTG

ATGCTGAAGGGCGGATCAGGCGGATCACCCAAATCTTGTGACAAAACTCACACATGCCCA

CCGTGCCCAGCACCTGAACTCCTGGGGGGACCGTCAGTCTTCCTCTTCCCCCCAAAACCC

AAGGACACCCTCATGATCTCCCGGACCCCTGAGGTCACATGCGTGGTGGTGGACGTGAGC

CACGAAGACCCTGAGGTCAAGTTCAACTGGTACGTGGACGGCGTGGAGGTGCATAATGCC

AAGACAAAGCCGCGGGAGGAGCAGTACAACAGCACGTACCGTGTGGTCAGCGTCCTCACC

GTCCTGCACCAGGACTGGCTGAATGGCAAGGAGTACAAGTGCAAGGTCTCCAACAAAGCC

CTCCCAGCCCCCATCGAGAAAACCATCTCCAAAGCCAAAGGGCAGCCCCGAGAACCACAG

GTGTACACCCTGCCCCCATCCCGGGAGGAGATGACCAAGAACCAGGTCAGCCTGACCTGC

CTGGTCAAAGGCTTCTATCCCAGCGACATCGCCGTGGAGTGGGAGAGCAATGGGCAGCCG

GAGAACAACTACAAGACCACGCCTCCCGTGCTGGACTCCGACGGCTCCTTCTTCCTCTAC

AGCAAGCTCACCGTGGACAAGAGCAGGTGGCAGCAGGGGAACGTCTTCTCATGCTCCGTG

-continued

ATGCATGAGGCTCTGCACAACCACTACACGCAGAAGAGCCTCTCCCTGTCTCCGGGTAAA
TAG 3'

SEQ ID NO. 3 (mRNA expression cassette No. 3-TLR3-Fc):
5' GCCAGACCCTGCCGTGCATTTATTTTTGGGGCGGCCTGCTGCCGTTTGGCATGCTGT
GCGCGAGCAGCACCACCAAATGCACCGTGAGCCATGAAGTGGCGGATTGCAGCCATCTGA
AACTGACCCAGGTGCCGGATGATCTGCCGACCAACATTACCGTGCTGAACCTGACCCATA
ACCAGCTGCGCCGCCTGCCGGCGGCGAACTTTACCCGCTATAGCCAGCTGACCAGCCTGG
ATGTGGGCTTTAACACCATTAGCAAACTGGAACCGGAACTGTGCCAGAAACTGCCGATGC
TGAAAGTGCTGAACCTGCAGCATAACGAACTGAGCCAGCTGAGCGATAAAACCTTTGCGT
TTTGCACCAACCTGACCGAACTGCATCTGATGAGCAACAGCATTCAGAAAATTAAAAACA
ACCCGTTTGTGAAACAGAAAAACCTGATTACCCTGGATCTGAGCCATAACGGCCTGAGCA
GCACCAAACTGGGCACCCAGGTGCAGCTGGAAAACCTGCAGGAACTGCTGCTGAGCAACA
ACAAAATTCAGGCGCTGAAAAGCGAAGAACTGGATATTTTTGCGAACAGCAGCCTGAAAA
AACTGGAACTGAGCAGCAACCAGATTAAAGAATTTAGCCCGGGCTGCTTTCATGCGATTG
GCCGCCTGTTTGGCCTGTTTCTGAACAACGTGCAGCTGGGCCCGAGCCTGACCGAAAAAC
TGTGCCTGGAACTGGCGAACACCAGCATTCGCAACCTGAGCCTGAGCAACAGCCAGCTGA
GCACCACCAGCAACACCACCTTTCTGGGCCTGAAATGGACCAACCTGACCATGCTGGATC
TGAGCTATAACAACCTGAACGTGGTGGGCAACGATAGCTTTGCGTGGCTGCCGCAGCTGG
AATATTTTTTCTGGAATATAACAACATTCAGCATCTGTTTAGCCATAGCCTGCATGGCC
TGTTTAACGTGCGCTATCTGAACCTGAAACGCAGCTTTACCAAACAGAGCATTAGCCTGG
CGAGCCTGCCGAAAATTGATGATTTTAGCTTTCAGTGGCTGAAATGCCTGGAACATCTGA
ACATGGAAGATAACGATATTCCGGGCATTAAAAGCAACATGTTTACCGGCCTGATTAACC
TGAAATATCTGAGCCTGAGCAACAGCTTTACCAGCCTGCGCACCCTGACCAACGAAACCT
TTGTGAGCCTGGCGCATAGCCCGCTGCATATTCTGAACCTGACCAAAAACAAAATTAGCA
AAATTGAAAGCGATGCGTTTAGCTGGCTGGGCCATCTGGAAGTGCTGGATCTGGGCCTGA
ACGAAATTGGCCAGGAACTGACCGGCCAGGAATGGCGCGGCCTGGAAAACATTTTTGAAA
TTTATCTGAGCTATAACAAATATCTGCAGCTGACCCGCAACAGCTTTGCGCTGGTGCCGA
GCCTGCAGCGCCTGATGCTGCGCCGCGTGGCGCTGAAAAACGTGGATAGCAGCCCGAGCC
CGTTTCAGCCGCTGCGCAACCTGACCATTCTGGATCTGAGCAACAACAACATTGCGAACA
TTAACGATGATATGCTGGAAGGCCTGGAAAAACTGGAAATTCTGGATCTGCAGCATAACA
ACCTGGCGCGCCTGTGGAAACATGCGAACCCGGGCGGCCCGATTTATTTTCTGAAAGGCC
TGAGCCATCTGCATATTCTGAACCTGGAAAGCAACGGCTTTGATGAAATTCCGGTGGAAG
TGTTTAAAGATCTGTTTGAACTGAAAATTATTGATCTGGGCCTGAACAACCTGAACACCC
TGCCGGCGAGCGTGTTTAACAACCAGGTGAGCCTGAAAAGCCTGAACCTGCAGAAAAACC
TGATTACCAGCGTGGAAAAAAAAGTGTTTGGCCCGGCGTTTCGCAACCTGACCGAACTGG
ATATGCGCTTTAACCCGTTTGATTGCACCTGCGAAAGCATTGCGTGGTTTGTGAACTGGA
TTAACGAAACCCATACCAACATTCCGGAACTGAGCAGCCATTATCTGTGCAACACCCCGC
CGCATTATCATGGCTTTCCGGTGCGCCTGTTTGATACCAGCAGCTGCAAAGATAGCGCGC
CGTTTGAACTGTTTTTTATGATTAACACCAGCATTCTGCTGATTTTTATTTTTATTGTGC
TGCTGATTCATTTTGAAGGCTGGCGCATTAGCTTTTATTGGAACGTGAGCGTGCATCGCG
TGCTGGGCTTTAAAGAAATTGATCGCCAGACCGAACAGTTTGAATATGCGGCGTATATTA

TTCATGCGTATAAAGATAAAGATTGGGTGTGGGAACATTTTAGCAGCATGGAAAAAGAAG

ATCAGAGCCTGAAATTTTGCCTGGAAGAACGCGATTTTGAAGCGGGCGTGTTTGAACTGG

AAGCGATTGTGAACAGCATTAAACGCAGCCGCAAAATTATTTTTGTGATTACCCATCATC

TGCTGAAAGATCCGCTGTGCAAACGCTTTAAAGTGCATCATGCGGTGCAGCAGGCGATTG

AACAGAACCTGGATAGCATTATTCTGGTGTTTCTGGAAGAAATTCCGGATTATAAACTGA

ACCATGCGCTGTGCCTGCGCCGCGGCATGTTTAAAAGCCATTGCATTCTGAACTGGCCGG

TGCAGAAAGAACGCATTGGCGCGTTTCGCCATAAACTGCAGGTGGCGCTGGGCAGCAAAA

ACAGCGTGCATGGGCGGATCAGGCGGATCACCCAAATCTTGTGACAAAACTCACACATGC

CCACCGTGCCCAGCACCTGAACTCCTGGGGGACCGTCAGTCTTCCTCTTCCCCCCAAAA

CCCAAGGACACCCTCATGATCTCCCGGACCCCTGAGGTCACATGCGTGGTGGTGGACGTG

AGCCACGAAGACCCTGAGGTCAAGTTCAACTGGTACGTGGACGGCGTGGAGGTGCATAAT

GCCAAGACAAAGCCGCGGGAGGAGCAGTACAACAGCACGTACCGTGTGGTCAGCGTCCTC

ACCGTCCTGCACCAGGACTGGCTGAATGGCAAGGAGTACAAGTGCAAGGTCTCCAACAAA

GCCCTCCCAGCCCCCATCGAGAAAACCATCTCCAAAGCCAAAGGGCAGCCCCGAGAACCA

CAGGTGTACACCCTGCCCCCATCCCGGGAGGAGATGACCAAGAACCAGGTCAGCCTGACC

TGCCTGGTCAAAGGCTTCTATCCCAGCGACATCGCCGTGGAGTGGGAGAGCAATGGGCAG

CCGGAGAACAACTACAAGACCACGCCTCCCGTGCTGGACTCCGACGGCTCCTTCTTCCTC

TACAGCAAGCTCACCGTGGACAAGAGCAGGTGGCAGCAGGGGAACGTCTTCTCATGCTCC

GTGATGCATGAGGCTCTGCACAACCACTACACGCAGAAGAGCCTCTCCCTGTCTCCGGGT

AAATAG 3'

SEQ ID NO. 4 (miRNA expression cassette No. 4-TLR9-Fc):
5' ATGAGGGGCATGAAGCTGCTGGGGGCGCTGCTGGCACTGGCGGCCCTACTGCAGGGG

GCCGTGTCCATGGGCTTTTGCCGCAGCGCGCTGCATCCGCTGAGCCTGCTGGTGCAGGCG

ATTATGCTGGCGATGACCCTGGCGCTGGGCACCCTGCCGGCGTTTCTGCCGTGCGAACTG

CAGCCGCATGGCCTGGTGAACTGCAACTGGCTGTTTCTGAAAAGCGTGCCGCATTTTAGC

ATGGCGGCGCCGCGCGGCAACGTGACCAGCCTGAGCCTGAGCAGCAACCGCATTCATCAT

CTGCATGATAGCGATTTTGCGCATCTGCCGAGCCTGCGCCATCTGAACCTGAAATGGAAC

TGCCCGCCGGTGGGCCTGAGCCCGATGCATTTTCCGTGCCATATGACCATTGAACCGAGC

ACCTTTCTGGCGGTGCCGACCCTGGAAGAACTGAACCTGAGCTATAACAACATTATGACC

GTGCCGGCGCTGCCGAAAAGCCTGATTAGCCTGAGCCTGAGCCATACCAACATTCTGATG

CTGGATAGCGCGAGCCTGGCGGGCCTGCATGCGCTGCGCTTTCTGTTTATGGATGGCAAC

TGCTATTATAAAAACCCGTGCCGCCAGGCGCTGGAAGTGGCGCCGGGCGCGCTGCTGGGC

CTGGGCAACCTGACCCATCTGAGCCTGAAATATAACAACCTGACCGTGGTGCCGCGCAAC

CTGCCGAGCAGCCTGGAATATCTGCTGCTGAGCTATAACCGCATTGTGAAACTGGCGCCG

GAAGATCTGGCGAACCTGACCGCGCTGCGCGTGCTGGATGTGGGCGGCAACTGCCGCCGC

TGCGATCATGCGCCGAACCCGTGCATGGAATGCCCGCGCCATTTTCCGCAGCTGCATCCG

GATACCTTTAGCCATCTGAGCCGCCTGGAAGGCCTGGTGCTGAAAGATAGCAGCCTGAGC

TGGCTGAACGCGAGCTGGTTTCGCGGCCTGGGCAACCTGCGCGTGCTGGATCTGAGCGAA

AACTTTCTGTATAAATGCATTACCAAAACCAAAGCGTTTCAGGGCCTGACCCAGCTGCGC

AAACTGAACCTGAGCTTTAACTATCAGAAACGCGTGAGCTTTGCGCATCTGAGCCTGGCG

CCGAGCTTTGGCAGCCTGGTGGCGCTGAAAGAACTGGATATGCATGGCATTTTTTTTCGC

-continued

```
AGCCTGGATGAAACCACCCTGCGCCCGCTGGCGCGCCTGCCGATGCTGCAGACCCTGCGC

CTGCAGATGAACTTTATTAACCAGGCGCAGCTGGGCATTTTTCGCGCGTTTCCGGGCCTG

CGCTATGTGGATCTGAGCGATAACCGCATTAGCGGCGCGAGCGAACTGACCGCGACCATG

GGCGAAGCGGATGGCGGCGAAAAAGTGTGGCTGCAGCCGGGCGATCTGGCGCCGGCGCCG

GTGGATACCCCGAGCAGCGAAGATTTTCGCCCGAACTGCAGCACCCTGAACTTTACCCTG

GATCTGAGCCGCAACAACCTGGTGACCGTGCAGCCGGAAATGTTTGCGCAGCTGAGCCAT

CTGCAGTGCCTGCGCCTGAGCCATAACTGCATTAGCCAGGCGGTGAACGGCAGCCAGTTT

CTGCCGCTGACCGGCCTGCAGGTGCTGGATCTGAGCCATAACAAACTGGATCTGTATCAT

GAACATAGCTTTACCGAACTGCCGCGCCTGGAAGCGCTGGATCTGAGCTATAACAGCCAG

CCGTTTGGCATGCAGGGCGTGGGCCATAACTTTAGCTTTGTGGCGCATCTGCGCACCCTG

CGCCATCTGAGCCTGGCGCATAACAACATTCATAGCCAGGTGAGCCAGCAGCTGTGCAGC

ACCAGCCTGCGCGCGCTGGATTTTAGCGGCAACGCGCTGGGCCATATGTGGGCGGAAGGC

GATCTGTATCTGCATTTTTTTCAGGGCCTGAGCGGCCTGATTTGGCTGGATCTGAGCCAG

AACCGCCTGCATACCCTGCTGCCGCAGACCCTGCGCAACCTGCCGAAAAGCCTGCAGGTG

CTGCGCCTGCGCGATAACTATCTGGCGTTTTTTAAATGGTGGAGCCTGCATTTTCTGCCG

AAACTGGAAGTGCTGGATCTGGCGGGCAACCAGCTGAAAGCGCTGACCAACGGCAGCCTG

CCGGCGGGCACCCGCCTGCGCCGCCTGGATGTGAGCTGCAACAGCATTAGCTTTGTGGCG

CCGGGCTTTTTTAGCAAAGCGAAAGAACTGCGCGAACTGAACCTGAGCGCGAACGCGCTG

AAAACCGTGGATCATAGCTGGTTTGGCCCGCTGGCGAGCGCGCTGCAGATTCTGGATGTG

AGCGCGAACCCGCTGCATTGCGCGTGCGGCGCGGCGTTTATGGATTTTCTGCTGGAAGTG

CAGGCGGCGGTGCCGGGCCTGCCGAGCCGCGTGAAATGCGGCAGCCCGGGCCAGCTGCAG

GGCCTGAGCATTTTTGCGCAGGATCTGCGCCTGTGCCTGGATGAAGCGCTGAGCTGGGAT

TGCTTTGCGCTGAGCCTGCTGGCGGTGGCGCTGGGCCTGGGCGTGCCGATGCTGCATCAT

CTGTGCGGCTGGGATCTGTGGTATTGCTTTCATCTGTGCCTGGCGTGGCTGCCGTGGCGC

GGCCGCCAGAGCGGCCGCGATGAAGATGCGCTGCCGTATGATGCGTTTGTGGTGTTTGAT

AAAACCCAGAGCGCGGTGGCGGATTGGGTGTATAACGAACTGCGCGGCCAGCTGGAAGAA

TGCCGCGGCCGCTGGGCGCTGCGCCTGTGCCTGGAAGAACGCGATTGGCTGCCGGGCAAA

ACCCTGTTTGAAAACCTGTGGGCGAGCGTGTATGGCAGCCGCAAAACCCTGTTTGTGCTG

GCGCATACCGATCGCGTGAGCGGCCTGCTGCGCGCGAGCTTTCTGCTGGCGCAGCAGCGC

CTGCTGGAAGATCGCAAAGATGTGGTGGTGCTGGTGATTCTGAGCCCGGATGGCCGCCGC

AGCCGCTATGTGCGCCTGCGCCAGCGCCTGTGCCGCCAGAGCGTGCTGCTGTGGCCGCAT

CAGCCGAGCGGCCAGCGCAGCTTTTGGGCGCAGCTGGGCATGGCGCTGACCCGCGATAAC

CATCATTTTATAACCGCAACTTTTGCCAGGGCCCGACCGCGGAAGGGCGGATCAGGCGG

ATCACCCAAATCTTGTGACAAAACTCACACATGCCCACCGTGCCCAGCACCTGAACTCCT

GGGGGGACCGTCAGTCTTCCTCTTCCCCCCAAAACCCAAGGACACCCTCATGATCTCCCG

GACCCCTGAGGTCACATGCGTGGTGGTGGACGTGAGCCACGAAGACCCTGAGGTCAAGTT

CAACTGGTACGTGGACGGCGTGGAGGTGCATAATGCCAAGACAAAGCCGCGGGAGGAGCA

GTACAACAGCACGTACCGTGTGGTCAGCGTCCTCACCGTCCTGCACCAGGACTGGCTGAA

TGGCAAGGAGTACAAGTGCAAGGTCTCCAACAAAGCCCTCCCAGCCCCCATCGAGAAAAC

CATCTCCAAAGCCAAAGGGCAGCCCCGAGAACCACAGGTGTACACCCTGCCCCCATCCCG
```

-continued

GGAGGAGATGACCAAGAACCAGGTCAGCCTGACCTGCCTGGTCAAAGGCTTCTATCCCAG

CGACATCGCCGTGGAGTGGGAGAGCAATGGGCAGCCGGAGAACAACTACAAGACCACGCC

TCCCGTGCTGGACTCCGACGGCTCCTTCTTCCTCTACAGCAAGCTCACCGTGGACAAGAG

CAGGTGGCAGCAGGGGAACGTCTTCTCATGCTCCGTGATGCATGAGGCTCTGCACAACCA

CTACACGCAGAAGAGCCTCTCCCTGTCTCCGGGTAAATAG 3'

SEQ ID NO. 5 (mRNA expression cassette No. 5-NGF-Fc):
5' ATGAGGGGCATGAAGCTGCTGGGGGCGCTGCTGGCACTGGCGGCCCTACTGCAGGGG

GCCGTGTCCATGAGCATGCTGTTTTATACCCTGATTACCGCGTTTCTGATTGGCATTCAG

GCGGAACCGCATAGCGAAAGCAACGTGCCGGCGGGCCATACCATTCCGCAGGCGCATTGG

ACCAAACTGCAGCATAGCCTGGATACCGCGCTGCGCCGCGCGCAGCGCGCCGGCGGCG

GCGATTGCGGCGCGCGTGGCGGGCCAGACCCGCAACATTACCGTGGATCCGCGCCTGTTT

AAAAAACGCCGCCTGCGCAGCCCGCGCGTGCTGTTTAGCACCCAGCCGCCGCGCGAAGCG

GCGGATACCCAGGATCTGGATTTTGAAGTGGGCGGCGCGGCGCCGTTTAACCGCACCCAT

CGCAGCAAACGCAGCAGCAGCCATCCGATTTTTCATCGCGGCGAATTTAGCGTGTGCGAT

AGCGTGAGCGTGTGGGTGGGCGATAAAACCACCGCGACCGATATTAAAGGCAAAGAAGTG

ATGGTGCTGGGCGAAGTGAACATTAACAACAGCGTGTTTAAACAGTATTTTTTTGAAACC

AAATGCCGCGATCCGAACCCGGTGGATAGCGGCTGCCGCGGCATTGATAGCAAACATTGG

AACAGCTATTGCACCACCACCCATACCTTTGTGAAAGCGCTGACCATGGATGGCAAACAG

GCGGCGTGGCGCTTTATTCGCATTGATACCGCGTGCGTGTGCGTGCTGAGCCGCAAAGCG

GTGCGCCGCGCGGGCGGATCAGGCGGATCACCCAAATCTTGTGACAAAACTCACACATGC

CCACCGTGCCCAGCACCTGAACTCCTGGGGGGACCGTCAGTCTTCCTCTTCCCCCCAAAA

CCCAAGGACACCCTCATGATCTCCCGGACCCCTGAGGTCACATGCGTGGTGGTGGACGTG

AGCCACGAAGACCCTGAGGTCAAGTTCAACTGGTACGTGGACGGCGTGGAGGTGCATAAT

GCCAAGACAAAGCCGCGGGAGGAGCAGTACAACAGCACGTACCGTGTGGTCAGCGTCCTC

ACCGTCCTGCACCAGGACTGGCTGAATGGCAAGGAGTACAAGTGCAAGGTCTCCAACAAA

GCCCTCCCAGCCCCCATCGAGAAAACCATCTCCAAAGCCAAAGGGCAGCCCCGAGAACCA

CAGGTGTACACCCTGCCCCCATCCCGGGAGGAGATGACCAAGAACCAGGTCAGCCTGACC

TGCCTGGTCAAAGGCTTCTATCCCAGCGACATCGCCGTGGAGTGGGAGAGCAATGGGCAG

CCGGAGAACAACTACAAGACCACGCCTCCCGTGCTGGACTCCGACGGCTCCTTCTTCCTC

TACAGCAAGCTCACCGTGGACAAGAGCAGGTGGCAGCAGGGGAACGTCTTCTCATGCTCC

GTGATGCATGAGGCTCTGCACAACCACTACACGCAGAAGAGCCTCTCCCTGTCTCCGGGT

AAATAG 3'

SEQ ID NO. 6 (mRNA expression cassette No. 6-insulin-Fc):
5' ATGAGGGGCATGAAGCTGCTGGGGGCGCTGCTGGCACTGGCGGCCCTACTGCAGGGG

GCCGTGTCCATGGCGCTGTGGATGCGCCTGCTGCCGCTGCTGGCGCTGCTGGCGCTGTGG

GGCCCGGATCCGGCGGCGGCGTTTGTGAACCAGCATCTGTGCGGCAGCCATCTGGTGGAA

GCGCTGTATCTGGTGTGCGGCGAACGCGGCTTTTTTTATACCCCGAAAACCCGCCGCGAA

GCGGAAGATCTGCAGGTGGGCCAGGTGGAACTGGGCGGCGGCCCGGGCGCGGGCAGCCTG

CAGCCGCTGGCGCTGGAAGGCAGCCTGCAGAAACGCGGCATTGTGGAACAGTGCTGCACC

AGCATTTGCAGCCTGTATCAGCTGGAAAACTATTGCAACGGGCGGATCAGGCGGATCACC

CAAATCTTGTGACAAAACTCACACATGCCCACCGTGCCCAGCACCTGAACTCCTGGGGGG

ACCGTCAGTCTTCCTCTTCCCCCCAAAACCCAAGGACACCCTCATGATCTCCCGGACCCC

-continued

TGAGGTCACATGCGTGGTGGTGGACGTGAGCCACGAAGACCCTGAGGTCAAGTTCAACTG

GTACGTGGACGGCGTGGAGGTGCATAATGCCAAGACAAAGCCGCGGGAGGAGCAGTACAA

CAGCACGTACCGTGTGGTCAGCGTCCTCACCGTCCTGCACCAGGACTGGCTGAATGGCAA

GGAGTACAAGTGCAAGGTCTCCAACAAAGCCCTCCCAGCCCCCATCGAGAAAACCATCTC

CAAAGCCAAAGGGCAGCCCCGAGAACCACAGGTGTACACCCTGCCCCCATCCCGGGAGGA

GATGACCAAGAACCAGGTCAGCCTGACCTGCCTGGTCAAAGGCTTCTATCCCAGCGACAT

CGCCGTGGAGTGGGAGAGCAATGGGCAGCCGGAGAACAACTACAAGACCACGCCTCCCGT

GCTGGACTCCGACGGCTCCTTCTTCCTCTACAGCAAGCTCACCGTGGACAAGAGCAGGTG

GCAGCAGGGGAACGTCTTCTCATGCTCCGTGATGCATGAGGCTCTGCACAACCACTACAC

GCAGAAGAGCCTCTCCCTGTCTCCGGGTAAATAG 3'

SEQ ID NO: 7 = SEQ ID NO: 1 + SEQ ID NO: 2
5' TTCTAGAATAATCAACCTCTGGATTACAAAATTTGTGAAAGATTGACTGGTATTCTT

AACTATGTTGCTCCTTTTACGCTATGTGGATACGCTGCTTTAATGCCTTTGTATCATGCT

ATTGCTTCCCGTATGGCTTTCATTTTCTCCTCCTTGTATAAATCCTGGTTGCTGTCTCTT

TATGAGGAGTTGTGGCCCGTTGTCAGGCAACGTGGCGTGGTGTGCACTGTGTTTGCTGAC

GCAACCCCACTGGTTGGGGCATTGCCACCACCTGTCAGCTCCTTTCCGGGACTTTCGCT

TTCCCCCTCCCTATTGCCACGGCGGAACTCATCGCCGCCTGCCTTGCCCGCTGCTGGACA

GGGGCTCGGCTGTTGGGCACTGACAATTCCGTGGTGTTGTCGGGGAAATCATCGTCCTTT

CCTTGGCTGCTCGCCTGTGTTGCCACCTGGATTCTGCGCGGGACGTCCTTCTGCTACGTC

CCTTCGGCCCTCAATCCAGCGGACCTTCCTTCCCGCGGCCTGCTGCCGGCTCTGCGGCCT

CTTCCGCGTCTTCGCCTTCGCCCTCAGACGAGTCGGATCTCCCTTTGGGCCGCCTCCCCG

CCTAAGCTTATCGATACCGTCGAGATCTAACTTGTTTATTGCAGCTTATAATGGTTACAA

ATAAAGCAATAGCATCACAAATTTCACAAATAAAGCATTTTTTTCACTGCATTCTAGTTG

TGGTTTGTCCAAACTCATCAATGTATCTTATCATGTCTGGATCTCGACCTCGACTAGAGC

ATGGCTACGTAGATAAGTAGCATGGCGGGTTAATCATTAACTACAAGGAACCCCTAGTGA

TGGAGTTGGCCACTCCCTCTCTGCGCGCTCGCTCGCTCACTGAGGCCGGGCGACCAAAGG

TCGCCCGACGCCCGGGCTTTGCCCGGGCGGCCTCAGTGAGCGAGCGAGCGCGCCAGCTGG

CGTAATAGCGAAGAGGCCCGCACCGATCGCCCTTCCCAACAGTTGCGCAGCCTGAATGGC

GAATGGAATTCCAGACGATTGAGCGTCAAAATGTAGGTATTTCCATGAGCGTTTTTCCTG

TTGCAATGGCTGGCGGTAATATTGTTCTGGATATTACCAGCAAGGCCGATAGTTTGAGTT

CTTCTACTCAGGCAAGTGATGTTATTACTAATCAAAGAAGTATTGCGACAACGGTTAATT

TGCGTGATGGACAGACTCTTTTACTCGGTGGCCTCACTGATTATAAAAACACTTCTCAGG

ATTCTGGCGTACCGTTCCTGTCTAAAATCCCTTTAATCGGCCTCCTGTTTAGCTCCCGCT

CTGATTCTAACGAGGAAAGCACGTTATACGTGCTCGTCAAAGCAACCATAGTACGCGCCC

TGTAGCGGCGCATTAAGCGCGGCGGGTGTGGTGGTTACGCGCAGCGTGACCGCTACACTT

GCCAGCGCCCTAGCGCCCGCTCCTTTCGCTTTCTTCCCTTCCTTTCTCGCCACGTTCGCC

GGCTTTCCCCGTCAAGCTCTAAATCGGGGGCTCCCTTTAGGGTTCCGATTTAGTGCTTTA

CGGCACCTCGACCCCAAAAAACTTGATTAGGGTGATGGTTCACGTAGTGGGCCATCGCCC

TGATAGACGGTTTTTCGCCCTTTGACGTTGGAGTCCACGTTCTTTAATAGTGGACTCTTG

TTCCAAACTGGAACAACACTCAACCCTATCTCGGTCTATTCTTTTGATTTATAAGGGATT

TTGCCGATTTCGGCCTATTGGTTAAAAAATGAGCTGATTTAACAAAAATTTAACGCGAAT

-continued

```
TTTAACAAAATATTAACGTTTACAATTTAAATATTTGCTTATACAATCTTCCTGTTTTTG

GGGCTTTTCTGATTATCAACCGGGGTACATATGATTGACATGCTAGTTTTACGATTACCG

TTCATCGATTCTCTTGTTTGCTCCAGACTCTCAGGCAATGACCTGATAGCCTTTGTAGAG

ACCTCTCAAAAATAGCTACCCTCTCCGGCATGAATTTATCAGCTAGAACGGTTGAATATC

ATATTGATGGTGATTTGACTGTCTCCGGCCTTTCTCACCCGTTTGAATCTTTACCTACAC

ATTACTCAGGCATTGCATTTAAAATATATGAGGGTTCTAAAAATTTTTATCCTTGCGTTG

AAATAAAGGCTTCTCCCGCAAAAGTATTACAGGGTCATAATGTTTTTGGTACAACCGATT

TAGCTTTATGCTCTGAGGCTTTATTGCTTAATTTTGCTAATTCTTTGCCTTGCCTGTATG

ATTTATTGGATGTTGGAATTCCTGATGCGGTATTTTCTCCTTACGCATCTGTGCGGTATT

TCACACCGCATATGGTGCACTCTCAGTACAATCTGCTCTGATGCCGCATAGTTAAGCCAG

CCCCGACACCCGCCAACACCCGCTGACGCGCCCTGACGGGCTTGTCTGCTCCCGGCATCC

GCTTACAGACAAGCTGTGACCGTCTCCGGGAGCTGCATGTGTCAGAGGTTTTCACCGTCA

TCACCGAAACGCGCGAGACGAAAGGGCCTCGTGATACGCCTATTTTTATAGGTTAATGTC

ATGATAATAATGGTTTCTTAGACGTCAGGTGGCACTTTTCGGGGAAATGTGCGCGGAACC

CCTATTTGTTTATTTTTCTAAATACATTCAAATATGTATCCGCTCATGAGACAATAACCC

TGATAAATGCTTCAATAATATTGAAAAAGGAAGAGTATGAGTATTCAACATTTCCGTGTC

GCCCTTATTCCCTTTTTTGCGGCATTTTGCCTTCCTGTTTTTGCTCACCCAGAAACGCTG

GTGAAAGTAAAAGATGCTGAAGATCAGTTGGGTGCACGAGTGGGTTACATCGAACTGGAT

CTCAACAGCGGTAAGATCCTTGAGAGTTTTCGCCCCGAAGAACGTTTTCCAATGATGAGC

ACTTTTAAAGTTCTGCTATGTGGCGCGGTATTATCCCGTATTGACGCCGGGCAAGAGCAA

CTCGGTCGCCGCATACACTATTCTCAGAATGACTTGGTTGAGTACTCACCAGTCACAGAA

AAGCATCTTACGGATGGCATGACAGTAAGAGAATTATGCAGTGCTGCCATAACCATGAGT

GATAACACTGCGGCCAACTTACTTCTGACAACGATCGGAGGACCGAAGGAGCTAACCGCT

TTTTTGCACAACATGGGGGATCATGTAACTCGCCTTGATCGTTGGGAACCGGAGCTGAAT

GAAGCCATACCAAACGACGAGCGTGACACCACGATGCCTGTAGCAATGGCAACAACGTTG

CGCAAACTATTAACTGGCGAACTACTTACTCTAGCTTCCCGGCAACAATTAATAGACTGG

ATGGAGGCGGATAAAGTTGCAGGACCACTTCTGCGCTCGGCCCTTCCGGCTGGCTGGTTT

ATTGCTGATAAATCTGGAGCCGGTGAGCGTGGGTCTCGCGGTATCATTGCAGCACTGGGG

CCAGATGGTAAGCCCTCCCGTATCGTAGTTATCTACACGACGGGGAGTCAGGCAACTATG

GATGAACGAAATAGACAGATCGCTGAGATAGGTGCCTCACTGATTAAGCATTGGTAACTG

TCAGACCAAGTTTACTCATATATACTTTAGATTGATTTAAAACTTCATTTTTAATTTAAA

AGGATCTAGGTGAAGATCCTTTTTGATAATCTCATGACCAAAATCCCTTAACGTGAGTTT

TCGTTCCACTGAGCGTCAGACCCCGTAGAAAAGATCAAAGGATCTTCTTGAGATCCTTTT

TTTCTGCGCGTAATCTGCTGCTTGCAAACAAAAAAACCACCGCTACCAGCGGTGGTTTGT

TTGCCGGATCAAGAGCTACCAACTCTTTTTCCGAAGGTAACTGGCTTCAGCAGAGCGCAG

ATACCAAATACTGTCCTTCTAGTGTAGCCGTAGTTAGGCCACCACTTCAAGAACTCTGTA

GCACCGCCTACATACCTCGCTCTGCTAATCCTGTTACCAGTGGCTGCTGCCAGTGGCGAT

AAGTCGTGTCTTACCGGGTTGGACTCAAGACGATAGTTACCGGATAAGGCGCAGCGGTCG

GGCTGAACGGGGGGTTCGTGCACACAGCCCAGCTTGGAGCGAACGACCTACACCGAACTG

AGATACCTACAGCGTGAGCTATGAGAAAGCGCCACGCTTCCCGAAGGGAGAAAGGCGGAC
```

-continued

```
AGGTATCCGGTAAGCGGCAGGGTCGGAACAGGAGAGCGCACGAGGGAGCTTCCAGGGGGA
AACGCCTGGTATCTTTATAGTCCTGTCGGGTTTCGCCACCTCTGACTTGAGCGTCGATTT
TTGTGATGCTCGTCAGGGGGCGGAGCCTATGGAAAAACGCCAGCAACGCGGCCTTTTTA
CGGTTCCTGGCCTTTTGCTGGCCTTTTGCTCACATGTTCTTTCCTGCGTTATCCCCTGAT
TCTGTGGATAACCGTATTACCGCCTTTGAGTGAGCTGATACCGCTCGCCGCAGCCGAACG
ACCGAGCGCAGCGAGTCAGTGAGCGAGGAAGCGGAAGAGCGCCCAATACGCAAACCGCCT
CTCCCCGCGCGTTGGCCGATTCATTAATGCAGCAGCTGCGCGCTCGCTCGCTCACTGAGG
CCGCCCGGGCAAAGCCCGGGCGTCGGGCGACCTTTGGTCGCCCGGCCTCAGTGAGCGAGC
GAGCGCGCAGAGAGGGAGTGGCCAACTCCATCACTAGGGGTTCCTTGTAGTTAATGATTA
ACCCGCCATGCTACTTATCTACGTAGCCATGCTCTAGGACATTGATTATTGACTAGTGGA
GTTCCGCGTTACATAACTTACGGTAAATGGCCCGCCTGGCTGACCGCCCAACGACCCCCG
CCCATTGACGTCAATAATGACGTATGTTCCCATAGTAACGCCAATAGGGACTTTCCATTG
ACGTCAATGGGTGGAGTATTTACGGTAAACTGCCCACTTGGCAGTACATCAAGTGTATCA
TATGCCAAGTACGCCCCCTATTGACGTCAATGACGGTAAATGGCCCGCCTGGCATTATGC
CCAGTACATGACCTTATGGGACTTTCCTACTTGGCAGTACATCTACGTATTAGTCATCGC
TATTACCATGGTCGAGGTGAGCCCCACGTTCTGCTTCACTCTCCCCATCTCCCCCCCCTC
CCCACCCCCAATTTTGTATTTATTTATTTTTTAATTATTTTGTGCAGCGATGGGGGCGGG
GGGGGGGGGGGCGCGCGCCAGGCGGGGCGGGGGGGGCGAGGGGCGGGGCGGGGCGAGG
CGGAGAGGTGCGGCGGCAGCCAATCAGAGCGGCGCGCTCCGAAAGTTTCCTTTTATGGCG
AGGCGGCGGCGGCGGCGGCCCTATAAAAAGCGAAGCGCGCGGCGGGCGGGAGTCGCTGCG
CGCTGCCTTCGCCCCGTGCCCCGCTCCGCCGCCGCCTCGCGCCGCCCGCCCCGGCTCTGA
CTGACCGCGTTACTAAAACAGGTAAGTCCGGCCTCCGCGCCGGGTTTTGGCGCCTCCCGC
GGGCGCCCCCTCCTCACGGCGAGCGCTGCCACGTCAGACGAAGGGCGCAGCGAGCGTCC
TGATCCTTCCGCCCGGACGCTCAGGACAGCGGCCCGCTGCTCATAAGACTCGGCCTTAGA
ACCCCAGTATCAGCAGAAGGACATTTTAGGACGGGACTTGGGTGACTCTAGGGCACTGGT
TTTCTTTCCAGAGAGCGGAACAGGCGAGGAAAAGTAGTCCCTTCTCGGCGATTCTGCGGA
GGGATCTCCGTGGGGCGGTGAACGCCGATGATGCCTCTACTAACCATGTTCATGTTTTCT
TTTTTTTTCTACAGGTCCTGGGTGACGAACAGGGTACCGCCACCATGAGGGGCATGAAGC
TGCTGGGGGCGCTGCTGGCACTGGCGGCCCTACTGCAGGGGCCGTGTCCCTGAAGATCG
CAGCCTTCAACATCCAGACATTTGGGGAGACCAAGATGTCCAATGCCACCCTCGTCAGCT
ACATTGTGCAGATCCTGAGCCGCTATGACATCGCCCTGGTCCAGGAGGTCAGAGACAGCC
ACCTGACTGCCGTGGGAAGCTGCTGGACAACCTCAATCAGGATGCACCAGACACCTATC
ACTACGTGGTCAGTGAGCCACTGGGACGGAACAGCTATAAGGAGCGCTACCTGTTCGTGT
ACAGGCCTGACCAGGTGTCTGCGGTGGACAGCTACTACTACGATGATGGCTGCGAGCCCT
GCGGGAACGACACCTTCAACCGAGAGCCAGCCATTGTCAGGTTCTTCTCCCGGTTCACAG
AGGTCAGGGAGTTTGCCATTGTTCCCCTGCATGCGGCCCCGGGGGACGCAGTAGCCGAGA
TCGACGCTCTCTATGACGTCTACCTGGATGTCCAAGAGAAATGGGGCTTGGAGGACGTCA
TGTTGATGGGCGACTTCAATGCGGGCTGCAGCTATGTGAGACCCTCCCAGTGGTCATCCA
TCCGCCTGTGGACAAGCCCCACCTTCCAGTGGCTGATCCCCGACAGCGCTGACACCACAG
CTACACCCACGCACTGTGCCTATGACAGGATCGTGGTTGCAGGGATGCTGCTCCGAGGCG
CCGTTGTTCCCGACTCGGCTCTTCCCTTTAACTTCCAGGCTGCCTATGGCCTGAGTGACC
```

-continued

```
AACTGGCCCAAGCCATCAGTGACCACTATCCAGTGGAGGTGATGCTGAAGGGCGGATCAG

GCGGATCACCCAAATCTTGTGACAAAACTCACACATGCCCACCGTGCCCAGCACCTGAAC

TCCTGGGGGGACCGTCAGTCTTCCTCTTCCCCCCAAAACCCAAGGACACCCTCATGATCT

CCCGGACCCCTGAGGTCACATGCGTGGTGGTGGACGTGAGCCACGAAGACCCTGAGGTCA

AGTTCAACTGGTACGTGGACGGCGTGGAGGTGCATAATGCCAAGACAAAGCCGCGGGAGG

AGCAGTACAACAGCACGTACCGTGTGGTCAGCGTCCTCACCGTCCTGCACCAGGACTGGC

TGAATGGCAAGGAGTACAAGTGCAAGGTCTCCAACAAAGCCCTCCCAGCCCCCATCGAGA

AAACCATCTCCAAAGCCAAAGGGCAGCCCCGAGAACCACAGGTGTACACCCTGCCCCCAT

CCCGGGAGGAGATGACCAAGAACCAGGTCAGCCTGACCTGCCTGGTCAAAGGCTTCTATC

CCAGCGACATCGCCGTGGAGTGGGAGAGCAATGGGCAGCCGGAGAACAACTACAAGACCA

CGCCTCCCGTGCTGGACTCCGACGGCTCCTTCTTCCTCTACAGCAAGCTCACCGTGGACA

AGAGCAGGTGGCAGCAGGGGAACGTCTTCTCATGCTCCGTGATGCATGAGGCTCTGCACA

ACCACTACACGCAGAAGAGCCTCTCCCTGTCTCCGGGTAAATAG 3'

SEQ ID NO: 8 = SEQ ID NO: 1 + SEQ ID NO: 3
5' TTCTAGAATAATCAACCTCTGGATTACAAAATTTGTGAAAGATTGACTGGTATTCTT

AACTATGTTGCTCCTTTTACGCTATGTGGATACGCTGCTTTAATGCCTTTGTATCATGCT

ATTGCTTCCCGTATGGCTTTCATTTTCTCCTCCTTGTATAAATCCTGGTTGCTGTCTCTT

TATGAGGAGTTGTGGCCCGTTGTCAGGCAACGTGGCGTGGTGTGCACTGTGTTTGCTGAC

GCAACCCCCACTGGTTGGGGCATTGCCACCACCTGTCAGCTCCTTTCCGGGACTTTCGCT

TTCCCCCTCCCTATTGCCACGGCGGAACTCATCGCCGCCTGCCTTGCCCGCTGCTGGACA

GGGGCTCGGCTGTTGGGCACTGACAATTCCGTGGTGTTGTCGGGGAAATCATCGTCCTTT

CCTTGGCTGCTCGCCTGTGTTGCCACCTGGATTCTGCGCGGGACGTCCTTCTGCTACGTC

CCTTCGGCCCTCAATCCAGCGGACCTTCCTTCCCGCGGCCTGCTGCCGGCTCTGCGGCCT

CTTCCGCGTCTTCGCCTTCGCCCTCAGACGAGTCGGATCTCCCTTTGGGCCGCCTCCCCG

CCTAAGCTTATCGATACCGTCGAGATCTAACTTGTTTATTGCAGCTTATAATGGTTACAA

ATAAAGCAATAGCATCACAAATTTCACAAATAAAGCATTTTTTTCACTGCATTCTAGTTG

TGGTTTGTCCAAACTCATCAATGTATCTTATCATGTCTGGATCTCGACCTCGACTAGAGC

ATGGCTACGTAGATAAGTAGCATGGCGGGTTAATCATTAACTACAAGGAACCCCTAGTGA

TGGAGTTGGCCACTCCCTCTCTGCGCGCTCGCTCGCTCACTGAGGCCGGGCGACCAAAGG

TCGCCCGACGCCCGGGCTTTGCCCGGGCGGCCTCAGTGAGCGAGCGAGCGCGCCAGCTGG

CGTAATAGCGAAGAGGCCCGCACCGATCGCCCTTCCCAACAGTTGCGCAGCCTGAATGGC

GAATGGAATTCCAGACGATTGAGCGTCAAAATGTAGGTATTTCCATGAGCGTTTTTCCTG

TTGCAATGGCTGGCGGTAATATTGTTCTGGATATTACCAGCAAGGCCGATAGTTTGAGTT

CTTCTACTCAGGCAAGTGATGTTATTACTAATCAAAGAAGTATTGCGACAACGGTTAATT

TGCGTGATGGACAGACTCTTTTACTCGGTGGCCTCACTGATTATAAAAACACTTCTCAGG

ATTCTGGCGTACCGTTCCTGTCTAAAATCCCTTTAATCGGCCTCCTGTTTAGCTCCCGCT

CTGATTCTAACGAGGAAAGCACGTTATACGTGCTCGTCAAAGCAACCATAGTACGCGCCC

TGTAGCGGCGCATTAAGCGCGGCGGGTGTGGTGGTTACGCGCAGCGTGACCGCTACACTT

GCCAGCGCCCTAGCGCCCGCTCCTTTCGCTTTCTTCCCTTCCTTTCTCGCCACGTTCGCC

GGCTTTCCCCGTCAAGCTCTAAATCGGGGGCTCCCTTTAGGGTTCCGATTTAGTGCTTTA

CGGCACCTCGACCCCAAAAAACTTGATTAGGGTGATGGTTCACGTAGTGGGCCATCGCCC
```

-continued

```
TGATAGACGGTTTTTCGCCCTTTGACGTTGGAGTCCACGTTCTTTAATAGTGGACTCTTG

TTCCAAACTGGAACAACACTCAACCCTATCTCGGTCTATTCTTTTGATTTATAAGGGATT

TTGCCGATTTCGGCCTATTGGTTAAAAAATGAGCTGATTTAACAAAAATTTAACGCGAAT

TTTAACAAAATATTAACGTTTACAATTTAAATATTTGCTTATACAATCTTCCTGTTTTTG

GGGCTTTTCTGATTATCAACCGGGGTACATATGATTGACATGCTAGTTTTACGATTACCG

TTCATCGATTCTCTTGTTTGCTCCAGACTCTCAGGCAATGACCTGATAGCCTTTGTAGAG

ACCTCTCAAAAATAGCTACCCTCTCCGGCATGAATTTATCAGCTAGAACGGTTGAATATC

ATATTGATGGTGATTTGACTGTCTCCGGCCTTTCTCACCCGTTTGAATCTTTACCTACAC

ATTACTCAGGCATTGCATTTAAAATATATGAGGGTTCTAAAAATTTTTATCCTTGCGTTG

AAATAAAGGCTTCTCCCGCAAAAGTATTACAGGGTCATAATGTTTTTGGTACAACCGATT

TAGCTTTATGCTCTGAGGCTTTATTGCTTAATTTTGCTAATTCTTTGCCTTGCCTGTATG

ATTTATTGGATGTTGGAATTCCTGATGCGGTATTTTCTCCTTACGCATCTGTGCGGTATT

TCACACCGCATATGGTGCACTCTCAGTACAATCTGCTCTGATGCCGCATAGTTAAGCCAG

CCCCGACACCCGCCAACACCCGCTGACGCGCCCTGACGGGCTTGTCTGCTCCCGGCATCC

GCTTACAGACAAGCTGTGACCGTCTCCGGGAGCTGCATGTGTCAGAGGTTTTCACCGTCA

TCACCGAAACGCGCGAGACGAAAGGGCCTCGTGATACGCCTATTTTTATAGGTTAATGTC

ATGATAATAATGGTTTCTTAGACGTCAGGTGGCACTTTTCGGGGAAATGTGCGCGGAACC

CCTATTTGTTTATTTTTCTAAATACATTCAAATATGTATCCGCTCATGAGACAATAACCC

TGATAAATGCTTCAATAATATTGAAAAAGGAAGAGTATGAGTATTCAACATTTCCGTGTC

GCCCTTATTCCCTTTTTTGCGGCATTTTGCCTTCCTGTTTTTGCTCACCCAGAAACGCTG

GTGAAAGTAAAAGATGCTGAAGATCAGTTGGGTGCACGAGTGGGTTACATCGAACTGGAT

CTCAACAGCGGTAAGATCCTTGAGAGTTTTCGCCCCGAAGAACGTTTTCCAATGATGAGC

ACTTTTAAAGTTCTGCTATGTGGCGCGGTATTATCCCGTATTGACGCCGGGCAAGAGCAA

CTCGGTCGCCGCATACACTATTCTCAGAATGACTTGGTTGAGTACTCACCAGTCACAGAA

AAGCATCTTACGGATGGCATGACAGTAAGAGAATTATGCAGTGCTGCCATAACCATGAGT

GATAACACTGCGGCCAACTTACTTCTGACAACGATCGGAGGACCGAAGGAGCTAACCGCT

TTTTTGCACAACATGGGGGATCATGTAACTCGCCTTGATCGTTGGGAACCGGAGCTGAAT

GAAGCCATACCAAACGACGAGCGTGACACCACGATGCCTGTAGCAATGGCAACAACGTTG

CGCAAACTATTAACTGGCGAACTACTTACTCTAGCTTCCCGGCAACAATTAATAGACTGG

ATGGAGGCGGATAAAGTTGCAGGACCACTTCTGCGCTCGGCCCTTCCGGCTGGCTGGTTT

ATTGCTGATAAATCTGGAGCCGGTGAGCGTGGGTCTCGCGGTATCATTGCAGCACTGGGG

CCAGATGGTAAGCCCTCCCGTATCGTAGTTATCTACACGACGGGGAGTCAGGCAACTATG

GATGAACGAAATAGACAGATCGCTGAGATAGGTGCCTCACTGATTAAGCATTGGTAACTG

TCAGACCAAGTTTACTCATATATACTTTAGATTGATTTAAAACTTCATTTTTAATTTAAA

AGGATCTAGGTGAAGATCCTTTTTGATAATCTCATGACCAAAATCCCTTAACGTGAGTTT

TCGTTCCACTGAGCGTCAGACCCCGTAGAAAAGATCAAAGGATCTTCTTGAGATCCTTTT

TTTCTGCGCGTAATCTGCTGCTTGCAAACAAAAAAACCACCGCTACCAGCGGTGGTTTGT

TTGCCGGATCAAGAGCTACCAACTCTTTTTCCGAAGGTAACTGGCTTCAGCAGAGCGCAG

ATACCAAATACTGTCCTTCTAGTGTAGCCGTAGTTAGGCCACCACTTCAAGAACTCTGTA

GCACCGCCTACATACCTCGCTCTGCTAATCCTGTTACCAGTGGCTGCTGCCAGTGGCGAT
```

-continued

```
AAGTCGTGTCTTACCGGGTTGGACTCAAGACGATAGTTACCGGATAAGGCGCAGCGGTCG
GGCTGAACGGGGGGTTCGTGCACACAGCCCAGCTTGGAGCGAACGACCTACACCGAACTG
AGATACCTACAGCGTGAGCTATGAGAAAGCGCCACGCTTCCCGAAGGGAGAAAGGCGGAC
AGGTATCCGGTAAGCGGCAGGGTCGGAACAGGAGAGCGCACGAGGGAGCTTCCAGGGGGA
AACGCCTGGTATCTTTATAGTCCTGTCGGGTTTCGCCACCTCTGACTTGAGCGTCGATTT
TTGTGATGCTCGTCAGGGGGGCGGAGCCTATGGAAAAACGCCAGCAACGCGGCCTTTTTA
CGGTTCCTGGCCTTTTGCTGGCCTTTTGCTCACATGTTCTTTCCTGCGTTATCCCTGAT
TCTGTGGATAACCGTATTACCGCCTTTGAGTGAGCTGATACCGCTCGCCGCAGCCGAACG
ACCGAGCGCAGCGAGTCAGTGAGCGAGGAAGCGGAAGAGCGCCCAATACGCAAACCGCCT
CTCCCCGCGCGTTGGCCGATTCATTAATGCAGCAGCTGCGCGCTCGCTCGCTCACTGAGG
CCGCCCGGGCAAAGCCCGGGCGTCGGGCGACCTTTGGTCGCCCGGCCTCAGTGAGCGAGC
GAGCGCGCAGAGAGGGAGTGGCCAACTCCATCACTAGGGGTTCCTTGTAGTTAATGATTA
ACCCGCCATGCTACTTATCTACGTAGCCATGCTCTAGGACATTGATTATTGACTAGTGGA
GTTCCGCGTTACATAACTTACGGTAAATGGCCCGCCTGGCTGACCGCCCAACGACCCCCG
CCCATTGACGTCAATAATGACGTATGTTCCCATAGTAACGCCAATAGGGACTTTCCATTG
ACGTCAATGGGTGGAGTATTTACGGTAAACTGCCCACTTGGCAGTACATCAAGTGTATCA
TATGCCAAGTACGCCCCCTATTGACGTCAATGACGGTAAATGGCCCGCCTGGCATTATGC
CCAGTACATGACCTTATGGGACTTTCCTACTTGGCAGTACATCTACGTATTAGTCATCGC
TATTACCATGGTCGAGGTGAGCCCCACGTTCTGCTTCACTCTCCCCATCTCCCCCCCCTC
CCCACCCCCAATTTTGTATTTATTTATTTTTTAATTATTTTGTGCAGCGATGGGGGCGGG
GGGGGGGGGGGCGCGCGCCAGGCGGGGCGGGGGGGGCGAGGGGGGGGCGGGGCGAGGC
GGAGAGGTGCGGCGGCAGCCAATCAGAGCGGCGCGCTCCGAAAGTTTCCTTTTATGGCGA
GGCGGCGGCGGCGGCCCTATAAAAAGCGAAGCGCGCGGCGGGCGGGAGTCGCTGCGC
GCTGCCTTCGCCCCGTGCCCCGCTCCGCCGCCGCCTCGCGCCGCCCGCCCCGGCTCTGAC
TGACCGCGTTACTAAAACAGGTAAGTCCGGCCTCCGCGCCGGGTTTTGGCGCCTCCCGCG
GGCGCCCCCTCCTCACGGCGAGCGCTGCCACGTCAGACGAAGGGCGCAGCGAGCGTCCT
GATCCTTCCGCCCGGACGCTCAGGACAGCGGCCCGCTGCTCATAAGACTCGGCCTTAGAA
CCCCAGTATCAGCAGAAGGACATTTTAGGACGGGACTTGGGTGACTCTAGGGCACTGGTT
TTCTTTCCAGAGAGCGGAACAGGCGAGGAAAAGTAGTCCCTTCTCGGCGATTCTGCGGAG
GGATCTCCGTGGGCGGTGAACGCCGATGATGCCTCTACTAACCATGTTCATGTTTTCTT
TTTTTTTCTACAGGTCCTGGGTGACGAACAGGGTACCGCCACCGCCAGACCCTGCCGTGC
ATTTATTTTGGGGCGGCCTGCTGCCGTTTGGCATGCTGTGCGCGAGCAGCACCACCAAA
TGCACCGTGAGCCATGAAGTGGCGGATTGCAGCCATCTGAAACTGACCCAGGTGCCGGAT
GATCTGCCGACCAACATTACCGTGCTGAACCTGACCCATAACCAGCTGCGCCGCCTGCCG
GCGGCGAACTTTACCCGCTATAGCCAGCTGACCAGCCTGGATGTGGGCTTTAACACCATT
AGCAAACTGGAACCGGAACTGTGCCAGAAACTGCCGATGCTGAAAGTGCTGAACCTGCAG
CATAACGAACTGAGCCAGCTGAGCGATAAAACCTTTGCGTTTTGCACCAACCTGACCGAA
CTGCATCTGATGAGCAACAGCATTCAGAAAATTAAAAACAACCCGTTTGTGAAACAGAAA
AACCTGATTACCCTGGATCTGAGCCATAACGGCCTGAGCAGCACCAAACTGGGCACCCAG
GTGCAGCTGGAAAACCTGCAGGAACTGCTGCTGAGCAACAACAAAATTCAGGCGCTGAAA
AGCGAAGAACTGGATATTTTTGCGAACAGCAGCCTGAAAAAACTGGAACTGAGCAGCAAC
```

-continued

```
CAGATTAAAGAATTTAGCCCGGGCTGCTTTCATGCGATTGGCCGCCTGTTTGGCCTGTTT

CTGAACAACGTGCAGCTGGGCCCGAGCCTGACCGAAAAACTGTGCCTGGAACTGGCGAAC

ACCAGCATTCGCAACCTGAGCCTGAGCAACAGCCAGCTGAGCACCACCAGCAACACCACC

TTTCTGGGCCTGAAATGGACCAACCTGACCATGCTGGATCTGAGCTATAACAACCTGAAC

GTGGTGGGCAACGATAGCTTTGCGTGGCTGCCGCAGCTGGAATATTTTTTTCTGGAATAT

AACAACATTCAGCATCTGTTTAGCCATAGCCTGCATGGCCTGTTTAACGTGCGCTATCTG

AACCTGAAACGCAGCTTTACCAAACAGAGCATTAGCCTGGCGAGCCTGCCGAAAATTGAT

GATTTTAGCTTTCAGTGGCTGAAATGCCTGGAACATCTGAACATGGAAGATAACGATATT

CCGGGCATTAAAAGCAACATGTTTACCGGCCTGATTAACCTGAAATATCTGAGCCTGAGC

AACAGCTTTACCAGCCTGCGCACCCTGACCAACGAAACCTTTGTGAGCCTGGCGCATAGC

CCGCTGCATATTCTGAACCTGACCAAAAACAAAATTAGCAAAATTGAAAGCGATGCGTTT

AGCTGGCTGGGCCATCTGGAAGTGCTGGATCTGGGCCTGAACGAAATTGGCCAGGAACTG

ACCGGCCAGGAATGGCGCGGCCTGGAAAACATTTTTGAAATTTATCTGAGCTATAACAAA

TATCTGCAGCTGACCCGCAACAGCTTTGCGCTGGTGCCGAGCCTGCAGCGCCTGATGCTG

CGCCGCGTGGCGCTGAAAAACGTGGATAGCAGCCCGAGCCCGTTTCAGCCGCTGCGCAAC

CTGACCATTCTGGATCTGAGCAACAACAACATTGCGAACATTAACGATGATATGCTGGAA

GGCCTGGAAAAACTGGAAATTCTGGATCTGCAGCATAACAACCTGGCGCGCCTGTGGAAA

CATGCGAACCCGGGCGGCCCGATTTATTTTCTGAAAGGCCTGAGCCATCTGCATATTCTG

AACCTGGAAAGCAACGGCTTTGATGAAATTCCGGTGGAAGTGTTTAAAGATCTGTTTGAA

CTGAAAATTATTGATCTGGGCCTGAACAACCTGAACACCCTGCCGGCGAGCGTGTTTAAC

AACCAGGTGAGCCTGAAAAGCCTGAACCTGCAGAAAAACCTGATTACCAGCGTGGAAAAA

AAAGTGTTTGGCCCGGCGTTTCGCAACCTGACCGAACTGGATATGCGCTTTAACCCGTTT

GATTGCACCTGCGAAAGCATTGCGTGGTTTGTGAACTGGATTAACGAAACCCATACCAAC

ATTCCGGAACTGAGCAGCCATTATCTGTGCAACACCCCGCCGCATTATCATGGCTTTCCG

GTGCGCCTGTTTGATACCAGCAGCTGCAAAGATAGCGCGCCGTTTGAACTGTTTTTTATG

ATTAACACCAGCATTCTGCTGATTTTTATTTTTATTGTGCTGCTGATTCATTTTGAAGGC

TGGCGCATTAGCTTTTATTGGAACGTGAGCGTGCATCGCGTGCTGGGCTTTAAAGAAATT

GATCGCCAGACCGAACAGTTTGAATATGCGGCGTATATTATTCATGCGTATAAAGATAAA

GATTGGGTGTGGGAACATTTTAGCAGCATGGAAAAAGAAGATCAGAGCCTGAAATTTTGC

CTGGAAGAACGCGATTTTGAAGCGGGCGTGTTTGAACTGGAAGCGATTGTGAACAGCATT

AAACGCAGCCGCAAAATTATTTTTGTGATTACCCATCATCTGCTGAAAGATCCGCTGTGC

AAACGCTTTAAAGTGCATCATGCGGTGCAGCAGGCGATTGAACAGAACCTGGATAGCATT

ATTCTGGTGTTTCTGGAAGAAATTCCGGATTATAAACTGAACCATGCGCTGTGCCTGCGC

CGCGGCATGTTTAAAAGCCATTGCATTCTGAACTGGCCGGTGCAGAAAGAACGCATTGGC

GCGTTTCGCCATAAACTGCAGGTGGCGCTGGGCAGCAAAAACAGCGTGCATGGGCGGATC

AGGCGGATCACCCAAATCTTGTGACAAAACTCACACATGCCCACCGTGCCCAGCACCTGA

ACTCCTGGGGGACCGTCAGTCTTCCTCTTCCCCCCAAAACCCAAGGACACCCTCATGAT

CTCCCGGACCCCTGAGGTCACATGCGTGGTGGTGGACGTGAGCCACGAAGACCCTGAGGT

CAAGTTCAACTGGTACGTGGACGGCGTGGAGGTGCATAATGCCAAGACAAAGCCGCGGGA

GGAGCAGTACAACAGCACGTACCGTGTGGTCAGCGTCCTCACCGTCCTGCACCAGGACTG
```

-continued

GCTGAATGGCAAGGAGTACAAGTGCAAGGTCTCCAACAAAGCCCTCCCAGCCCCCATCGA

GAAAACCATCTCCAAAGCCAAAGGGCAGCCCCGAGAACCACAGGTGTACACCCTGCCCCC

ATCCCGGGAGGAGATGACCAAGAACCAGGTCAGCCTGACCTGCCTGGTCAAAGGCTTCTA

TCCCAGCGACATCGCCGTGGAGTGGGAGAGCAATGGGCAGCCGGAGAACAACTACAAGAC

CACGCCTCCCGTGCTGGACTCCGACGGCTCCTTCTTCCTCTACAGCAAGCTCACCGTGGA

CAAGAGCAGGTGGCAGCAGGGGAACGTCTTCTCATGCTCCGTGATGCATGAGGCTCTGCA

CAACCACTACACGCAGAAGAGCCTCTCCCTGTCTCCGGGTAAATAG 3'

SEQ ID NO: 9 = SEQ ID NO: 1 + SEQ ID NO: 4
5' TTCTAGAATAATCAACCTCTGGATTACAAAATTTGTGAAAGATTGACTGGTATTCTT

AACTATGTTGCTCCTTTTACGCTATGTGGATACGCTGCTTTAATGCCTTTGTATCATGCT

ATTGCTTCCCGTATGGCTTTCATTTTCTCCTCCTTGTATAAATCCTGGTTGCTGTCTCTT

TATGAGGAGTTGTGGCCCGTTGTCAGGCAACGTGGCGTGGTGTGCACTGTGTTTGCTGAC

GCAACCCCCACTGGTTGGGGCATTGCCACCACCTGTCAGCTCCTTTCCGGGACTTTCGCT

TTCCCCCTCCCTATTGCCACGGCGGAACTCATCGCCGCCTGCCTTGCCCGCTGCTGGACA

GGGGCTCGGCTGTTGGGCACTGACAATTCCGTGGTGTTGTCGGGGAAATCATCGTCCTTT

CCTTGGCTGCTCGCCTGTGTTGCCACCTGGATTCTGCGCGGGACGTCCTTCTGCTACGTC

CCTTCGGCCCTCAATCCAGCGGACCTTCCTTCCCGCGGCCTGCTGCCGGCTCTGCGGCCT

CTTCCGCGTCTTCGCCTTCGCCCTCAGACGAGTCGGATCTCCCTTTGGGCCGCCTCCCCG

CCTAAGCTTATCGATACCGTCGAGATCTAACTTGTTTATTGCAGCTTATAATGGTTACAA

ATAAAGCAATAGCATCACAAATTTCACAAATAAAGCATTTTTTTCACTGCATTCTAGTTG

TGGTTTGTCCAAACTCATCAATGTATCTTATCATGTCTGGATCTCGACCTCGACTAGAGC

ATGGCTACGTAGATAAGTAGCATGGCGGGTTAATCATTAACTACAAGGAACCCCTAGTGA

TGGAGTTGGCCACTCCCTCTCTGCGCGCTCGCTCGCTCACTGAGGCCGGGCGACCAAAGG

TCGCCCGACGCCCGGGCTTTGCCCGGGCGGCCTCAGTGAGCGAGCGAGCGCGCCAGCTGG

CGTAATAGCGAAGAGGCCCGCACCGATCGCCCTTCCCAACAGTTGCGCAGCCTGAATGGC

GAATGGAATTCCAGACGATTGAGCGTCAAAATGTAGGTATTTCCATGAGCGTTTTTCCTG

TTGCAATGGCTGGCGGTAATATTGTTCTGGATATTACCAGCAAGGCCGATAGTTTGAGTT

CTTCTACTCAGGCAAGTGATGTTATTACTAATCAAAGAAGTATTGCGACAACGGTTAATT

TGCGTGATGGACAGACTCTTTTACTCGGTGGCCTCACTGATTATAAAAACACTTCTCAGG

ATTCTGGCGTACCGTTCCTGTCTAAAATCCCTTTAATCGGCCTCCTGTTTAGCTCCCGCT

CTGATTCTAACGAGGAAAGCACGTTATACGTGCTCGTCAAAGCAACCATAGTACGCGCCC

TGTAGCGGCGCATTAAGCGCGGCGGGTGTGGTGGTTACGCGCAGCGTGACCGCTACACTT

GCCAGCGCCCTAGCGCCCGCTCCTTTCGCTTTCTTCCCTTCCTTTCTCGCCACGTTCGCC

GGCTTTCCCCGTCAAGCTCTAAATCGGGGGCTCCCTTTAGGGTTCCGATTTAGTGCTTTA

CGGCACCTCGACCCCAAAAAACTTGATTAGGGTGATGGTTCACGTAGTGGGCCATCGCCC

TGATAGACGGTTTTTCGCCCTTTGACGTTGGAGTCCACGTTCTTTAATAGTGGACTCTTG

TTCCAAACTGGAACAACACTCAACCCTATCTCGGTCTATTCTTTTGATTTATAAGGGATT

TTGCCGATTTCGGCCTATTGGTTAAAAAATGAGCTGATTTAACAAAAATTTAACGCGAAT

TTTAACAAAATATTAACGTTTACAATTTAAATATTTGCTTATACAATCTTCCTGTTTTTG

GGGCTTTTCTGATTATCAACCGGGGTACATATGATTGACATGCTAGTTTTACGATTACCG

TTCATCGATTCTCTTGTTTGCTCCAGACTCTCAGGCAATGACCTGATAGCCTTTGTAGAG

-continued
```
ACCTCTCAAAAATAGCTACCCTCTCCGGCATGAATTTATCAGCTAGAACGGTTGAATATC
ATATTGATGGTGATTTGACTGTCTCCGGCCTTTCTCACCCGTTTGAATCTTTACCTACAC
ATTACTCAGGCATTGCATTTAAAATATATGAGGGTTCTAAAAATTTTTATCCTTGCGTTG
AAATAAAGGCTTCTCCCGCAAAAGTATTACAGGGTCATAATGTTTTTGGTACAACCGATT
TAGCTTTATGCTCTGAGGCTTTATTGCTTAATTTTGCTAATTCTTTGCCTTGCCTGTATG
ATTTATTGGATGTTGGAATTCCTGATGCGGTATTTTCTCCTTACGCATCTGTGCGGTATT
TCACACCGCATATGGTGCACTCTCAGTACAATCTGCTCTGATGCCGCATAGTTAAGCCAG
CCCCGACACCCGCCAACACCCGCTGACGCGCCCTGACGGGCTTGTCTGCTCCCGGCATCC
GCTTACAGACAAGCTGTGACCGTCTCCGGGAGCTGCATGTGTCAGAGGTTTTCACCGTCA
TCACCGAAACGCGCGAGACGAAAGGGCCTCGTGATACGCCTATTTTTATAGGTTAATGTC
ATGATAATAATGGTTTCTTAGACGTCAGGTGGCACTTTTCGGGGAAATGTGCGCGGAACC
CCTATTTGTTTATTTTTCTAAATACATTCAAATATGTATCCGCTCATGAGACAATAACCC
TGATAAATGCTTCAATAATATTGAAAAAGGAAGAGTATGAGTATTCAACATTTCCGTGTC
GCCCTTATTCCCTTTTTTGCGGCATTTTGCCTTCCTGTTTTTGCTCACCCAGAAACGCTG
GTGAAAGTAAAAGATGCTGAAGATCAGTTGGGTGCACGAGTGGGTTACATCGAACTGGAT
CTCAACAGCGGTAAGATCCTTGAGAGTTTTCGCCCCGAAGAACGTTTTCCAATGATGAGC
ACTTTTAAAGTTCTGCTATGTGGCGCGGTATTATCCCGTATTGACGCCGGGCAAGAGCAA
CTCGGTCGCCGCATACACTATTCTCAGAATGACTTGGTTGAGTACTCACCAGTCACAGAA
AAGCATCTTACGGATGGCATGACAGTAAGAGAATTATGCAGTGCTGCCATAACCATGAGT
GATAACACTGCGGCCAACTTACTTCTGACAACGATCGGAGGACCGAAGGAGCTAACCGCT
TTTTTGCACAACATGGGGGATCATGTAACTCGCCTTGATCGTTGGGAACCGGAGCTGAAT
GAAGCCATACCAAACGACGAGCGTGACACCACGATGCCTGTAGCAATGGCAACAACGTTG
CGCAAACTATTAACTGGCGAACTACTTACTCTAGCTTCCCGGCAACAATTAATAGACTGG
ATGGAGGCGGATAAAGTTGCAGGACCACTTCTGCGCTCGGCCCTTCCGGCTGGCTGGTTT
ATTGCTGATAAATCTGGAGCCGGTGAGCGTGGGTCTCGCGGTATCATTGCAGCACTGGGG
CCAGATGGTAAGCCCTCCCGTATCGTAGTTATCTACACGACGGGGAGTCAGGCAACTATG
GATGAACGAAATAGACAGATCGCTGAGATAGGTGCCTCACTGATTAAGCATTGGTAACTG
TCAGACCAAGTTTACTCATATATACTTTAGATTGATTTAAAACTTCATTTTTAATTTAAA
AGGATCTAGGTGAAGATCCTTTTTGATAATCTCATGACCAAAATCCCTTAACGTGAGTTT
TCGTTCCACTGAGCGTCAGACCCCGTAGAAAAGATCAAAGGATCTTCTTGAGATCCTTTT
TTTCTGCGCGTAATCTGCTGCTTGCAAACAAAAAAACCACCGCTACCAGCGGTGGTTTGT
TTGCCGGATCAAGAGCTACCAACTCTTTTTCCGAAGGTAACTGGCTTCAGCAGAGCGCAG
ATACCAAATACTGTCCTTCTAGTGTAGCCGTAGTTAGGCCACCACTTCAAGAACTCTGTA
GCACCGCCTACATACCTCGCTCTGCTAATCCTGTTACCAGTGGCTGCTGCCAGTGGCGAT
AAGTCGTGTCTTACCGGGTTGGACTCAAGACGATAGTTACCGGATAAGGCGCAGCGGTCG
GGCTGAACGGGGGGTTCGTGCACACAGCCCAGCTTGGAGCGAACGACCTACACCGAACTG
AGATACCTACAGCGTGAGCTATGAGAAAGCGCCACGCTTCCCGAAGGGAGAAAGGCGGAC
AGGTATCCGGTAAGCGGCAGGGTCGGAACAGGAGAGCGCACGAGGGAGCTTCCAGGGGGA
AACGCCTGGTATCTTTATAGTCCTGTCGGGTTTCGCCACCTCTGACTTGAGCGTCGATTT
TTGTGATGCTCGTCAGGGGGCGGAGCCTATGGAAAAACGCCAGCAACGCGGCCTTTTTA
CGGTTCCTGGCCTTTTGCTGGCCTTTTGCTCACATGTTCTTTCCTGCGTTATCCCCTGAT
```

-continued

```
TCTGTGGATAACCGTATTACCGCCTTTGAGTGAGCTGATACCGCTCGCCGCAGCCGAACG

ACCGAGCGCAGCGAGTCAGTGAGCGAGGAAGCGGAAGAGCGCCCAATACGCAAACCGCCT

CTCCCCGCGCGTTGGCCGATTCATTAATGCAGCAGCTGCGCGCTCGCTCGCTCACTGAGG

CCGCCCGGGCAAAGCCCGGGCGTCGGGCGACCTTTGGTCGCCCGGCCTCAGTGAGCGAGC

GAGCGCGCAGAGAGGGAGTGGCCAACTCCATCACTAGGGGTTCCTTGTAGTTAATGATTA

ACCCGCCATGCTACTTATCTACGTAGCCATGCTCTAGGACATTGATTATTGACTAGTGGA

GTTCCGCGTTACATAACTTACGGTAAATGGCCCGCCTGGCTGACCGCCCAACGACCCCCG

CCCATTGACGTCAATAATGACGTATGTTCCCATAGTAACGCCAATAGGGACTTTCCATTG

ACGTCAATGGGTGGAGTATTTACGGTAAACTGCCCACTTGGCAGTACATCAAGTGTATCA

TATGCCAAGTACGCCCCCTATTGACGTCAATGACGGTAAATGGCCCGCCTGGCATTATGC

CCAGTACATGACCTTATGGGACTTTCCTACTTGGCAGTACATCTACGTATTAGTCATCGC

TATTACCATGGTCGAGGTGAGCCCCACGTTCTGCTTCACTCTCCCCATCTCCCCCCCCTC

CCCACCCCCAATTTTGTATTTATTTATTTTTTAATTATTTTGTGCAGCGATGGGGGCGGG

GGGGGGGGGGGCGCGCGCCAGGCGGGGCGGGGCGGGGCGAGGGGCGGGGCGGGGCGAGG

CGGAGAGGTGCGGCGGCAGCCAATCAGAGCGGCGCGCTCCGAAAGTTTCCTTTTATGGCG

AGGCGGCGGCGGCGGCCCTATAAAAAGCGAAGCGCGCGGCGGGCGGGAGTCGCTGCG

CGCTGCCTTCGCCCCGTGCCCCGCTCCGCCGCCGCCTCGCGCCGCCCGCCCCGGCTCTGA

CTGACCGCGTTACTAAAACAGGTAAGTCCGGCCTCCGCGCCGGGTTTTGGCGCCTCCCGC

GGGCGCCCCCTCCTCACGGCGAGCGCTGCCACGTCAGACGAAGGGCGCAGCGAGCGTCC

TGATCCTTCCGCCCGGACGCTCAGGACAGCGGCCCGCTGCTCATAAGACTCGGCCTTAGA

ACCCCAGTATCAGCAGAAGGACATTTTAGGACGGGACTTGGGTGACTCTAGGGCACTGGT

TTTCTTTCCAGAGAGCGGAACAGGCGAGGAAAAGTAGTCCCTTCTCGGCGATTCTGCGGA

GGGATCTCCGTGGGCGGTGAACGCCGATGATGCCTCTACTAACCATGTTCATGTTTTCT

TTTTTTTTCTACAGGTCCTGGGTGACGAACAGGGTACCGCCACCATGAGGGGCATGAAGC

TGCTGGGGGCGCTGCTGGCACTGGCGGCCCTACTGCAGGGGGCCGTGTCCATGGGCTTTT

GCCGCAGCGCGCTGCATCCGCTGAGCCTGCTGGTGCAGGCGATTATGCTGGCGATGACCC

TGGCGCTGGGCACCCTGCCGGCGTTTCTGCCGTGCGAACTGCAGCCGCATGGCCTGGTGA

ACTGCAACTGGCTGTTTCTGAAAAGCGTGCCGCATTTTAGCATGGCGGCGCCGCGCGGCA

ACGTGACCAGCCTGAGCCTGAGCAGCAACCGCATTCATCATCTGCATGATAGCGATTTTG

CGCATCTGCCGAGCCTGCGCCATCTGAACCTGAAATGGAACTGCCCGCCGGTGGGCCTGA

GCCCGATGCATTTTCCGTGCCATATGACCATTGAACCGAGCACCTTTCTGGCGGTGCCGA

CCCTGGAAGAACTGAACCTGAGCTATAACAACATTATGACCGTGCCGGCGCTGCCGAAAA

GCCTGATTAGCCTGAGCCTGAGCCATACCAACATTCTGATGCTGGATAGCGCGAGCCTGG

CGGGCCTGCATGCGCTGCGCTTTCTGTTTATGGATGGCAACTGCTATTATAAAAACCCGT

GCCGCCAGGCGCTGGAAGTGGCGCCGGGCGCGCTGCTGGGCCTGGGCAACCTGACCCATC

TGAGCCTGAAATATAACAACCTGACCGTGGTGCCGCGCAACCTGCCGAGCAGCCTGGAAT

ATCTGCTGCTGAGCTATAACCGCATTGTGAAACTGGCGCCGGAAGATCTGGCGAACCTGA

CCGCGCTGCGCGTGCTGGATGTGGGCGGCAACTGCCGCCGCTGCGATCATGCGCCGAACC

CGTGCATGGAATGCCCGCGCCATTTTCCGCAGCTGCATCCGGATACCTTTAGCCATCTGA

GCCGCCTGGAAGGCCTGGTGCTGAAAGATAGCAGCCTGAGCTGGCTGAACGCGAGCTGGT
```

-continued

```
TTCGCGGCCTGGGCAACCTGCGCGTGCTGGATCTGAGCGAAAACTTTCTGTATAAATGCA

TTACCAAAACCAAAGCGTTTCAGGGCCTGACCCAGCTGCGCAAACTGAACCTGAGCTTTA

ACTATCAGAAACGCGTGAGCTTTGCGCATCTGAGCCTGGCGCCGAGCTTTGGCAGCCTGG

TGGCGCTGAAAGAACTGGATATGCATGGCATTTTTTTTCGCAGCCTGGATGAAACCACCC

TGCGCCCGCTGGCGCGCCTGCCGATGCTGCAGACCCTGCGCCTGCAGATGAACTTTATTA

ACCAGGCGCAGCTGGGCATTTTTCGCGCGTTTCCGGGCCTGCGCTATGTGGATCTGAGCG

ATAACCGCATTAGCGGCGCGAGCGAACTGACCGCGACCATGGGCGAAGCGGATGGCGGCG

AAAAAGTGTGGCTGCAGCCGGGCGATCTGGCGCCGGCGCCGGTGGATACCCCGAGCAGCG

AAGATTTTCGCCCGAACTGCAGCACCCTGAACTTTACCCTGGATCTGAGCCGCAACAACC

TGGTGACCGTGCAGCCGGAAATGTTTGCGCAGCTGAGCCATCTGCAGTGCCTGCGCCTGA

GCCATAACTGCATTAGCCAGGCGGTGAACGGCAGCCAGTTTCTGCCGCTGACCGGCCTGC

AGGTGCTGGATCTGAGCCATAACAAACTGGATCTGTATCATGAACATAGCTTTACCGAAC

TGCCGCGCCTGGAAGCGCTGGATCTGAGCTATAACAGCCAGCCGTTTGGCATGCAGGGCG

TGGGCCATAACTTTAGCTTTGTGGCGCATCTGCGCACCCTGCGCCATCTGAGCCTGGCGC

ATAACAACATTCATAGCCAGGTGAGCCAGCAGCTGTGCAGCACCAGCCTGCGCGCGCTGG

ATTTTAGCGGCAACGCGCTGGGCCATATGTGGGCGGAAGGCGATCTGTATCTGCATTTTT

TTCAGGGCCTGAGCGGCCTGATTTGGCTGGATCTGAGCCAGAACCGCCTGCATACCCTGC

TGCCGCAGACCCTGCGCAACCTGCCGAAAAGCCTGCAGGTGCTGCGCCTGCGCGATAACT

ATCTGGCGTTTTTTAAATGGTGGAGCCTGCATTTTCTGCCGAAACTGGAAGTGCTGGATC

TGGCGGGCAACCAGCTGAAAGCGCTGACCAACGGCAGCCTGCCGGCGGGCACCCGCCTGC

GCCGCCTGGATGTGAGCTGCAACAGCATTAGCTTTGTGGCGCCGGGCTTTTTTAGCAAAG

CGAAAGAACTGCGCGAACTGAACCTGAGCGCGAACGCGCTGAAAACCGTGGATCATAGCT

GGTTTGGCCCGCTGGCGAGCGCGCTGCAGATTCTGGATGTGAGCGCGAACCCGCTGCATT

GCGCGTGCGGCGCGGCGTTTATGGATTTTCTGCTGGAAGTGCAGGCGGCGGTGCCGGGCC

TGCCGAGCCGCGTGAAATGCGGCAGCCCGGGCCAGCTGCAGGGCCTGAGCATTTTTGCGC

AGGATCTGCGCCTGTGCCTGGATGAAGCGCTGAGCTGGGATTGCTTTGCGCTGAGCCTGC

TGGCGGTGGCGCTGGGCCTGGGCGTGCCGATGCTGCATCATCTGTGCGGCTGGGATCTGT

GGTATTGCTTTCATCTGTGCCTGGCGTGGCTGCCGTGGCGCGGCCGCCAGAGCGGCCGCG

ATGAAGATGCGCTGCCGTATGATGCGTTTGTGGTGTTTGATAAAACCCAGAGCGCGGTGG

CGGATTGGGTGTATAACGAACTGCGCGGCCAGCTGGAAGAATGCCGCGGCCGCTGGGCGC

TGCGCCTGTGCCTGGAAGAACGCGATTGGCTGCCGGGCAAAACCCTGTTTGAAAACCTGT

GGGCGAGCGTGTATGGCAGCCGCAAAACCCTGTTTGTGCTGGCGCATACCGATCGCGTGA

GCGGCCTGCTGCGCGCGAGCTTTCTGCTGGCGCAGCAGCGCCTGCTGGAAGATCGCAAAG

ATGTGGTGGTGCTGGTGATTCTGAGCCCGGATGGCCGCCGCAGCCGCTATGTGCGCCTGC

GCCAGCGCCTGTGCCGCCAGAGCGTGCTGCTGTGGCCGCATCAGCCGAGCGGCCAGCGCA

GCTTTTGGGCGCAGCTGGGCATGGCGCTGACCCGCGATAACCATCATTTTTATAACCGCA

ACTTTTGCCAGGGCCCGACCGCGGAAGGGCGGATCAGGCGGATCACCCAAATCTTGTGAC

AAAACTCACACATGCCCACCGTGCCCAGCACCTGAACTCCTGGGGGGACCGTCAGTCTTC

CTCTTCCCCCCAAAACCCAAGGACACCCTCATGATCTCCCGGACCCCTGAGGTCACATGC

GTGGTGGTGGACGTGAGCCACGAAGACCCTGAGGTCAAGTTCAACTGGTACGTGGACGGC

GTGGAGGTGCATAATGCCAAGACAAAGCCGCGGGAGGAGCAGTACAACAGCACGTACCGT
```

-continued

GTGGTCAGCGTCCTCACCGTCCTGCACCAGGACTGGCTGAATGGCAAGGAGTACAAGTGC

AAGGTCTCCAACAAAGCCCTCCCAGCCCCCATCGAGAAAACCATCTCCAAAGCCAAAGGG

CAGCCCCGAGAACCACAGGTGTACACCCTGCCCCCATCCCGGGAGGAGATGACCAAGAAC

CAGGTCAGCCTGACCTGCCTGGTCAAAGGCTTCTATCCCAGCGACATCGCCGTGGAGTGG

GAGAGCAATGGGCAGCCGGAGAACAACTACAAGACCACGCCTCCCGTGCTGGACTCCGAC

GGCTCCTTCTTCCTCTACAGCAAGCTCACCGTGGACAAGAGCAGGTGGCAGCAGGGGAAC

GTCTTCTCATGCTCCGTGATGCATGAGGCTCTGCACAACCACTACACGCAGAAGAGCCTC

TCCCTGTCTCCGGGTAAATAG 3'

SEQ ID NO: 10 = SEQ ID NO: 1 + SEQ ID NO: 5
5' TTCTAGAATAATCAACCTCTGGATTACAAAATTTGTGAAAGATTGACTGGTATTCTT

AACTATGTTGCTCCTTTTACGCTATGTGGATACGCTGCTTTAATGCCTTTGTATCATGCT

ATTGCTTCCCGTATGGCTTTCATTTTCTCCTCCTTGTATAAATCCTGGTTGCTGTCTCTT

TATGAGGAGTTGTGGCCCGTTGTCAGGCAACGTGGCGTGGTGTGCACTGTGTTTGCTGAC

GCAACCCCCACTGGTTGGGGCATTGCCACCACCTGTCAGCTCCTTTCCGGGACTTTCGCT

TTCCCCCTCCCTATTGCCACGGCGGAACTCATCGCCGCCTGCCTTGCCCGCTGCTGGACA

GGGGCTCGGCTGTTGGGCACTGACAATTCCGTGGTGTTGTCGGGGAAATCATCGTCCTTT

CCTTGGCTGCTCGCCTGTGTTGCCACCTGGATTCTGCGCGGGACGTCCTTCTGCTACGTC

CCTTCGGCCCTCAATCCAGCGGACCTTCCTTCCCGCGGCCTGCTGCCGGCTCTGCGGCCT

CTTCCGCGTCTTCGCCTTCGCCCTCAGACGAGTCGGATCTCCCTTTGGGCCGCCTCCCCG

CCTAAGCTTATCGATACCGTCGAGATCTAACTTGTTTATTGCAGCTTATAATGGTTACAA

ATAAAGCAATAGCATCACAAATTTCACAAATAAAGCATTTTTTTCACTGCATTCTAGTTG

TGGTTTGTCCAAACTCATCAATGTATCTTATCATGTCTGGATCTCGACCTCGACTAGAGC

ATGGCTACGTAGATAAGTAGCATGGCGGGTTAATCATTAACTACAAGGAACCCCTAGTGA

TGGAGTTGGCCACTCCCTCTCTGCGCGCTCGCTCGCTCACTGAGGCCGGGCGACCAAAGG

TCGCCCGACGCCCGGGCTTTGCCCGGGCGGCCTCAGTGAGCGAGCGAGCGCGCCAGCTGG

CGTAATAGCGAAGAGGCCCGCACCGATCGCCCTTCCCAACAGTTGCGCAGCCTGAATGGC

GAATGGAATTCCAGACGATTGAGCGTCAAAATGTAGGTATTTCCATGAGCGTTTTTCCTG

TTGCAATGGCTGGCGGTAATATTGTTCTGGATATTACCAGCAAGGCCGATAGTTTGAGTT

CTTCTACTCAGGCAAGTGATGTTATTACTAATCAAAGAAGTATTGCGACAACGGTTAATT

TGCGTGATGGACAGACTCTTTTACTCGGTGGCCTCACTGATTATAAAAACACTTCTCAGG

ATTGGCGTACCGTTCCTGTCTAAAATCCCTTTAATCGGCCTCCTGTTTAGCTCCCGCT

CTGATTCTAACGAGGAAAGCACGTTATACGTGCTCGTCAAAGCAACCATAGTACGCGCCC

TGTAGCGGCGCATTAAGCGCGGCGGGTGTGGTGGTTACGCGCAGCGTGACCGCTACACTT

GCCAGCGCCCTAGCGCCCGCTCCTTTCGCTTTCTTCCCTTCCTTTCTCGCCACGTTCGCC

GGCTTTCCCCGTCAAGCTCTAAATCGGGGGCTCCCTTTAGGGTTCCGATTTAGTGCTTTA

CGGCACCTCGACCCCAAAAAACTTGATTAGGGTGATGGTTCACGTAGTGGGCCATCGCCC

TGATAGACGGTTTTTCGCCCTTTGACGTTGGAGTCCACGTTCTTTAATAGTGGACTCTTG

TTCCAAACTGGAACAACACTCAACCCTATCTCGGTCTATTCTTTTGATTTATAAGGGATT

TTGCCGATTTCGGCCTATTGGTTAAAAAATGAGCTGATTTAACAAAAATTTAACGCGAAT

TTTAACAAAATATTAACGTTTACAATTTAAATATTTGCTTATACAATCTTCCTGTTTTTG

GGGCTTTTCTGATTATCAACCGGGGTACATATGATTGACATGCTAGTTTTACGATTACCG

-continued

```
TTCATCGATTCTCTTGTTTGCTCCAGACTCTCAGGCAATGACCTGATAGCCTTTGTAGAG
ACCTCTCAAAAATAGCTACCCTCTCCGGCATGAATTTATCAGCTAGAACGGTTGAATATC
ATATTGATGGTGATTTGACTGTCTCCGGCCTTTCTCACCCGTTTGAATCTTTACCTACAC
ATTACTCAGGCATTGCATTTAAAATATATGAGGGTTCTAAAAATTTTTATCCTTGCGTTG
AAATAAAGGCTTCTCCCGCAAAAGTATTACAGGGTCATAATGTTTTTGGTACAACCGATT
TAGCTTTATGCTCTGAGGCTTTATTGCTTAATTTTGCTAATTCTTTGCCTTGCCTGTATG
ATTTATTGGATGTTGGAATTCCTGATGCGGTATTTTCTCCTTACGCATCTGTGCGGTATT
TCACACCGCATATGGTGCACTCTCAGTACAATCTGCTCTGATGCCGCATAGTTAAGCCAG
CCCCGACACCCGCCAACACCCGCTGACGCGCCCTGACGGGCTTGTCTGCTCCCGGCATCC
GCTTACAGACAAGCTGTGACCGTCTCCGGGAGCTGCATGTGTCAGAGGTTTTCACCGTCA
TCACCGAAACGCGCGAGACGAAAGGGCCTCGTGATACGCCTATTTTTATAGGTTAATGTC
ATGATAATAATGGTTTCTTAGACGTCAGGTGGCACTTTTCGGGGAAATGTGCGCGGAACC
CCTATTTGTTTATTTTTCTAAATACATTCAAATATGTATCCGCTCATGAGACAATAACCC
TGATAAATGCTTCAATAATATTGAAAAAGGAAGAGTATGAGTATTCAACATTTCCGTGTC
GCCCTTATTCCCTTTTTTGCGGCATTTTGCCTTCCTGTTTTTGCTCACCCAGAAACGCTG
GTGAAAGTAAAAGATGCTGAAGATCAGTTGGGTGCACGAGTGGGTTACATCGAACTGGAT
CTCAACAGCGGTAAGATCCTTGAGAGTTTTCGCCCCGAAGAACGTTTTCCAATGATGAGC
ACTTTTAAAGTTCTGCTATGTGGCGCGGTATTATCCCGTATTGACGCCGGGCAAGAGCAA
CTCGGTCGCCGCATACACTATTCTCAGAATGACTTGGTTGAGTACTCACCAGTCACAGAA
AAGCATCTTACGGATGGCATGACAGTAAGAGAATTATGCAGTGCTGCCATAACCATGAGT
GATAACACTGCGGCCAACTTACTTCTGACAACGATCGGAGGACCGAAGGAGCTAACCGCT
TTTTTGCACAACATGGGGGATCATGTAACTCGCCTTGATCGTTGGGAACCGGAGCTGAAT
GAAGCCATACCAAACGACGAGCGTGACACCACGATGCCTGTAGCAATGGCAACAACGTTG
CGCAAACTATTAACTGGCGAACTACTTACTCTAGCTTCCCGGCAACAATTAATAGACTGG
ATGGAGGCGGATAAAGTTGCAGGACCACTTCTGCGCTCGGCCCTTCCGGCTGGCTGGTTT
ATTGCTGATAAATCTGGAGCCGGTGAGCGTGGGTCTCGCGGTATCATTGCAGCACTGGGG
CCAGATGGTAAGCCCTCCCGTATCGTAGTTATCTACACGACGGGGAGTCAGGCAACTATG
GATGAACGAAATAGACAGATCGCTGAGATAGGTGCCTCACTGATTAAGCATTGGTAACTG
TCAGACCAAGTTTACTCATATATACTTTAGATTGATTTAAAACTTCATTTTTAATTTAAA
AGGATCTAGGTGAAGATCCTTTTTGATAATCTCATGACCAAAATCCCTTAACGTGAGTTT
TCGTTCCACTGAGCGTCAGACCCCGTAGAAAAGATCAAAGGATCTTCTTGAGATCCTTTT
TTTCTGCGCGTAATCTGCTGCTTGCAAACAAAAAAACCACCGCTACCAGCGGTGGTTTGT
TTGCCGGATCAAGAGCTACCAACTCTTTTTCCGAAGGTAACTGGCTTCAGCAGAGCGCAG
ATACCAAATACTGTCCTTCTAGTGTAGCCGTAGTTAGGCCACCACTTCAAGAACTCTGTA
GCACCGCCTACATACCTCGCTCTGCTAATCCTGTTACCAGTGGCTGCTGCCAGTGGCGAT
AAGTCGTGTCTTACCGGGTTGGACTCAAGACGATAGTTACCGGATAAGGCGCAGCGGTCG
GGCTGAACGGGGGGTTCGTGCACACAGCCCAGCTTGGAGCGAACGACCTACACCGAACTG
AGATACCTACAGCGTGAGCTATGAGAAAGCGCCACGCTTCCCGAAGGGAGAAAGGCGGAC
AGGTATCCGGTAAGCGGCAGGGTCGGAACAGGAGAGCGCACGAGGGAGCTTCCAGGGGGA
AACGCCTGGTATCTTTATAGTCCTGTCGGGTTTCGCCACCTCTGACTTGAGCGTCGATTT
```

-continued

```
TTGTGATGCTCGTCAGGGGGGGAGCCTATGGAAAAACGCCAGCAACGCGGCCTTTTTAC
GGTTCCTGGCCTTTTGCTGGCCTTTTGCTCACATGTTCTTTCCTGCGTTATCCCCTGATT
CTGTGGATAACCGTATTACCGCCTTTGAGTGAGCTGATACCGCTCGCCGCAGCCGAACGA
CCGAGCGCAGCGAGTCAGTGAGCGAGGAAGCGGAAGAGCGCCCAATACGCAAACCGCCTC
TCCCCGCGCGTTGGCCGATTCATTAATGCAGCAGCTGCGCGCTCGCTCGCTCACTGAGGC
CGCCCGGGCAAAGCCCGGGCGTCGGGCGACCTTTGGTCGCCCGGCCTCAGTGAGCGAGCG
AGCGCGCAGAGAGGGAGTGGCCAACTCCATCACTAGGGGTTCCTTGTAGTTAATGATTAA
CCCGCCATGCTACTTATCTACGTAGCCATGCTCTAGGACATTGATTATTGACTAGTGGAG
TTCCGCGTTACATAACTTACGGTAAATGGCCCGCCTGGCTGACCGCCCAACGACCCCCGC
CCATTGACGTCAATAATGACGTATGTTCCCATAGTAACGCCAATAGGGACTTTCCATTGA
CGTCAATGGGTGGAGTATTTACGGTAAACTGCCCACTTGGCAGTACATCAAGTGTATCAT
ATGCCAAGTACGCCCCCTATTGACGTCAATGACGGTAAATGGCCCGCCTGGCATTATGCC
CAGTACATGACCTTATGGGACTTTCCTACTTGGCAGTACATCTACGTATTAGTCATCGCT
ATTACCATGGTCGAGGTGAGCCCCACGTTCTGCTTCACTCTCCCCATCTCCCCCCCCTCC
CCACCCCCAATTTTGTATTTATTTATTTTTTAATTATTTTGTGCAGCGATGGGGGCGGGG
GGGGGGGGGGCGCGCGCCAGGCGGGCGGGGGGGGCGAGGGGGGGCGGGGCGAGGCG
GAGAGGTGCGGCGGCAGCCAATCAGAGCGGCGCGCTCCGAAAGTTTCCTTTTATGGCGAG
GCGGCGGCGGCGGCCCTATAAAAAGCGAAGCGCGCGGCGGGCGGGAGTCGCTGCGCG
CTGCCTTCGCCCCGTGCCCCGCTCCGCCGCCGCCTCGCGCCGCCCGCCCCGGCTCTGACT
GACCGCGTTACTAAAACAGGTAAGTCCGGCCTCCGCGCCGGGTTTTGGCGCCTCCCGCGG
GCGCCCCCTCCTCACGGCGAGCGCTGCCACGTCAGACGAAGGGCGCAGCGAGCGTCCTG
ATCCTTCCGCCCGGACGCTCAGGACAGCGGCCCGCTGCTCATAAGACTCGGCCTTAGAAC
CCCAGTATCAGCAGAAGGACATTTTAGGACGGGACTTGGGTGACTCTAGGGCACTGGTTT
TCTTTCCAGAGAGCGGAACAGGCGAGGAAAAGTAGTCCCTTCTCGGCGATTCTGCGGAGG
GATCTCCGTGGGGCGGTGAACGCCGATGATGCCTCTACTAACCATGTTCATGTTTTCTTT
TTTTTTCTACAGGTCCTGGGTGACGAACAGGGTACCGCCACCATGAGGGGCATGAAGCTG
CTGGGGCGCTGCTGGCACTGGCGGCCCTACTGCAGGGGCCGTGTCCATGAGCATGCTG
TTTTATACCCTGATTACCGCGTTTCTGATTGGCATTCAGGCGGAACCGCATAGCGAAAGC
AACGTGCCGGCGGGCCATACCATTCCGCAGGCGCATTGGACCAAACTGCAGCATAGCCTG
GATACCGCGCTGCGCCGCGCGCAGCGCGCCGGCGGCGGCGATTGCGGCGCGCGTGGCG
GGCCAGACCCGCAACATTACCGTGGATCCGCGCCTGTTTAAAAAACGCCGCCTGCGCAGC
CCGCGCGTGCTGTTTAGCACCCAGCCGCCGCGCGAAGCGGCGGATACCCAGGATCTGGAT
TTTGAAGTGGGCGGCGCGGCGCCGTTTAACCGCACCCATCGCAGCAAACGCAGCAGCAGC
CATCCGATTTTTCATCGCGGCGAATTTAGCGTGTGCGATAGCGTGAGCGTGTGGGTGGGC
GATAAAACCACCGCGACCGATATTAAAGGCAAAGAAGTGATGGTGCTGGGCGAAGTGAAC
ATTAACAACAGCGTGTTTAAACAGTATTTTTTTGAAACCAAATGCCGCGATCCGAACCCG
GTGGATAGCGGCTGCCGCGGCATTGATAGCAAACATTGGAACAGCTATTGCACCACCACC
CATACCTTTGTGAAAGCGCTGACCATGGATGGCAAACAGGCGGCGTGGCGCTTTATTCGC
ATTGATACCGCGTGCGTGTGCGTGCTGAGCCGCAAAGCGGTGCGCCGCGCGGGCGGATCA
GGCGGATCACCCAAATCTTGTGACAAAACTCACACATGCCCACCGTGCCCAGCACCTGAA
CTCCTGGGGGGACCGTCAGTCTTCCTCTTCCCCCCAAAACCCAAGGACACCCTCATGATC
```

-continued

TCCCGGACCCCTGAGGTCACATGCGTGGTGGTGGACGTGAGCCACGAAGACCCTGAGGTC

AAGTTCAACTGGTACGTGGACGGCGTGGAGGTGCATAATGCCAAGACAAAGCCGCGGGAG

GAGCAGTACAACAGCACGTACCGTGTGGTCAGCGTCCTCACCGTCCTGCACCAGGACTGG

CTGAATGGCAAGGAGTACAAGTGCAAGGTCTCCAACAAAGCCCTCCCAGCCCCCATCGAG

AAAACCATCTCCAAAGCCAAAGGGCAGCCCCGAGAACCACAGGTGTACACCCTGCCCCCA

TCCCGGGAGGAGATGACCAAGAACCAGGTCAGCCTGACCTGCCTGGTCAAAGGCTTCTAT

CCCAGCGACATCGCCGTGGAGTGGGAGAGCAATGGGCAGCCGGAGAACAACTACAAGACC

ACGCCTCCCGTGCTGGACTCCGACGGCTCCTTCTTCCTCTACAGCAAGCTCACCGTGGAC

AAGAGCAGGTGGCAGCAGGGGAACGTCTTCTCATGCTCCGTGATGCATGAGGCTCTGCAC

AACCACTACACGCAGAAGAGCCTCTCCCTGTCTCCGGGTAAATAG 3'

SEQ ID NO: 11 = SEQ ID NO: 1 + SEQ ID NO: 6
5' TTCTAGAATAATCAACCTCTGGATTACAAAATTTGTGAAAGATTGACTGGTATTCTT

AACTATGTTGCTCCTTTTACGCTATGTGGATACGCTGCTTTAATGCCTTTGTATCATGCT

ATTGCTTCCCGTATGGCTTTCATTTTCTCCTCCTTGTATAAATCCTGGTTGCTGTCTCTT

TATGAGGAGTTGTGGCCCGTTGTCAGGCAACGTGGCGTGGTGTGCACTGTGTTTGCTGAC

GCAACCCCCACTGGTTGGGGCATTGCCACCACCTGTCAGCTCCTTTCCGGGACTTTCGCT

TTCCCCCTCCCTATTGCCACGGCGGAACTCATCGCCGCCTGCCTTGCCCGCTGCTGGACA

GGGGCTCGGCTGTTGGGCACTGACAATTCCGTGGTGTTGTCGGGGAAATCATCGTCCTTT

CCTTGGCTGCTCGCCTGTGTTGCCACCTGGATTCTGCGCGGGACGTCCTTCTGCTACGTC

CCTTCGGCCCTCAATCCAGCGGACCTTCCTTCCCGCGGCCTGCTGCCGGCTCTGCGGCCT

CTTCCGCGTCTTCGCCTTCGCCCTCAGACGAGTCGGATCTCCCTTTGGGCCGCCTCCCCG

CCTAAGCTTATCGATACCGTCGAGATCTAACTTGTTTATTGCAGCTTATAATGGTTACAA

ATAAAGCAATAGCATCACAAATTTCACAAATAAAGCATTTTTTTCACTGCATTCTAGTTG

TGGTTTGTCCAAACTCATCAATGTATCTTATCATGTCTGGATCTCGACCTCGACTAGAGC

ATGGCTACGTAGATAAGTAGCATGGCGGGTTAATCATTAACTACAAGGAACCCCTAGTGA

TGGAGTTGGCCACTCCCTCTCTGCGCGCTCGCTCGCTCACTGAGGCCGGGCGACCAAAGG

TCGCCCGACGCCCGGGCTTTGCCCGGGCGGCCTCAGTGAGCGAGCGAGCGCGCCAGCTGG

CGTAATAGCGAAGAGGCCCGCACCGATCGCCCTTCCCAACAGTTGCGCAGCCTGAATGGC

GAATGGAATTCCAGACGATTGAGCGTCAAAATGTAGGTATTTCCATGAGCGTTTTTCCTG

TTGCAATGGCTGGCGGTAATATTGTTCTGGATATTACCAGCAAGGCCGATAGTTTGAGTT

CTTCTACTCAGGCAAGTGATGTTATTACTAATCAAAGAAGTATTGCGACAACGGTTAATT

TGCGTGATGGACAGACTCTTTTACTCGGTGGCCTCACTGATTATAAAAACACTTCTCAGG

ATTCTGGCGTACCGTTCCTGTCTAAAATCCCTTTAATCGGCCTCCTGTTTAGCTCCCGCT

CTGATTCTAACGAGGAAAGCACGTTATACGTGCTCGTCAAAGCAACCATAGTACGCGCCC

TGTAGCGGCGCATTAAGCGCGGCGGGTGTGGTGGTTACGCGCAGCGTGACCGCTACACTT

GCCAGCGCCCTAGCGCCCGCTCCTTTCGCTTTCTTCCCTTCCTTTCTCGCCACGTTCGCC

GGCTTTCCCCGTCAAGCTCTAAATCGGGGGCTCCCTTTAGGGTTCCGATTTAGTGCTTTA

CGGCACCTCGACCCCAAAAAACTTGATTAGGGTGATGGTTCACGTAGTGGGCCATCGCCC

TGATAGACGGTTTTTCGCCCTTTGACGTTGGAGTCCACGTTCTTTAATAGTGGACTCTTG

TTCCAAACTGGAACAACACTCAACCCTATCTCGGTCTATTCTTTTGATTTATAAGGGATT

TTGCCGATTTCGGCCTATTGGTTAAAAAATGAGCTGATTTAACAAAAATTTAACGCGAAT

-continued

```
TTTAACAAAATATTAACGTTTACAATTTAAATATTTGCTTATACAATCTTCCTGTTTTTG

GGGCTTTTCTGATTATCAACCGGGGTACATATGATTGACATGCTAGTTTTACGATTACCG

TTCATCGATTCTCTTGTTTGCTCCAGACTCTCAGGCAATGACCTGATAGCCTTTGTAGAG

ACCTCTCAAAAATAGCTACCCTCTCCGGCATGAATTTATCAGCTAGAACGGTTGAATATC

ATATTGATGGTGATTTGACTGTCTCCGGCCTTTCTCACCCGTTTGAATCTTTACCTACAC

ATTACTCAGGCATTGCATTTAAAATATATGAGGGTTCTAAAAATTTTTATCCTTGCGTTG

AAATAAAGGCTTCTCCCGCAAAAGTATTACAGGGTCATAATGTTTTTGGTACAACCGATT

TAGCTTTATGCTCTGAGGCTTTATTGCTTAATTTTGCTAATTCTTTGCCTTGCCTGTATG

ATTTATTGGATGTTGGAATTCCTGATGCGGTATTTTCTCCTTACGCATCTGTGCGGTATT

TCACACCGCATATGGTGCACTCTCAGTACAATCTGCTCTGATGCCGCATAGTTAAGCCAG

CCCCGACACCCGCCAACACCCGCTGACGCGCCCTGACGGGCTTGTCTGCTCCCGGCATCC

GCTTACAGACAAGCTGTGACCGTCTCCGGGAGCTGCATGTGTCAGAGGTTTTCACCGTCA

TCACCGAAACGCGCGAGACGAAAGGGCCTCGTGATACGCCTATTTTTATAGGTTAATGTC

ATGATAATAATGGTTTCTTAGACGTCAGGTGGCACTTTTCGGGGAAATGTGCGCGGAACC

CCTATTTGTTTATTTTTCTAAATACATTCAAATATGTATCCGCTCATGAGACAATAACCC

TGATAAATGCTTCAATAATATTGAAAAAGGAAGAGTATGAGTATTCAACATTTCCGTGTC

GCCCTTATTCCCTTTTTTGCGGCATTTTGCCTTCCTGTTTTTGCTCACCCAGAAACGCTG

GTGAAAGTAAAAGATGCTGAAGATCAGTTGGGTGCACGAGTGGGTTACATCGAACTGGAT

CTCAACAGCGGTAAGATCCTTGAGAGTTTTCGCCCCGAAGAACGTTTTCCAATGATGAGC

ACTTTTAAAGTTCTGCTATGTGGCGCGGTATTATCCCGTATTGACGCCGGGCAAGAGCAA

CTCGGTCGCCGCATACACTATTCTCAGAATGACTTGGTTGAGTACTCACCAGTCACAGAA

AAGCATCTTACGGATGGCATGACAGTAAGAGAATTATGCAGTGCTGCCATAACCATGAGT

GATAACACTGCGGCCAACTTACTTCTGACAACGATCGGAGGACCGAAGGAGCTAACCGCT

TTTTTGCACAACATGGGGGATCATGTAACTCGCCTTGATCGTTGGGAACCGGAGCTGAAT

GAAGCCATACCAAACGACGAGCGTGACACCACGATGCCTGTAGCAATGGCAACAACGTTG

CGCAAACTATTAACTGGCGAACTACTTACTCTAGCTTCCCGGCAACAATTAATAGACTGG

ATGGAGGCGGATAAAGTTGCAGGACCACTTCTGCGCTCGGCCCTTCCGGCTGGCTGGTTT

ATTGCTGATAAATCTGGAGCCGGTGAGCGTGGGTCTCGCGGTATCATTGCAGCACTGGGG

CCAGATGGTAAGCCCTCCCGTATCGTAGTTATCTACACGACGGGGAGTCAGGCAACTATG

GATGAACGAAATAGACAGATCGCTGAGATAGGTGCCTCACTGATTAAGCATTGGTAACTG

TCAGACCAAGTTTACTCATATATACTTTAGATTGATTTAAAACTTCATTTTTAATTTAAA

AGGATCTAGGTGAAGATCCTTTTTGATAATCTCATGACCAAAATCCCTTAACGTGAGTTT

TCGTTCCACTGAGCGTCAGACCCCGTAGAAAAGATCAAAGGATCTTCTTGAGATCCTTT

TTTCTGCGCGTAATCTGCTGCTTGCAAACAAAAAAACCACCGCTACCAGCGGTGGTTTGT

TTGCCGGATCAAGAGCTACCAACTCTTTTTCCGAAGGTAACTGGCTTCAGCAGAGCGCAG

ATACCAAATACTGTCCTTCTAGTGTAGCCGTAGTTAGGCCACCACTTCAAGAACTCTGTA

GCACCGCCTACATACCTCGCTCTGCTAATCCTGTTACCAGTGGCTGCTGCCAGTGGCGAT

AAGTCGTGTCTTACCGGGTTGGACTCAAGACGATAGTTACCGGATAAGGCGCAGCGGTCG

GGCTGAACGGGGGGTTCGTGCACACAGCCCAGCTTGGAGCGAACGACCTACACCGAACTG

AGATACCTACAGCGTGAGCTATGAGAAAGCGCCACGCTTCCCGAAGGGAGAAAGGCGGAC
```

-continued
```
AGGTATCCGGTAAGCGGCAGGGTCGGAACAGGAGAGCGCACGAGGGAGCTTCCAGGGGGA
AACGCCTGGTATCTTTATAGTCCTGTCGGGTTTCGCCACCTCTGACTTGAGCGTCGATTT
TTGTGATGCTCGTCAGGGGGCGGAGCCTATGGAAAAACGCCAGCAACGCGGCCTTTTTA
CGGTTCCTGGCCTTTTGCTGGCCTTTTGCTCACATGTTCTTTCCTGCGTTATCCCCTGAT
TCTGTGGATAACCGTATTACCGCCTTTGAGTGAGCTGATACCGCTCGCCGCAGCCGAACG
ACCGAGCGCAGCGAGTCAGTGAGCGAGGAAGCGGAAGAGCGCCCAATACGCAAACCGCCT
CTCCCCGCGCGTTGGCCGATTCATTAATGCAGCAGCTGCGCGCTCGCTCGCTCACTGAGG
CCGCCCGGGCAAAGCCCGGGCGTCGGGCGACCTTTGGTCGCCCGGCCTCAGTGAGCGAGC
GAGCGCGCAGAGAGGGAGTGGCCAACTCCATCACTAGGGGTTCCTTGTAGTTAATGATTA
ACCCGCCATGCTACTTATCTACGTAGCCATGCTCTAGGACATTGATTATTGACTAGTGGA
GTTCCGCGTTACATAACTTACGGTAAATGGCCCGCCTGGCTGACCGCCCAACGACCCCCG
CCCATTGACGTCAATAATGACGTATGTTCCCATAGTAACGCCAATAGGGACTTTCCATTG
ACGTCAATGGGTGGAGTATTTACGGTAAACTGCCCACTTGGCAGTACATCAAGTGTATCA
TATGCCAAGTACGCCCCCTATTGACGTCAATGACGGTAAATGGCCCGCCTGGCATTATGC
CCAGTACATGACCTTATGGGACTTTCCTACTTGGCAGTACATCTACGTATTAGTCATCGC
TATTACCATGGTCGAGGTGAGCCCCACGTTCTGCTTCACTCTCCCCATCTCCCCCCCCTC
CCCACCCCCAATTTTGTATTTATTTATTTTTTAATTATTTTGTGCAGCGATGGGGGCGGG
GGGGGGGGGGCGCGCGCCAGGCGGGGCGGGGGGGGCGAGGGGCGGGGGGGCGAGGC
GGAGAGGTGCGGCGGCAGCCAATCAGAGCGGCGCGCTCCGAAAGTTTCCTTTTATGGCGA
GGCGGCGGCGGCGGCCCTATAAAAAGCGAAGCGCGCGGCGGGCGGGAGTCGCTGCGC
GCTGCCTTCGCCCCGTGCCCCGCTCCGCCGCCGCCTCGCGCCGCCCGCCCCGGCTCTGAC
TGACCGCGTTACTAAAACAGGTAAGTCCGGCCTCCGCGCCGGGTTTTGGCGCCTCCCGCG
GGCGCCCCCTCCTCACGGCGAGCGCTGCCACGTCAGACGAAGGGCGCAGCGAGCGTCCT
GATCCTTCCGCCCGGACGCTCAGGACAGCGGCCCGCTGCTCATAAGACTCGGCCTTAGAA
CCCCAGTATCAGCAGAAGGACATTTTAGGACGGGACTTGGGTGACTCTAGGGCACTGGTT
TTCTTTCCAGAGAGCGGAACAGGCGAGGAAAAGTAGTCCCTTCTCGGCGATTCTGCGGAG
GGATCTCCGTGGGCGGTGAACGCCGATGATGCCTCTACTAACCATGTTCATGTTTTCTT
TTTTTTTCTACAGGTCCTGGGTGACGAACAGGGTACCGCCACCATGAGGGGCATGAAGCT
GCTGGGGCGCTGCTGGCACTGGCGGCCCTACTGCAGGGGCCGTGTCCATGGCGCTGTG
GATGCGCCTGCTGCCGCTGCTGGCGCTGCTGGCGCTGTGGGCCCGGATCCGGCGGCGGC
GTTTGTGAACCAGCATCTGTGCGGCAGCCATCTGGTGGAAGCGCTGTATCTGGTGTGCGG
CGAACGCGGCTTTTTTTATACCCCGAAAACCCGCCGCGAAGCGGAAGATCTGCAGGTGGG
CCAGGTGGAACTGGGCGGCGGCCCGGGCGCGGGCAGCCTGCAGCCGCTGGCGCTGGAAGG
CAGCCTGCAGAAACGCGGCATTGTGGAACAGTGCTGCACCAGCATTTGCAGCCTGTATCA
GCTGGAAAACTATTGCAACGGGCGGATCAGGCGGATCACCCAAATCTTGTGACAAAACTC
ACACATGCCCACCGTGCCCAGCACCTGAACTCCTGGGGGACCGTCAGTCTTCCTCTTCC
CCCCAAAACCCAAGGACACCCTCATGATCTCCCGGACCCCTGAGGTCACATGCGTGGTGG
TGGACGTGAGCCACGAAGACCCTGAGGTCAAGTTCAACTGGTACGTGGACGGCGTGGAGG
TGCATAATGCCAAGACAAAGCCGCGGGAGGAGCAGTACAACAGCACGTACCGTGTGGTCA
GCGTCCTCACCGTCCTGCACCAGGACTGGCTGAATGGCAAGGAGTACAAGTGCAAGGTCT
CCAACAAAGCCCTCCCAGCCCCCATCGAGAAAACCATCTCCAAAGCCAAAGGGCAGCCCC
```

```
GAGAACCACAGGTGTACACCCTGCCCCCATCCCGGGAGGAGATGACCAAGAACCAGGTCA

GCCTGACCTGCCTGGTCAAAGGCTTCTATCCCAGCGACATCGCCGTGGAGTGGGAGAGCA

ATGGGCAGCCGGAGAACAACTACAAGACCACGCCTCCCGTGCTGGACTCCGACGGCTCCT

TCTTCCTCTACAGCAAGCTCACCGTGGACAAGAGCAGGTGGCAGCAGGGGAACGTCTTCT

CATGCTCCGTGATGCATGAGGCTCTGCACAACCACTACACGCAGAAGAGCCTCTCCCTGT

CTCCGGGTAAATAG 3'
```

As will be appreciated by those skilled in the art, because the recombinant plasmid is a circular vector, the one or more sequences of the mRNA expression cassettes may be connected at the 3' end of SEQ ID NO. 1, as shown in SEQ ID NO. 7-11 or at the 5' end of SEQ ID NO. 1.

As will be appreciated by those skilled in the art, a perfect match of nucleotides with each of the miRNA expression cassette sequences is not necessary in order to have the desired result of increased bioavailability of the target biomolecule as a result of the target cell producing the miRNA sequence that will bind to and degrade the mRNA of the target biomolecule. In some embodiments of the present disclosure, about 80% to about 100% nucleotide sequence matching with each of the mRNA expression cassettes causes the desired result. In some embodiments of the present disclosure, about 85% to about 100% nucleotide sequence matching with each of the mRNA expression cassettes causes the desired result. In some embodiments of the present disclosure, about 90% to about 100% nucleotide sequence matching with each of the mRNA expression cassettes causes the desired result. In some embodiments of the present disclosure, about 95% to about 100% nucleotide sequence matching with each of the mRNA expression cassettes causes the desired result.

Example 1—Expression Cassette

Expression cassettes for expressing mRNA were synthesized. The synthesized miRNA expression cassettes were cloned into the pAVA-00200 plasmid backbone containing the CASI promoter, multiple cloning site (MCS), Woodchuck Hepatitis Virus post-transcriptional regulatory element (WPRE), and Simian virus 40 (SV40) polyadenylation (polyA) sequence, all flanked by the AAV2 inverted terminal repeats (ITR). pAVA-00200 was cut with the restriction enzymes KpnI and XbaI in the MCS and separated on a 1% agarose gel. The band of interest was excised and purified using a gel extraction kit. Each mRNA expression cassette was amplified by polymerase chain reaction (PCR) using Taq polymerase and the PCR products were gel purified and the bands on interest were also excised and purified using a gel extraction kit. These PCR products contained the mRNA expression cassettes in addition to 15 base pair 5' and 3' overhangs that aligned with the ends of the linearized pAVA-00200 backbone. Using in-fusion cloning, the amplified mRNA expression cassettes are integrated with the pAVA-00200 backbone via homologous recombination. The resulting RP contained the following: 5' ITR, CASI promoter, miRNA expression cassette, WPRE, SV40 polyA and ITR 3'.

The invention claimed is:

1. An isolated plasmid comprising the nucleic acid sequence of SEQ ID NO: 6 encoding a messenger ribonucleic acid (mRNA) encoding a fusion protein comprising an insulin peptide and an Fc domain.

2. The isolated plasmid of claim 1, further comprising one or more pharmaceutically acceptable carriers.

3. An isolated plasmid comprising the nucleic acid sequence of SEQ ID NO: 11 encoding a messenger ribonucleic acid (mRNA) encoding a fusion protein comprising an insulin peptide and an Fc domain.

* * * * *